United States Patent
Svekolkin et al.

(10) Patent No.: US 11,250,568 B2
(45) Date of Patent: Feb. 15, 2022

(54) TECHNIQUES FOR DETERMINING TISSUE CHARACTERISTICS USING MULTIPLEXED IMMUNOFLUORESCENCE IMAGING

(71) Applicant: BostonGene Corporation, Waltham, MA (US)

(72) Inventors: Viktor Svekolkin, Ulyanovsk (RU); Ilia Galkin, Moscow (RU); Ekaterina Postovalova, Moscow (RU); Ravshan Ataullakhanov, Moscow (RU); Alexander Bagaev, Moscow (RU); Arina Varlamova, Moscow (RU); Pavel Ovcharov, Moscow (RU)

(73) Assignee: BostonGene Corporation, Waltham, MA (US)

( * ) Notice: Subject to any disclaimer, the term of this patent is extended or adjusted under 35 U.S.C. 154(b) by 0 days.

(21) Appl. No.: 17/194,235

(22) Filed: Mar. 6, 2021

(65) Prior Publication Data
US 2021/0279866 A1    Sep. 9, 2021

Related U.S. Application Data

(60) Provisional application No. 62/986,010, filed on Mar. 6, 2020.

(51) Int. Cl.
*G06T 7/00*        (2017.01)
*G06K 9/00*        (2006.01)
(Continued)

(52) U.S. Cl.
CPC .......... *G06T 7/0012* (2013.01); *G06K 9/0014* (2013.01); *G06K 9/00147* (2013.01);
(Continued)

(58) Field of Classification Search
None
See application file for complete search history.

(56) References Cited

U.S. PATENT DOCUMENTS

2006/0245631 A1 *  11/2006  Levenson ............ G06K 9/6284
                                        382/133
2010/0184093 A1 *  7/2010  Donovan ............... G16H 50/50
                                        435/7.21
(Continued)

FOREIGN PATENT DOCUMENTS

CN          110060245 A  *  7/2019
WO     WO 2015/177268 A1    11/2015
(Continued)

OTHER PUBLICATIONS

He, K., Zhang, X., Ren, S., & Sun, J. (2016). Deep residual learning for image recognition. In Proceedings of the IEEE conference on computer vision and pattern recognition (pp. 770-778). (Year: 2016).*

(Continued)

*Primary Examiner* — Samah A Beg
(74) *Attorney, Agent, or Firm* — Wolf, Greenfield & Sacks, P.C.

(57) ABSTRACT

Techniques for processing multiplexed immunofluorescence (MxIF) images. The techniques include obtaining at least one MxIF image of a same tissue sample, obtaining information indicative of locations of cells in the at least one MxIF image, identifying multiple groups of cells in the at least one MxIF image at least in part by determining feature values for at least some of the cells using the at least one MxIF image and the information indicative of locations of the at least some cells in the at least one MxIF image and grouping the at least some of the cells into the multiple groups using the determined feature values, and determining at least one characteristic of the tissue sample using the multiple cell groups.

31 Claims, 66 Drawing Sheets

(51) Int. Cl.
  G06K 9/62 (2006.01)
  G06T 7/194 (2017.01)
  G06T 7/174 (2017.01)
(52) U.S. Cl.
  CPC .............. *G06K 9/628* (2013.01); *G06T 7/174* (2017.01); *G06T 7/194* (2017.01); *G06T 2207/10064* (2013.01); *G06T 2207/20081* (2013.01); *G06T 2207/20084* (2013.01); *G06T 2207/30024* (2013.01)

(56) References Cited

U.S. PATENT DOCUMENTS

| | | | | |
|---|---|---|---|---|
| 2012/0010528 | A1* | 1/2012 | Donovan | G06T 7/62 600/567 |
| 2014/0270425 | A1* | 9/2014 | Kenny | G06T 7/0002 382/128 |
| 2016/0266126 | A1* | 9/2016 | Shipitsin | G06T 7/136 |
| 2016/0341731 | A1* | 11/2016 | Sood | G16B 20/00 |
| 2016/0358326 | A1* | 12/2016 | Sarachan | G16H 30/40 |
| 2020/0381121 | A1* | 12/2020 | Wang | G06K 9/6265 |
| 2020/0388033 | A1* | 12/2020 | Matlock | G06K 9/00147 |
| 2020/0394459 | A1* | 12/2020 | Xu | G06N 5/04 |

FOREIGN PATENT DOCUMENTS

| | | |
|---|---|---|
| WO | WO 2016/107896 A1 | 7/2016 |
| WO | WO 2019/032723 A1 | 2/2019 |
| WO | WO 2019/110567 A1 | 6/2019 |

OTHER PUBLICATIONS

Goltsev, Yury, et al. "Deep profiling of mouse splenic architecture with CODEX multiplexed imaging." Cell 174.4 (2018): 968-981,e1-e6. (Year: 2018).*
Ronneberger, Olaf, Philipp Fischer, and Thomas Brox. "U-net: Convolutional networks for biomedical image segmentation." International Conference on Medical image computing and computer-assisted intervention. Springer, Cham, 2015. (Year: 2015).*
Saylor, Joshua, et al. "Spatial mapping of myeloid cells and macrophages by multiplexed tissue staining." Frontiers in immunology 9 (2018): 2925. (Year: 2018).*
Zhou, Yanning, et al. "Cgc-net: Cell graph convolutional network for grading of colorectal cancer histology images." Proceedings of the IEEE/CVF International Conference on Computer Vision Workshops. 2019. (Year: 2019).*
International Search Report and Written Opinion for International Application No. PCT/US2021/021265 dated Jun. 11, 2021.
[No. Author Listed], CellProfiler 4.1.3. Github, Inc. Feb. 16, 2021. https://github.com/CellProfiler/CellProfiler/releases/tag/v4.1.3 [last accessed Sep. 12, 2021]. 1 page.
[No. Author Listed], UltraPlex™ mxIF for Tumor Biopsies. Cell IDx. 2021:4 pages. https://cellidx.com/technology/articles/tissue-biopsies [last accessed Sep. 12, 2021].
Berens et al., Tumor cell phenotype and heterogeneity differences in IDH1 mutant vs wild-type gliomas. BioRxiv. Jul. 2, 2019:690297. 53 pages.
Bodla et al., Improving Object Detection With One Line of Code. ArXiv preprint arXiv:1704.04503v2. Aug. 8, 2017;2:1-9.
Brieu et al., Context-based interpolation of coarse deep learning prediction maps for the segmentation of fine structures in immunofluorescence images. Proceedings of the SPIE Medical Imaging 2018: Digital Pathology. Mar. 6, 2018;10581:7 pages.
Burlingame et al., SHIFT: speedy histopathological-to-immunofluorescent translation of whole slide images using conditional generative adversarial networks. Proceedings of the SPIE International Society for Optics and Engineering. Feb. 2018;10581:11 pages.

Camp et al., Automated subcellular localization and quantification of protein expression in tissue microarrays. Nature medicine. Nov. 2002;8(11):1323-8.
Gaiko-Shcherbak et al., The Acinar Cage: Basement Membranes Determine Molecule Exchange and Mechanical Stability of Human Breast Cell Acini. PLoS One. Dec. 16, 2015;10(12):e0145174. 20 pages.
Giltnane et al., Comparison of Quantitative Immunofluorescence With Conventional Methods for HER2/neu Testing With Respect to Response to Trastuzumab Therapy in Metastatic Breast Cancer. Archives of pathology & laboratory medicine. Oct. 2008; 132(10):1635-47.
Graf et al., Characterizing the heterogeneity of tumor tissues from spatially resolved molecular measures. PloS one. Nov. 30, 2017;12(11):e0188878. 20 pages.
Hamilton et al., Inductive representation learning on large graphs. ArXiv preprint arXiv:1706.02216v4. Sep. 10, 2018;4:1-19.
He et al., Mask R-CNN. ArXiv preprint arXiv: 1703.06870v3. Jan. 24, 2018;3:1-12.
Juncker-Jensen et al., Using a multiplexed immunofluorescence approach to compare immune cell populations in subtypes of non-small cell lung cancer. Journal of Thoracic Oncology. May 26, 2019;14(10S):S974. 1 page.
Kipf et al., Semi-supervised classification with graph convolutional networks. ArXiv preprint arXiv: 1609.02907v4. Feb. 22, 2017;4:1-14.
Koelzer et al., Precision immunoprofiling by image analysis and artificial intelligence. Virchows Archiv. Apr. 2019;474(4):511-22.
Kromp et al., Deep Learning architectures for generalized immunofluorescence based nuclear image segmentation. ArXiv preprint arXiv:1907.12975v1. Jul. 30, 2019;1:1-10. 14 pages.
Nadarajan et al., Automated multi-class ground-truth labeling of H&E images for deep learning using multiplexed fluorescence microscopy. Proceedings of the SPIE Medical imaging 2019: digital pathology. Mar. 18, 2019;10956:11 pages.
Nelson et al., Quantitative single cell analysis of cell population dynamics during submandibular salivary gland development and differentiation. Biology open. Apr. 18, 2013;2(5):439-47.
Nilakantan et al., In Vivo Zonal Variation and Liver Cell-Type Specific NF-κB Localization after Chronic Adaptation to Ethanol and following Partial Hepatectomy. PLoS One. Oct. 9, 2015;10(10):e0140236. 25 pages.
Rogojanu et al., Quantitative Image Analysis of Epithelial and Stromal Area in Histological Sections of Colorectal Cancer: An Emerging Diagnostic Tool. BioMed research international. Oct. 22, 2015:1-9.
Tan et al., Efficientnet: Rethinking model scaling for convolutional neural networks. ArXiv preprint arXiv:1905.11946v5. Sep. 11, 2020;5:11 pages.
Tang et al., Phenotypic transition maps of 3D breast acini obtained by imaging-guided agent-based modeling. Integrative Biology. Apr. 1, 2011;3(4):408-21. 25 pages.
Trindade et al., Utilization of novel highly multiplexed immunofluorescence microscopy technology to understand immunological tumor microenvironments in small cell lung carcinoma patients receiving combination PD-L1 and PARP inhibition therapy. Journal of Clinical Oncology. 2019;37(15_suppl):e14289-e14289. https://ascopubs.org/doi/abs/10.1200/JCO.2019.37.15_suppl.e14289 [last accessed Jul. 13, 2021], 3 pages.
Veličković et al., Deep graph infomax. ArXiv preprint arXiv: 1809.10341v2. Dec. 21, 2018;2:1-17.
Yan et al., Understanding heterogeneous tumor microenvironment in metastatic melanoma. PloS one. Jun. 5, 2019;14(6):e0216485.
Yang et al., A deep learning approach for tumor tissue image classification. Iasted Biomedical Engineering. 2016:7 pages.
Zhou et al., Graph neural networks: A review of methods and applications. ArXiv preprint ArXiv:1812.08434v2. Jan. 2, 2019;2:1-20.

* cited by examiner

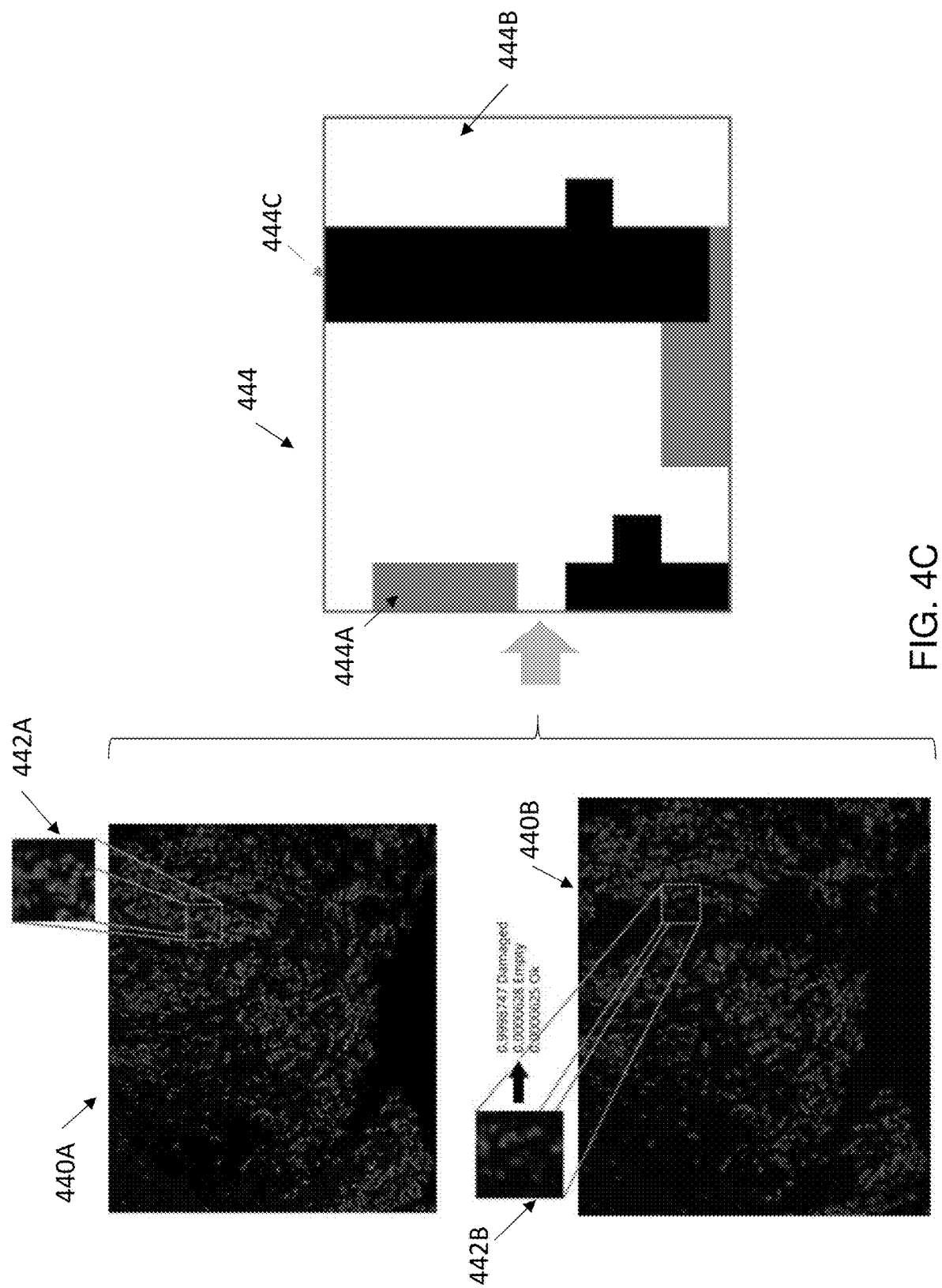

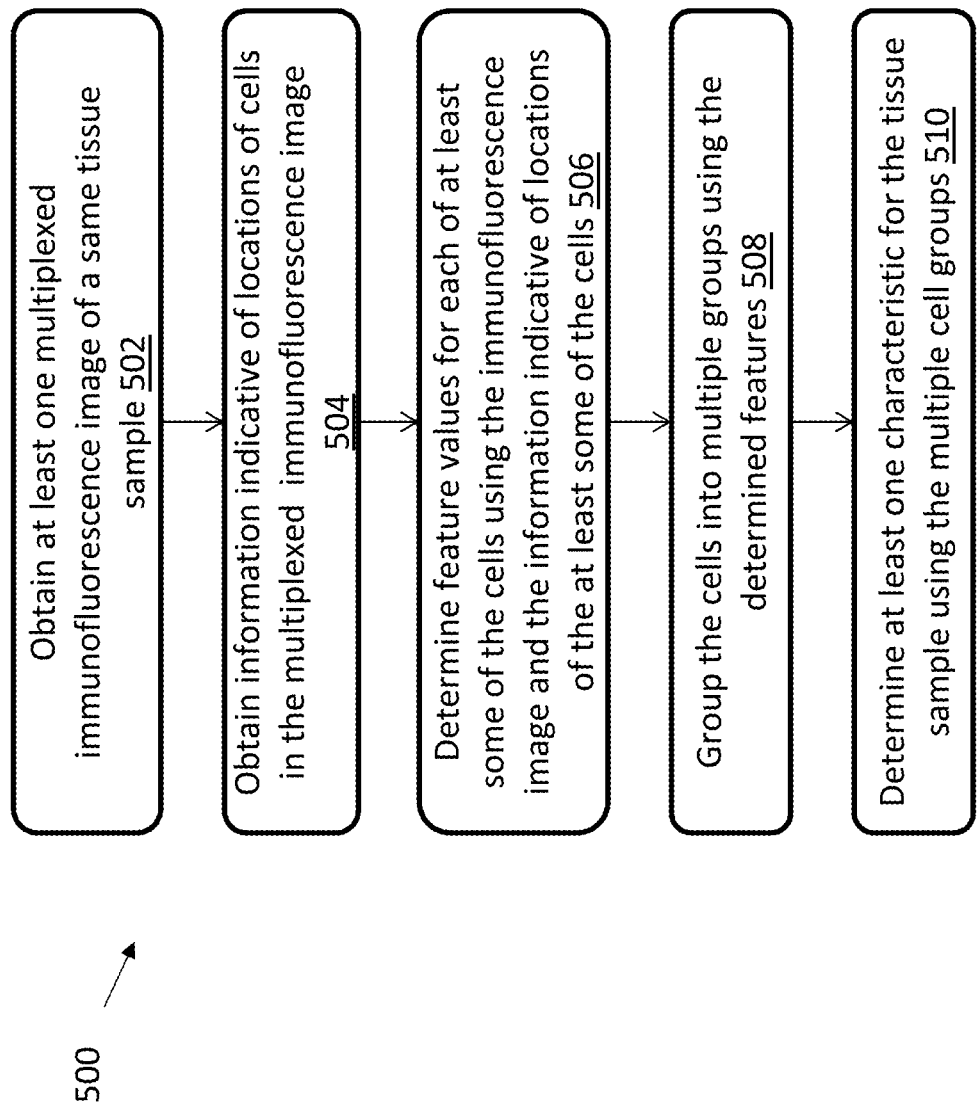

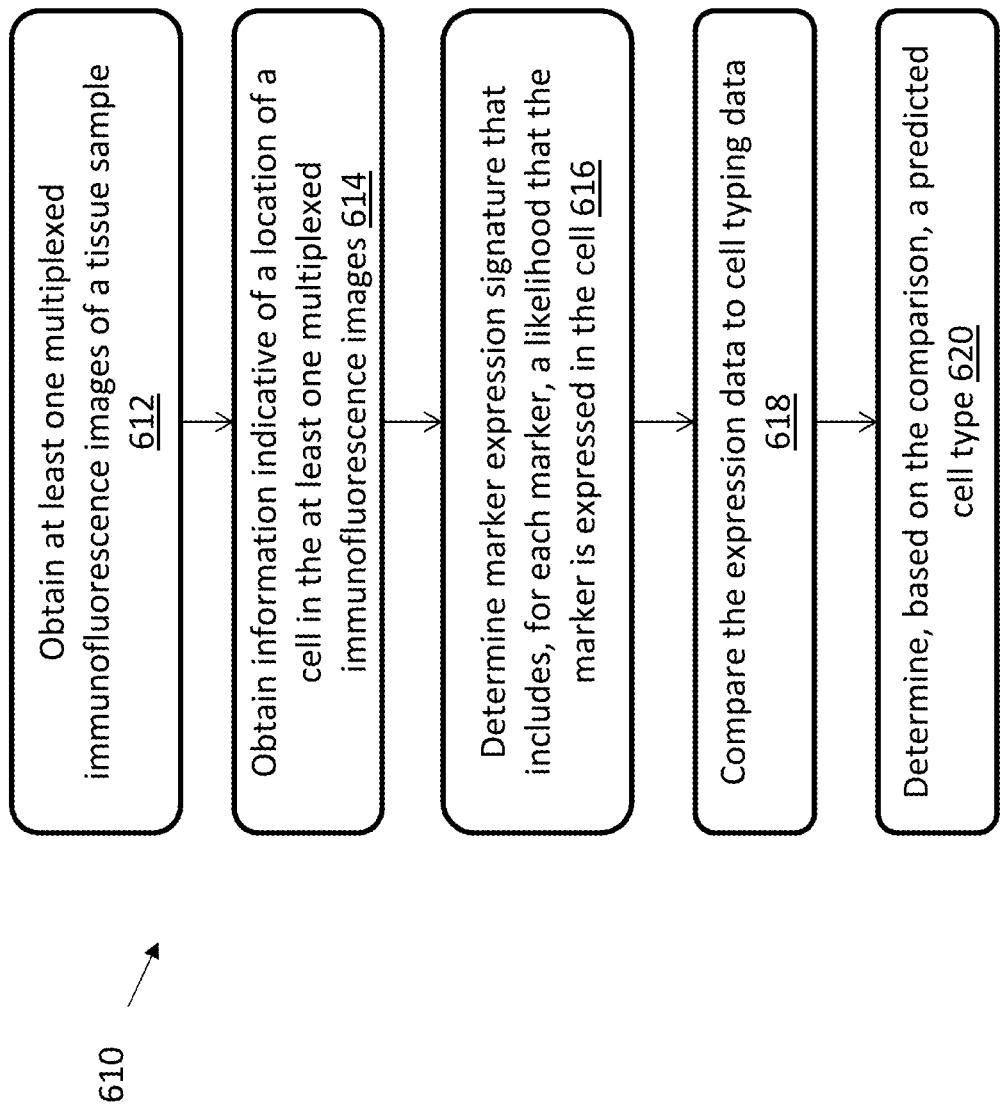

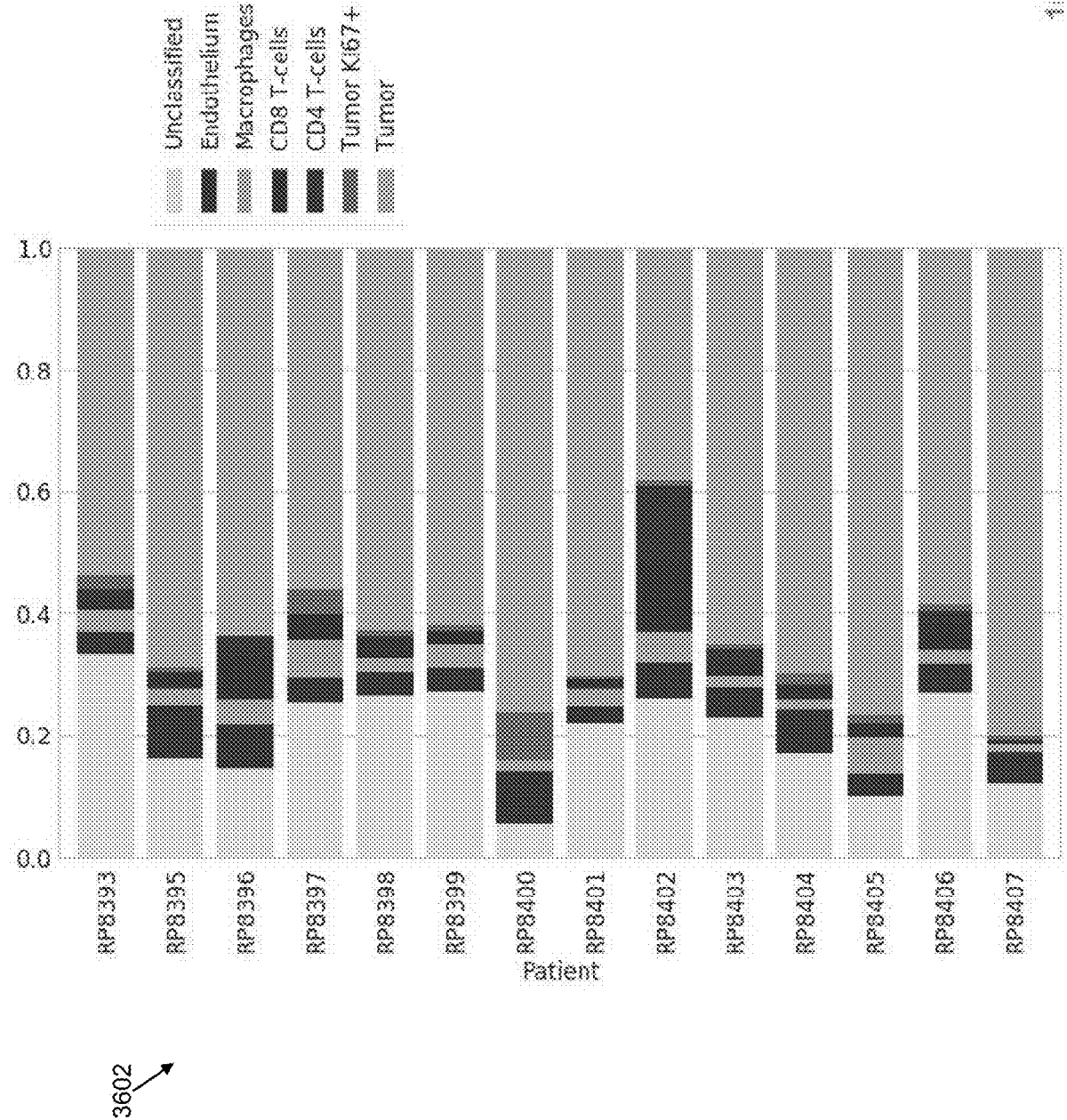

TECHNIQUES FOR DETERMINING TISSUE CHARACTERISTICS USING MULTIPLEXED IMMUNOFLUORESCENCE IMAGING

CROSS-REFERENCE TO RELATED APPLICATIONS

This application claims the benefit under 35 U.S.C. § 119(e) of U.S. Provisional Application Ser. No. 62/986,010, filed Mar. 6, 2020, entitled "DETERMINING TISSUE CHARACTERISTICS USING MULTIPLEXED IMMUNOFLUORESCENCE IMAGING," the entire contents of which is incorporated herein by reference in its entirety.

FIELD

Aspects of the technology described herein relate to machine learning techniques for image processing. In particular, some embodiments of the technology described herein relate to using neural network techniques for processing one or more multiplexed immunofluorescence images.

BACKGROUND

Multiplexed immunofluorescence (MxIF) imaging is a technique for imaging multiple fluorescent cellular and/or histological markers in a single biological sample (e.g., a tissue sample). MxIF imaging involves repeated rounds of staining, imaging, dye chemical inactivation (e.g., bleaching), and re-imaging to layer multiple fluorescent markers onto the same regions of interest in the biological sample. The markers' fluorescence is then used to form images. MxIF imaging allows for imaging of multiple different markers (e.g., between 30 and 100 markers) for a single tissue sample, allowing for more information to be gleaned from a single cut of tissue.

Different types of markers may be used as part of MxIF imaging including membrane, cytoplasm, and nuclear markers that bind in membrane, cytoplasm and nuclear regions of cells, respectively. The resulting images therefore allow for tissue analysis at a sub-cellular level.

SUMMARY

Some embodiments provide for a method, comprising using at least one computer hardware processor to perform: obtaining at least one multiplexed immunofluorescence (MxIF) image of a same tissue sample; obtaining information indicative of locations of cells in the at least one MxIF image; identifying multiple groups of cells in the at least one MxIF image at least in part by: determining feature values for at least some of the cells using the at least one MxIF image and the information indicative of locations of cells in the at least one MxIF image; and grouping the at least some of the cells into the multiple groups using the determined feature values; and determining at least one characteristic of the tissue sample using the multiple groups.

Some embodiments provide for a system, comprising at least one computer hardware processor and at least one non-transitory computer-readable storage medium storing processor-executable instructions that, when executed by the at least one computer hardware processor, cause the at least one computer hardware processor to perform: obtaining at least one multiplexed immunofluorescence (MxIF) image of a same tissue sample; obtaining information indicative of locations of cells in the at least one MxIF image; identifying multiple groups of cells in the at least one MxIF image at least in part by: determining feature values for at least some of the cells using the at least one MxIF image and the information indicative of locations of cells in the at least one MxIF image; and grouping the at least some of the cells into the multiple groups using the determined feature values; and determining at least one characteristic of the tissue sample using the multiple groups.

Some embodiments provide for at least one non-transitory computer-readable storage medium storing processor-executable instructions that, when executed by at least one computer hardware processor, cause the at least one computer hardware processor to perform: obtaining at least one multiplexed immunofluorescence (MxIF) image of a same tissue sample; obtaining information indicative of locations of cells in the at least one MxIF image; identifying multiple groups of cells in the at least one MxIF image at least in part by: determining feature values for at least some of the cells using the at least one MxIF image and the information indicative of locations of cells in the at least one MxIF image; and grouping the at least some of the cells into the multiple groups using the determined feature values; and determining at least one characteristic of the tissue sample using the multiple groups.

Some embodiments provide for a method, comprising using at least one computer hardware processor to perform: obtaining at least one multiplexed immunofluorescence (MxIF) image of a tissue sample; obtaining information indicative of a location of at least one cell in the at least one MxIF image; determining a marker expression signature for the cell in the tissue sample based on a plurality of markers expressed in the at least one MxIF image and the information indicative of the location of the cell in the at least one MxIF image; and comparing the marker expression signature to cell typing data that comprises at least one marker expression signature for a plurality of different types of cells to determine a cell type for the cell.

Some embodiments provide for a system comprising at least one computer hardware processor and at least one non-transitory computer-readable storage medium storing processor-executable instructions that, when executed by the at least one computer hardware processor, cause the at least one computer hardware processor to perform: obtaining at least one MxIF image of a tissue sample; obtaining information indicative of a location of at least one cell in the at least one MxIF image; determining a marker expression signature for the cell in the tissue sample based on a plurality of markers expressed in the at least one MxIF image and the information indicative of the location of the cell in the at least one MxIF image; and comparing the marker expression signature to cell typing data that comprises at least one marker expression signature for a plurality of different types of cells to determine a cell type for the cell.

Some embodiments provide for at least one non-transitory computer-readable storage medium storing processor-executable instructions that, when executed by at least one computer hardware processor, cause the at least one computer hardware processor to perform: obtaining at least one MxIF image of a tissue sample; obtaining information indicative of a location of at least one cell in the at least one MxIF image; determining a marker expression signature for the cell in the tissue sample based on a plurality of markers expressed in the at least one MxIF image and the information indicative of the location of the cell in the at least one MxIF image; and comparing the marker expression signature to cell typing data that comprises at least one marker expression signature for a plurality of different types of cells to determine a cell type for the cell.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 4C is a diagram showing a patch mask generated based on tissue degradation information determined by comparing two nucleus marker images of the same tissue sample, according to some embodiments of the technology described herein.

FIG. 5A is a flow chart showing an exemplary computerized process for processing MxIF images of a tissue sample based on cell location data to group cells of the tissue sample to determine at least one characteristic of the tissue, according to some embodiments of the technology described herein.

FIG. 6A is a flow chart showing an exemplary computerized process for processing MxIF images of a tissue sample based on cell location data of a cell in the tissue sample to predict a type of the cell, according to some embodiments of the technology described herein.

FIGS. 36A-B are diagrams illustrating cell quantities and proportions, according to some embodiments of the technology described herein.

DETAILED DESCRIPTION

Figure 1:
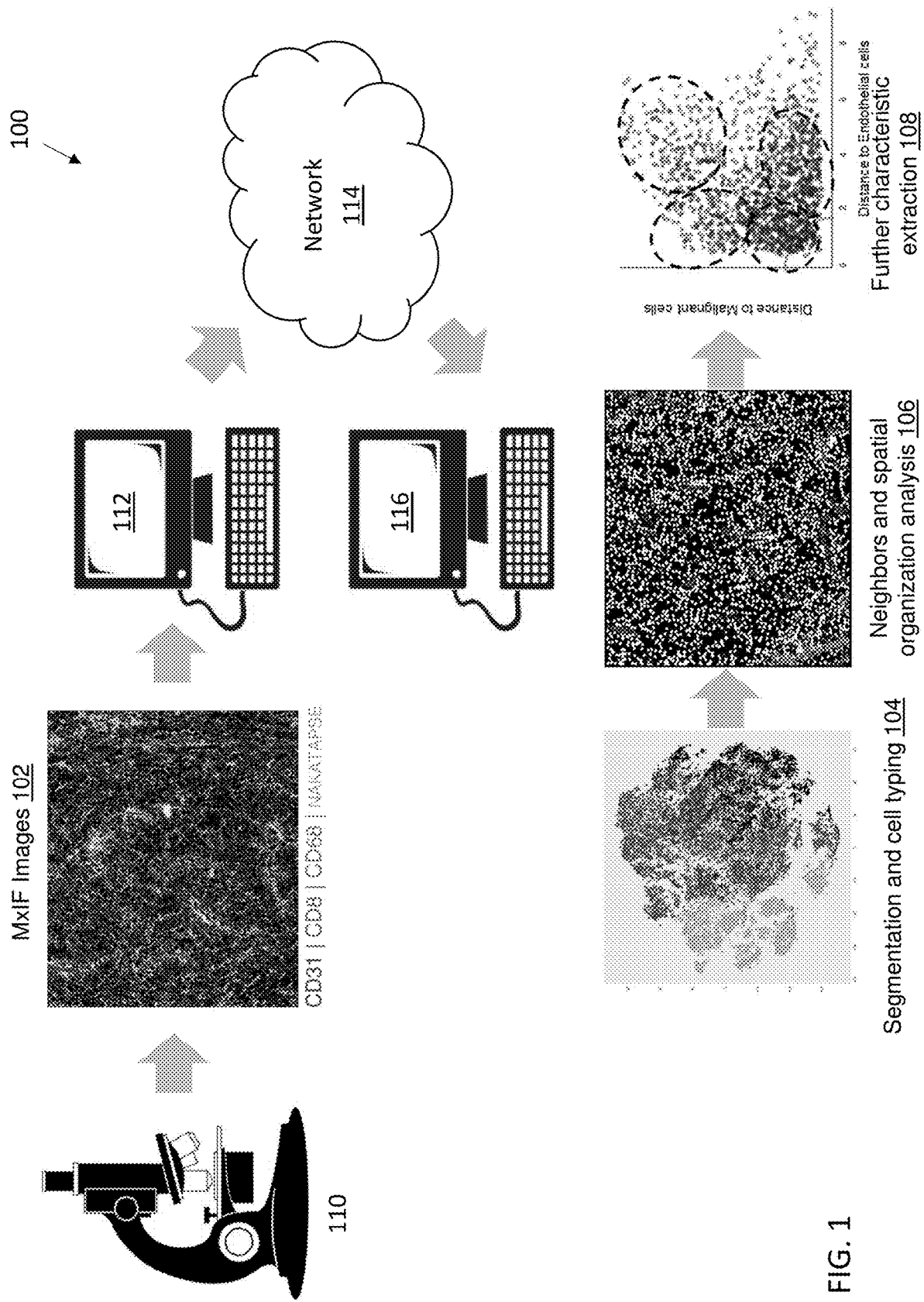
FIG. 1 is a diagram pictorially illustrating an exemplary system for multiplexed immunofluorescence (MxIF) image processing, according to some embodiments of the technology described herein.

The inventors have developed new image processing and machine learning techniques for processing multiplexed images of biological samples such as, for example, multiplexed immunofluorescence (MxIF) images of a tissue sample of a person having, suspected of having, or at risk of having cancer or another disease. Such images can be obtained, for example, using labeled antibodies as labeling agents. Each antibody can be labeled with various types of labels, such as fluorescent labels, chemical labels, enzymatic labels, and/or the like.

The techniques developed by the inventors provide robust information regarding various medically-relevant characteristics of tissue samples that may characterize the cellular composition (e.g., cell type, cell morphology etc.) and/or organization (e.g., cell localization, multi-cellular structure localization, etc.) of the tissue sample. Examples of tissue sample characteristics include, but are not limited to, information about the types of cells in the tissue sample, morphological information, spatial information, and information identifying locations of certain tissue structures (e.g., acini, stroma, tumor, vessels, etc.).

The inventors have appreciated that it is desirable to be able to identify different cell groups in a tissue sample that can be used to determine medically-relevant characteristics of the tissue sample, including any of the characteristics described above. However, conventional techniques for processing MxIF images are unable to determine cell groups accurately and automatically. In particular, conventional techniques are not fully automated and cannot analyze MxIF data to accurately determine cell types, cell groupings and/or other information of the tissue sample that can be used to determine tissue characteristics of interest. Therefore, conventional techniques require manual intervention for various step(s) of the MxIF image processing procedure, including to identify cells and/or other aspects of the tissue sample, as well as to configure parameters of the semi-automated part of the process. Such manual intervention results in tedious analysis that is consuming (e.g., since such images typically have a large number of cells, hand-annotating the images can be a very time consuming and non-trivial task), and provide inconsistent results since the process is subject to human error and/or is not easily repeatable across different samples (e.g., which can result in inconsistency in MxIF tissue analysis procedures and/or MxIF tissue analysis data).

The inventors have developed a novel image processing pipeline in which information indicative of cell locations (e.g., information from which cell boundaries can be derived, cell boundaries, and/or masks) can be used to determine feature values for individual cells based on pixel values for those cells in one or more MxIF images (e.g., by determining one or more feature values for cells in the tissue sample). In turn, the feature values may be used to group the cells into multiple groups, which can be used to determine the cell characteristics of interest. In some embodiments, the feature values are indicative of how much each channel of the at least one MxIF image is expressed for a cell, which can therefore be used to determine a marker expression signature for the cells in the MxIF images.

In some embodiments, the cell groups can be determined by performing a cell typing process that determines the types of cells in the tissue sample (e.g., which can be used to group the cells by cell type) based on the feature values for the individual cells. In some embodiments, the feature values can be determined based on traditional chemical staining of different cellular and/or tissue structures. For example, in some embodiments, the feature values for the cells may include marker expression signatures (e.g., a marker expression signature may be computed for each of one or more cells) and the marker expression signatures may be used to determine the type of each cell (e.g., whether that cell is an acini cell, macrophage cell, myeloid cell, t-cell, b-cell, endothelium cell, and/or any other cell type). In turn, the cells may be grouped based on their cell types, such that each group includes cells of a particular type (e.g., a group containing acini cells, a group containing macrophage cells, and so on for the various cell types of the cells of interest). Marker expression signatures are described further herein. Additionally, or alternatively, the cell groups can be determined based on feature values (e.g., where the same and/or different cell types may be associated with a same group based on having similar feature values). For example, in some embodiments the feature values for cells may include any information indicative of the expression levels of various markers in the cells. For example, the feature values for a particular cell may be determined using the pixel values for pixels at the location, in the at least one MxIF image, of the particular cell. For example, the feature values may be determined by averaging or computing the median value of such pixels, which may indicate a mean or median expression level of markers in the particular cell. In some embodiments, determining the one or more characteristics can include determining the cell type of each of the multiple groups. In some embodiments, the groups may represent different portions of different tissue structure(s) present in the tissue sample.

Accordingly, some embodiments provide for a computer-implemented method comprising: (1) obtaining at least one MxIF image of a same biological sample (e.g., a tissue sample from a subject having, suspected of having, or at risk of having cancer); (2) obtaining information indicative of locations of cells (e.g., cell boundaries, information from which cell boundaries can be derived, and/or masks) in the MxIF image (e.g., by applying a machine learning model to identify the boundaries of cells in the images, by computing cell location information (e.g., a cell location mask) from the image and/or accessing such cell location information); (3) identifying multiple groups of cells in the at least one MxIF image at least in part by: (a) determining feature values for at least some of the cells using the MxIF image and the information indicative of locations of the at least some of the cells (e.g., computing feature values for a cell by computing an average or median pixel value of pixels within the boundary of that cell as indicated by the information indicative of the locations of the at least some of the cells, computing feature values for a cell by computing a marker expression signature as described herein); and (b) grouping (e.g., grouping cells by type, group cells based on average or median pixel values using any suitable clustering algorithm, etc.) the at least some of the cells into the multiple groups using the determined feature values; and (4) determining at least one characteristic of the tissue sample using the multiple groups (e.g., determining the cell type of each group, determining cell masks, determining cell communities, determining statistical information about distributions of the cells of the multiple groups, determining spatial distributions of cell types, determining morphological information, etc.).

In some embodiments, the information indicative of locations of cells can be obtained from chemical staining of cells or cellular structures. In some embodiments, the chemical staining can produce a fluorescent signal (e.g., DAPI). In some embodiments, labeled (e.g., fluorescently labeled) antibodies can be used to detect specific intracellular, membrane, and/or extracellular locations within a cell or tissue sample. In some embodiments, labeled antibodies alone can be used. In some embodiments, labeled antibodies can be used along with one or more other stains (e.g., other fluorescent stains).

In some embodiments, obtaining the at least one MxIF image comprises obtaining a single multi-channel image of the same tissue sample, wherein channels in the single multi-channel image are associated with respective markers in a plurality of markers (e.g., any one or more of the markers described herein, including the markers discussed in the detailed description section). In some embodiments, obtaining at least one MxIF image comprises obtaining a plurality of immunofluorescence images of the same tissue sample. At least one of the plurality of immunofluorescence images can include a single-channel image associated with a respective marker. At least one of the plurality of immunofluorescence images can include a multi-channel image, wherein channels in the multi-channel image are associated with respective markers in a plurality of markers (e.g., any one or more of the markers described herein, including the markers discussed in the detailed description section). In some embodiments, the at least one MxIF image of the tissue sample is captured in vitro.

In some embodiments, feature values for a cell may include values of the cell's pixels in one or more of the MxIF images. For example, in some embodiments, the cells include a first cell and determining the feature values comprises determining first feature values for the first cell using at least one pixel value associated with a location of the first cell in the at least one MxIF image. In some embodiments, the at least some of the cells include a second cell and determining the feature values comprises determining second feature values for the second cell using at least one pixel value associated with a location of the second cell in the at least one MxIF image. In some embodiments, determining the first feature values for the first cell comprises using pixel values associated with respective locations of the first cell in multiple channels of the at least one MxIF image.

In some embodiments, using pixel values associated with respective locations of the first cell in multiple channels comprises, for each of the multiple channels: (a) identifying a set of pixels for the first cell using information indicative of the location of the first cell in the channel; and (b) determining a feature value for the first cell based on values of pixels in the set of pixels. In some embodiments, the information indicative of the location of the first cell indicates the location of the first cell's boundary, and identifying the set of pixels for the first cell comprises identifying pixels at least partially (e.g., partially or fully) within the first cell's boundary.

In some embodiments, determining the first feature values comprises determining a feature value for one or more (e.g., at least one, at least three, at least five, at least ten, at least fifteen, between one and ten, between five and twenty, or any other suitable number, range, or value within a range) of the following markers of the at least one MxIF image: ALK, BAP1, BCL2, BCL6, CAIX, CCASP3, CD10, CD106, CD11b, CD11c, CD138, CD14, CD16, CD163, CD1, CD1c, CD19, CD2, CD20, CD206, CD209, CD21, CD23, CD25, CD27, CD3, CD3D, CD31, CD33, CD34, CD35, CD38, CD39, CD4, CD43, CD44, CD45, CD49a, CD5, CD56, CD57, CD66b, CD68, CD69, CD7, CD8, CD8A, CD94, CDK1, CDX2, Clec9a, Chromogranin, Collagen IV, CK7, CK20, CXCL13, DAPI, DC-SIGN, Desmin, EGFR, ER, ERKP, Fibronectin, FOXP3, GATA3, GRB, GranzymeB, H3K36TM, HER2, HLA-DR, ICOS, IFNg, IgD, IgM, IRF4, Ki67, KIR, Lumican, Lyve-1, Mammaglobin, MHCI, p53, NaKATPase, PanCK, PAX8, PCK26, CNAP, PBRM1, PD1, PDL1, Perlecan, PR, PTEN, RUNX3, S6, S6P, SMA, SMAa, SPARC, STAT3P, TGFb, Va7.2, and Vimentin.

In some embodiments, multiple markers can be present and/or detected in a single channel. For example, the signal from a chemical stain (e.g., DAPI) can be in the same image of the tissue sample (or channel) that is also used to provide immunofluorescent signals (e.g., to detect the location information of cells). In some embodiments, only one marker is present in a single channel and/or image.

In some embodiments, grouping the cells into multiple cell groups comprises clustering cells based on their respective feature values using a clustering algorithm. Any suitable clustering algorithm may be used including, for example, a centroid-based clustering algorithm (e.g., K-means), a distribution based clustering algorithm (e.g., clustering using Gaussian mixture models), a density-based clustering algorithm (e.g., DBSCAN), a hierarchical clustering algorithm, principal components analysis (PCA), independent components analysis (ICA), and/or any other suitable clustering algorithm, as aspects of the technology described herein are not limited in this respect.

In some embodiments, grouping the at least some of the cells into the multiple groups comprises analyzing the determined feature values to determine relationships among the at least some of the cells, and determining the multiple groups based on the determined relationships such that each cell in a group of the multiple groups has feature values that are indicative of a relationship among cells in the group. In some embodiments, determining relationships among the at least some of the cells comprises determining similarities among feature values of the at least some of the cells. In some embodiments, determining relationships among the at least some of the cells comprises comparing the feature values to known cell typing data to determine a cell type for each of the at least some of the cells.

In some embodiments, the techniques include performing cell typing based on the feature values of the individual cells. In some embodiments, the feature values can include channel contributions (e.g., mean channel contributions indicative of how much each channel contributes to a cell) that can be used to determine cell types and/or cell groups (e.g., cell clusters). The inventors have appreciated that while mean channel contributions can be used for cell typing, in some instances, leveraging mean channel contribution in cells can be affected by the quality of segmentation, the size of the cells, the shape of the cells, and/or the conditions of the tissue staining. For example, such techniques can be prone to variations in marker intensity, can add marker expression(s) from nearby cell contours (e.g., due to segmentation errors), and/or can complicate the cell type identification process by creating additional clusters of cells with intermediate marker expressions. As another example, the inventors have appreciated that channel contributions do not take into account information about intracellular signal localization (e.g., which can be useful to help distinguish real signal data from noise). As a further example, the inventors have also appreciated that without an ability to set the range of values of channel contributions for specific types of cells, it can be difficult to purposefully search for cell types of interest (e.g., instead, clustering can be used, which may not find cells of interest). Therefore, the inventors have appreciated that mean channel contributions may not provide for stable cell typing. Given such potential problems, cell typing results may need to be checked manually, which can increase delays and impact automation.

The inventors have therefore developed techniques for cell typing that utilize machine learning. In some embodiments, cell typing may be performed by using a trained neural network to determine a marker expression signature for each of one or more cells. The marker expression signature for a cell may include, for each particular marker of one or more of a plurality of markers, a likelihood that the particular marker is expressed in the cell. In turn, the marker expression signature for the cell may be used to identify the type of the cell (e.g., by comparing the marker expression signature with previously-determined marker expression signatures that have been associated, for example by pathologists, with respective cell types). Such machine learning techniques provide for an automated way of cell typing (e.g., as compared to conventional techniques, which may require a user to manually adjust settings). In some embodiments, the trained neural network may take as input at least one MxIF image with one or more channels (e.g., separate one-channel MxIF images, a two-channel MxIF image, a three-channel MxIF image, and/or the like) and cell location data for the cell of interest. The trained neural network can use not only marker expression intensity, but also other data such as detected cell shape, cell texture and the location of the marker expression. The neural network can output the likelihood of the cell having a signal of proper intensity and shape (e.g., in the 0 to 1 range) for each channel and its associated marker. The likelihoods determined by the neural network for each marker can be combined to generate the marker expression signature for the cell of interest, which can be compared to cell typing data to determine a predicted cell type for the cell of interest. Due to the robustness of the trained neural network to signal level distribution differences (e.g., which is achieved by training the network using heterogeneous training data, and leveraging additional features as described both above and herein), the cell typing approach described herein provides for automated cell type detection that provides for robust signal presence decisions for each cell.

In some embodiments, the multiple channels are associated with respective markers in a plurality of markers, determining the first feature values using the pixel values associated with the respective locations of the first cell in the multiple channels of the at least one MxIF image comprises determining a marker expression signature that includes, for each particular marker of one or more of the plurality of markers, a likelihood that the particular marker is expressed in the first cell, and grouping the at least some of the cells into the multiple groups comprises determining a predicted cell type for the first cell using the marker expression signature and cell typing data, and associating the first cell with one of the multiple groups based on the predicted cell type. In some embodiments, determining the feature values for the at least some of the cells comprises determining a marker expression signature, for each particular cell of multiple cells in the at least one MxIF image, the marker expression signature including, for each particular marker of one or more of a plurality of markers, a likelihood that the particular marker is expressed in the particular cell, grouping the at least some of the cells into the multiple groups using the determined feature values comprises determining a predicted cell type for each particular cell of the multiple cells using the marker expression signature for the particular cell and cell typing data, and grouping the multiple cells into the multiple groups based on the predicted cell type. The plurality of markers comprises at least one of the markers described herein.

In some embodiments, the cell typing data comprises at least one marker expression signature for each of a plurality of cell types, and the at least one marker expression signature for each particular cell type of the plurality of cell types comprises data indicative of which of the plurality of markers is expressed in cells of the particular cell type.

In some embodiments, the method further comprises determining the marker expression signature using a first trained neural network configured to determine marker expression signatures. In some embodiments, the first trained neural network comprises at least one million parameters. In some embodiments, the method further includes training the first trained neural network using a set of training immunofluorescence images of tissue samples for an associated cell type as input images and associated output data comprising information indicative of marker expressions in the input images for the associated cell type. In some embodiments, the method comprises providing the at least one MxIF image to the first trained neural network as input and obtaining the marker expression signature as output from the first trained neural network.

In some embodiments, the method includes providing, from the information indicative of the locations of the cells, information indicative of a location of the first cell in at least some of the multiple channels as part of the input to the first trained neural network. The trained neural network can include a plurality of convolutional layers.

In some embodiments, the cell typing data comprises multiple marker expression signatures including at least one marker expression signature for each of a plurality of cell types, and determining the predicted cell type of the first cell comprises comparing the marker expression signature of the first cell with at least one marker expression signature among the multiple marker expression signatures to determine the predicted cell type. In some embodiments, comparing the marker expression signature of the first cell with at the at least one marker expression signature among the multiple marker expression signatures is performed using a measure of distance. In some embodiments, the measure of distance is at least one of a cosine distance, a Euclidian distance, and a Manhattan distance. In some embodiments, the method further includes determining the predicted cell type by selecting the comparison metric of the computed comparison metrics with a lowest value or a highest value.

In some embodiments, the at least one characteristic of the tissue sample characterizes a cellular composition of the tissue sample, an organization of the tissue sample, or both. In some embodiments, determining the at least one characteristic comprises determining information about cell types in the tissue sample. For example, in some embodiments, determining information about cell types in the tissue sample comprises identifying one or more cell types present in the tissue sample. In some embodiments, the cell types comprise one or more of endothelial cells, epithelial cells, macrophages, T cells, malignant cells, NK cells, B cells, and acini cells. In some embodiments, the T cells comprise one or more of CD3+ T cells, CD4+ T cells, and CD8+ T cells. In some embodiments, determining information about cell types in the tissue sample comprises determining a percentage of one or more cell types in the tissue sample. In some embodiments, the cell types can be determined using various information and/or techniques. In some embodiments, cell type can be determined histologically based on their size, shape, and/or staining (e.g., using different chemical stains). Additionally or alternatively, immunofluorescent signals can be used to evaluate the size and shape of cells to determine cell types. Additionally or alternatively, cell-specific markers (e.g., proteins) can be used (e.g., by using labeled antibodies) to determine cell types.

Any of a plurality of numerous types of tissue characteristics may be determined using the techniques developed by the inventors and described herein. For example, in some embodiments, determining the at least one characteristic comprises determining statistical information about a distribution of at least a portion of cells of the multiple groups of cells. For example, in some embodiments, determining statistical information about the distribution of at least some cells of the multiple cell types comprises determining spatial distributions of one or more cell types in the tissue sample. In some examples, determining statistical information about the distribution of at least some of the cells comprises determining distributions between different cell types.

As another example, in some embodiments, determining the at least one characteristic comprises determining spatial information about locations of at least some cells of the multiple groups of cells. In some embodiments, determining the spatial information comprises determining distances between cells of the multiple groups of cells. In some embodiments, determining the spatial information comprises determining one or more areas of the tissue sample that include one or more cells of a group of one of the multiple groups of cells. In some examples, determining spatial information about locations of at least some cells comprises determining a spatial organization of one or more cell types of the tissue sample (e.g., including information about cell organization in the tissue sample by cell type, compared to other cell types, and/or the like). In some examples, determining spatial information about locations of at least some cells comprises determining one or more areas of the tissue sample that comprise one or more cell types (e.g., areas that include a number of cells of one or more cell types above a threshold).

As another example, in some embodiments, determining the at least one characteristic comprises determining morphological information about at least some cells of the multiple groups of cells. In some examples, determining morphological information about at least some cells comprises determining information about the form and/or structure of the cells and/or of the tissue sample (e.g., as grouped in the multiple groups), such as the shape, structure, form, and/or size of the cells.

As another example, in some embodiments, determining the at least one characteristic comprises determining physical information for at least some cells of the multiple groups of cells (e.g., for cells of one group, cells of multiple groups, etc.), the physical information comprising at least one of a cell area, a cell perimeter, a cell size.

In some embodiments, the determined characteristics can include morphological information, spatial information, locations of tissue structures, and/or the like. The inventors have appreciated that such characteristics can be determined by creating one or more masks that can be used to analyze the cellular structure of the tissue sample, the analysis of which can in-turn be used to determine the characteristic(s) of interest. However, as noted above, typically such masks must be created manually (e.g., using signal thresholding) since computerized techniques are unable to automatically identify cells and/or cell groups in the tissue sample. By leveraging feature values to automatically determine the cell information, such as cell segments and/or cell groups, such masks can be used to analyze different cells and/or cell structures in the tissue sample that can allow the system to determine the characteristics of the tissue sample. For example, the techniques can identify a cell type in the tissue sample (e.g., T cells) and use a stromal mask to identify whether the T cells are in stromal areas and/or non-stromal areas of the tissue sample.

In some embodiments, a mask may be a binary mask. The binary mask may be a pixel-level binary mask including a 0 or a 1 (or any other suitable type of binary value) for at least some of the pixels in an MxIF image.

In some embodiments, determining the at least one characteristic may comprise determining one or more acini masks indicating locations of acini in the at least one multiplexed immunofluorescence image of the tissue sample. In some embodiments, an acini mask for an MxIF image may be a binary mask, and may include binary values for at least some of the pixels in the MxIF image, with a binary value for a pixel indicating whether or not the pixel is located in acini shown in the MxIF image.

As another example, in some embodiments, determining the at least one characteristic comprises determining one or more stromal masks indicating locations of stroma in the at least one MxIF image of the tissue sample. In some embodiments, a stromal mask for an MxIF image may be a binary mask, and may include binary values for at least some of the pixels in the MxIF image, with a binary value for a pixel indicating whether or not the pixel is located in stroma shown in the MxIF image.

As another example, determining the at least one characteristic comprises determining one or more tumor masks indicating locations of a tumor in the at least one MxIF image of the tissue sample. In some embodiments, a tumor mask for an MxIF image may be a binary mask, and may include binary values for at least some of the pixels in the MxIF image, with a binary value for a pixel indicating whether or not the pixel is located in a tumor shown in the MxIF image.

The inventors have further appreciated that it can be desirable to search for certain cell structures in a tissue sample, such as a cell structure indicative of a cancer (e.g., breast cancer, renal carcinoma, etc.). Some conventional approaches for performing cell clustering into communities use information from neighborhoods in reconstructed cell contact graphs (e.g., as described in Yury Goltsev et al., "Deep Profiling of Mouse Splenic Architecture with CODEX Multiplexed Imaging," PMID: 30078711 (August, 2018), available at pubmed.ncbi.nlm.nih.gov/30078711/). However such approaches do not provide for incorporating other information that the inventors have discovered and appreciated can be relevant to the clustering process.

The inventors have developed techniques for identifying clusters or communities of cells using a graph neural network that leverage the cell features. The cell features can include, for each cell, a cell type, cell neighbors, neighboring cell types, neighbor distance data, and/or other data as described further herein. The techniques can include identifying cell communities in a tissue sample by leveraging such cell features, and identifying information of those cells, such as cell types, distances (e.g., to provide information regarding sparsely populated cell clusters, close cell clusters, etc.). Such masks can therefore provide for discovering complex structures in tissues, which are difficult to detect otherwise (e.g., compared to using thresholding approaches), and can provide for automatic clustering at scale. Some embodiments apply a graph neural network to perform cell cluster or community detection.

In some embodiments, determining the at least one characteristic comprises determining one or more cell clusters of the tissue sample based on the multiple groups, and determining a cell cluster mask indicating locations of one or more cell clusters of the tissue sample. In some embodiments, the one or more cell clusters are determined by generating a first set of cell features (e.g., by triangulating the images to generate a graph, which is used to determine at least some of the cell features, such as cell neighbors, cell neighbor distances, etc.), embedding the first set of cell features into a higher dimensional space using a trained graph neural network, and identifying communities of cells by clustering the embedded features.

In some embodiments, determining the one or more cell clusters in the tissue sample comprises generating a graph comprising a node for each of the at least some cells, and edges between the nodes determining features for nodes in the graph, providing the features for the nodes in the graph as input to a graph neural network to obtain embedded features in a latent space, clustering the embedded features to obtain clusters of the nodes, and using the clusters of the nodes to determine the one or more cell clusters.

In some embodiments, each cell cluster of the one or more cell clusters comprises a plurality of cell types. In some embodiments, each cell cluster represents at least a part of a tissue structure of the tissue sample. In some embodiments, the tissue structure comprises mantle tissue, stromal tissue, a tumor, a follicle, a blood vessel, or some combination thereof.

In some embodiments, the method comprises determining the one or more cell clusters based on a first set of cell features of the at least some cells. The method can further include determining the first set of cell features for each cell by generating a graph comprising a node for each of the at least some cells in the tissue sample, and edges between the nodes. In some embodiments, the method further comprises generating the graph based on the at least some cells of the tissue sample using triangulation (e.g., Delanuay triangulation and/or any other type of triangulation).

In some embodiments, the method further comprises determining the first set of cell features for each node of the graph based on a group of the multiple groups that includes the cell, lengths of edges of the node in the graph, and mask data. In some embodiments, the method further comprises encoding the graph into a sparse adjacency matrix. In some embodiments, the method further comprises encoding the graph into an adjacency list of the edges of the graph.

In some embodiments, the method further comprises providing the graph as an input to a trained graph neural network, and obtaining from the graph neural network a set of feature embeddings for each node. In some embodiments, the trained graph neural network comprises one or more convolutional layers. In some embodiments, the set of feature embeddings are generated based on activations of a last graph convolutional layer of the trained graph neural network. In some embodiments, determining the one or more cell clusters comprises determining the one or more cell clusters based on the set of feature embeddings of each node. In some embodiments, determining the one or more cell clusters based on the set of feature embeddings of each node comprises clustering the cells in the tissue sample based on the set of feature embeddings of each node.

In some embodiments, the MxIF images may be preprocessed before feature values for cells are determined. In some embodiments, machine learning techniques are applied to preprocess MxIF images to remove artifacts and/or to identify information indicative of the cell locations. The inventors have appreciated that MxIF images may have artefacts introduced during imaging such as, for example, noise generated by the microscope imaging the tissue, noise from surrounding cells (e.g., fluorescence noise) in the tissue sample, noise from antibodies in the tissue sample, and/or any other types of artefacts that may be present in MxIF images. For example, a low signal to noise level can impact cell clustering, and therefore the raw MxIF images and/or the data generated by the cell segmentation process may not be sufficient for automated cell clustering. The inventors have therefore developed techniques to processing the immunofluorescence images to remove artifacts, such as by performing background subtraction to remove noise.

Accordingly, in some embodiments, background subtraction may be performed on one or more of the MxIF images. Accordingly, in some embodiments, obtaining the at least one MxIF image of the tissue sample comprises performing background subtraction on a first channel of the at least one MxIF image. In some embodiments, performing the background subtraction comprises providing the first channel as input to a second trained neural network model (e.g., a convolutional neural network, a convolutional neural network having a U-net architecture) configured to perform background subtraction. In some embodiments, the second trained neural network comprises at least one million parameters. In some embodiments, the method further includes training the second trained neural network using a set of training immunofluorescence images including noise as input images and associated output data comprising associated images without at least some noise. It should be appreciated, however, that preprocessing of MxIF images may include other types of pre-processing (in some embodiments) in addition to or (in some embodiments) instead of background subtraction, as aspects of the technology described herein are not limited in this respect. For example, preprocessing may include filtering, noise suppression, artefact removal, smoothing, sharpening, transforming to a different domain (e.g., wavelet domain, Fourier domain, short-time Fourier domain) to perform a preprocessing operation and transforming back to the image domain, and/or any other suitable type of preprocessing. In some embodiments, the techniques include removing noise from particular regions in the image, since some regions may exhibit noise more than other regions. Additionally or alternatively, in some embodiments the images can be processed on a per-channel basis (e.g., to remove noise on a per-marker basis, since different markers may exhibit different noise). In some embodiments, a trained machine learning model processes the immunofluorescence images to perform the background subtraction by thresholding the immunofluorescence images.

The inventors have further appreciated that since the MxIF image acquisition process requires repeatedly staining the same image with different markers, each time a marker is washed out of the tissue sample, local tissue damage can occur. As a result, individual cells and/or groups of cells could be damaged, such as being washed out and/or shifted relative to the original location in the sample. Using such unintentionally modified portions of the tissue sample can cause undesired effects in the image processing pipeline. For example, such damage can result in incorrect information for the damaged cells being incorporated into the feature values, cell groupings and/or determined characteristics. If performed at all, conventional techniques require manual tissue checks. The inventors have therefore developed an automated tissue degradation check for immunofluorescence images (e.g., by comparing nuclei markers obtained across multiple staining steps) to check for and/or identify area(s) of tissue damage. The identified area(s) can be ignored by subsequent steps (e.g., such as steps performed by the cell typing component 340, the cell morphology assessment component 350, and/or the characteristic determination component 360 of the image processing pipeline 300 shown in FIG. 3) to ensure that only undamaged portions of the tissue sample are analyzed by the image processing pipeline. For example, a mask can be used to skip damaged areas from processing, which can allow for tissue samples with severe damage to be processed using the techniques described herein (compared to conventional techniques, which would not be able to process such damaged tissue samples).

In some embodiments, the at least one MxIF image comprises a plurality of immunofluorescence images, and obtaining the information indicative of the locations of the cells in the at least one MxIF image comprises analyzing the plurality of immunofluorescence images to identify one or more damaged portions of the tissue sample.

In some embodiments, analyzing the plurality of immunofluorescence images comprises processing the plurality of immunofluorescence images using a third trained neural network configured to identify differences between immunofluorescence images. In some embodiments, the method further includes training the third trained neural network using a set of training immunofluorescence images comprising pairs of immunofluorescence images of the same marker as input images and associated output data comprising information indicative of whether at least a portion of the tissue sample is damaged.

In some embodiments, the method further comprises inputting a corresponding portion of each of at least two of the plurality of immunofluorescence images to the third trained neural network, wherein the at least two immunofluorescence images comprise images of a same marker, and obtaining from the third trained neural network at least one classification of the portion of the tissue sample. In some embodiments, the at least one classification comprises a set of classifications. In some embodiments, the set of classifications comprises a first classification of no cells, a second classification of undamaged cells, a third classification of damaged cells, or some combination thereof. In some embodiments, the set of classifications comprises, for each classification, an associated confidence of the classification applying to the portion, and selecting, based on the confidences, a final classification from the set of classifications for the portion.

In some embodiments, the method includes generating a patch mask indicating the final classification of the portion and final classifications for a plurality of other portions of the at least two immunofluorescence images. In some embodiments, the method further includes removing, based on the patch mask, a portion of a segmentation mask for the tissue sample so that cells of the tissue sample associated with the removed portion are not included in the multiple cell groups.

In some embodiments, the third trained neural network comprises one or more convolutional layers. In some embodiments, the third trained neural network comprises at least five million parameters. In some embodiments, the trained neural network is configured to output a confidence that different portions of the tissue sample comprise the at least one classification. In some embodiments, the at least one classification comprises a set of classifications. In some embodiments, the set of classifications comprise a first classification of no cells, a second classification of undamaged cells, a third classification of damaged cells, or some combination thereof.

The inventors have appreciated deficiencies with conventional cell segmentation approaches used to process MxIF images. To process MxIF images, conventional techniques typically perform cell segmentation based on nuclei thresholding, and require user to manually adjust settings for different images and/or to identify cell membranes (e.g., by having the user expand each nuclei by outlining the nuclei with a desired number of pixels). Examples of such conventional approaches include CellProfiler (which discussed further below with reference to FIGS. 52-53 to demonstrate improvements of the cell segmentation techniques described herein compared to CellProfiler), Ilastik (e.g., described in Stuart Berg et al., "ilastik: interactive machine learning for (bio)image analysis," (September 2019), available at www.nature.com/articles/s41592-019-0582-9), and QuPath (e.g., described in Peter Bankhead et al., "QuPath: Open source software for digital pathology image analysis," (Dec. 2017), available at www.nature.com/articles/s41598-017-17204-5). Some conventional approaches may use neural networks, but the use of such neural networks is typically limited to nuclei detection, and therefore conventional approaches do not use neural networks to determine cell segmentation information. As a result, the inventors have appreciated that conventional cell segmentation techniques suffer from various deficiencies, including requiring manual user input and producing poor and inconsistent cell segmentation results (which can have further downstream implications for step(s) that leverage the cell segmentation data, such as cell typing, cell morphology assessment, and characteristic determination).

Some embodiments include executing a trained neural network to generate cell segmentation data. The trained neural network is tailored to MxIF images, including by training the network using images with different densities of cells. As a result, the techniques do not require users to manually adjust settings for individual immunofluorescence images since the trained model can be robust to signal perturbations. Such techniques can therefore provide for processing large volumes of immunofluorescence images quickly (e.g., compared to conventional techniques, which require manual adjustment and curation for each step).

In some embodiments, obtaining the information indicative of the locations of the cells in the at least one MxIF image comprises applying a fourth trained neural network to at least one channel of the at least one MxIF image to generate the information indicative of the locations of the cells. For example, in some embodiments, a neural network model (e.g., a convolutional neural network) may be applied to identify cell boundaries in one or more of the immunofluorescence images. The output of the neural network may identify the boundary of a cell in any suitable way, for example, by identifying pixels showing the cell boundary and/or by identifying pixels at least partially (e.g., partially or fully) within the cell boundary. In order to identify cell boundaries, the neural network model may be applied to one or more immunofluorescence images that were generated using membrane markers. In some embodiments, the fourth trained neural network is implemented using a U-Net architecture or a region-based convolutional neural network architecture. In some embodiments, the fourth trained neural network comprises at least one million parameters.

In some embodiments, the fourth trained neural network (e.g., CNN) may have been trained using a set of training immunofluorescence images of tissue samples as input images and associated output images comprising information indicative of locations of cells in the input images. Any suitable training technique for training neural networks may be applied, as aspects of the technology described herein are not limited in this respect.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect. For example, various figures describe various processes and sub-processes that can be performed according to the techniques described herein, which can be used both individually and/or in combination with each other.

Each of the multiple processes and sub-processes can be performed on the same MxIF image(s) and/or using one or multiple types of information determined based on the MxIF image(s). Characteristics described herein can be obtained from the same set of MxIF image(s) and/or the same tissue sample.

The techniques developed by the inventors constitute a substantial improvement to conventional techniques for processing MxIF images. As described herein, some of the techniques involve using machine learning methods to perform one or more of: identifying cell types of tissue cells, determining cell segmentation data (e.g., data indicative of the locations of cells in the tissue sample, the size and/or shape of the cells, a cell segmentation mask, etc.), checking for tissue damage during the MxIF staining process (e.g., by analyzing images taken during different staining steps), identifying communities of cells (e.g., groups of cells that represent different structures in the tissue sample, and may be of different cell types), and/or removing noise from MxIF images for MxIF image processing (e.g., removing background noise).

The use of these machine learning methods provides for a fully automated MxIF image processing pipeline that was not otherwise possible with conventional techniques. As described herein, the machine learning models include trained neural networks to perform such methods. The neural networks are trained with large training data sets with specific input data and associated output data that the inventors discovered and appreciated provide for training machine learning techniques to perform the methods described herein. For example, the inventors discovered that a neural network can be trained to take as input (a) an image with nuclei information (e.g., a DAPI image), (b) an immunofluorescence image (e.g., of cell membranes, cytoplasm, etc.), and (c) information about the location of the cell in the images, and to provide as output the likelihood that the cell is expressed by markers of the input image(s). The likelihood(s) can be used to generate a marker expression signature for the cell under analysis, which in turn can be compared to cell typing data to predict the cell type. As another example, the inventors discovered and appreciated that a graph neural network can be trained to take as input a graph with nodes that represent the tissue cells and to output higher dimensional data that can be used to group cells into communities. The graph can include, for each node, data for the associated tissue cell, such as which group of the multiple groups the cell belongs to, cell location information, and average edge length for edges of the node in the graph. The graph neural network can embed the node data into a higher dimensional space that can be used to cluster cells into cell communities. As a result, the trained neural network can identify tissue structures that are not otherwise identifiable using conventional techniques. These and other examples are described further herein.

The neural networks are trained using such training data to determine the ultimate parameters of the neural network that allow the trained neural network to perform its associated function. Such machine learning models have a massive number of parameters, such as hundreds of thousands of parameters, millions of parameters, tens of millions of parameters, and/or hundreds of millions of parameters as described herein. As a result, and as described further herein, the trained neural networks can perform tasks in an automated and repeatable manner, and with high accuracy (e.g., since the trained neural networks are trained using training data that results in the models being sufficiently robust so as not to be affected by imaging noise and/or signal level distribution differences in the imaging data).

Figure 2:
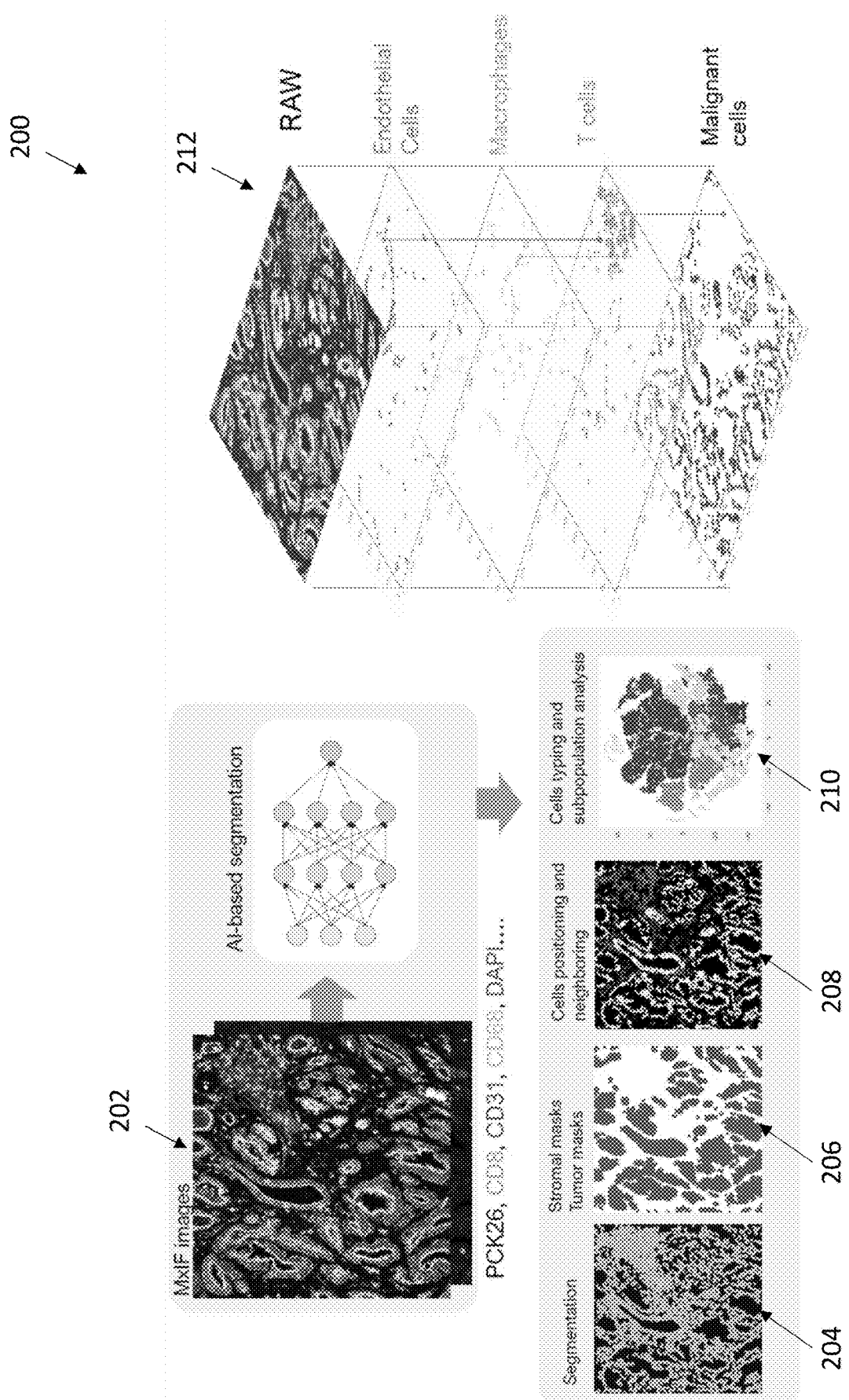
FIG. 2 is a diagram showing exemplary MxIF images and related data that can be generated by processing the MxIF images, according to some embodiments of the technology described herein.

FIGS. 1 and 2 are overviews of the techniques described herein. FIG. 1 is a diagram pictorially illustrating an exemplary system 100 for MxIF image processing, according to some embodiments of the technology described herein. A microscope 110 and computing device 112 are used to obtain a set of one or more MxIF images 102 of a tissue sample, which in this example include the fluorescent markers for anti-human CD31 antibody, CD8 T cells, CD68 antibodies, and NaKATPase. In some embodiments, the different markers can be shown in different colors in the MxIF Images 102. For example, CD31 antibodies can be shown in red, CD8 T cells can be shown in green, CD68 antibodies can be shown in magenta, and NaKATPase can be shown in gray. The computing device 112 transmits the MxIF images 102 over network 114 to computing device 116.

The tissue sample can be any biological sample obtained from a subject, including but not limited to blood, one or more fluids, one or more cells, one or more tissues, one or more organs (e.g., which can include multiple tissues), and/or any other biological sample from a subject. The tissue sample can include cellular material (e.g., one or more cells of one or more cell types) and/or extracellular material (e.g., an extracellular matrix connecting the cells together, cell-free DNA in an extracellular component of the tissue, etc.). As described herein, the tissue sample can be analyzed in vitro at the tissue level and/or at the cellular level.

It should be appreciated that an MxIF immunofluorescence image described herein can include one or more immunofluorescence images of a same tissue sample. For example, an MxIF image can be a single, multi-channel image of the same tissue sample (e.g., where each channel is associated with a different marker). As another example, an MxIF image may include multiple images (e.g., each of which may have one or multiple channels) of the same tissue sample. Referring to the one or more MxIF images 102, for example, in some embodiments MxIF image 102 is a single image with multiple channels for each of the CD31, CD8, CD68, and NaKATPase markers (e.g., such that MxIF image 102 is a four channel image). As another example, MxIF images 102 can include a separate immunofluorescence images for each marker, such that there are four one-channel images. As a further example, MxIF images 102 can include one or more immunofluorescence images with multiple channels (e.g., two MxIF images that each have two channels, and/or the like).

While not shown in FIG. 1, various other types of markers can be used, including any marker known in the art to identify cellular structures or compartments (such as, e.g., membrane markers, cytoplasm markers, nuclear markers, etc.). A marker may be a gene (e.g., DNA or RNA encoding a protein) or a protein. Markers may be intracellular markers (e.g., intracellular proteins), membrane markers (e.g., membrane proteins), extracellular makers (e.g., extracellular matrix proteins), or a combination of two or more thereof. Other examples of markers include markers for PCK26 antibodies, DAPI (for DNA), Carbonic anhydrase IX (CAIX), S6, CD3, and/or the like. Further examples of markers include the following genes (and proteins encoded by such genes): ALK, BAP1, BCL2, BCL6, CAIX, CCASP3, CD10, CD106, CD11b, CD11c, CD138, CD14, CD16, CD163, CD1, CD1c, CD19, CD2, CD20, CD206, CD209, CD21, CD23, CD25, CD27, CD3, CD3D, CD31, CD33, CD34, CD35, CD38, CD39, CD4, CD43, CD44, CD45, CD49a, CD5, CD56, CD57, CD66b, CD68, CD69, CD7, CD8, CD8A, CD94, CDK1, CDX2, Clec9a, Chromogranin, Collagen IV, CK7, CK20, CXCL13, DC-SIGN, Desmin, EGFR, ER, ERKP, Fibronectin, FOXP3, GATA3, GRB, GranzymeB, H3K36TM, HER2, HLA-DR, ICOS, IFNg, IgD, IgM, IRF4, Ki67, KIR, Lumican, Lyve-1, Mammaglobin, MHCI, p53, NaKATPase, PanCK, PAX8, CNAP, PBRM1, PD1, PDL1, Perlecan, PR, PTEN, RUNX3, S6, S6P, SMA, SMAa, SPARC, STAT3P, TGFb, Va7.2, Vimentin, and/or other marker(s). Markers can be detected using labeled antibodies or other labeled binding agents that can selectively bind to a marker of interest. The labeled binding agents (e.g., labeled antibodies) can be labeled with luminescent (e.g., fluorescent), chemical, enzymatic, or other labels. As a result, the tissue images described herein can be obtained using signals from various types of markers, including fluorescent, chemical and/or enzymatic markers. It should therefore be appreciated that in some embodiments the images described herein (e.g., the MxIF images) can include information from non-fluorescent markers as well as fluorescent markers. However, in some embodiments, the MxIF images only include information from fluorescent signals. In some embodiments, the fluorescent information can include information from fluorescent stains (e.g., DAPI) in addition to information from fluorescent antibodies for specific markers.

In some embodiments, immunofluorescent signals from tissue or cells are obtained by contacting fluorescently labeled antibodies to tissue or cells (e.g., fixed and/or sectioned tissue or cells) and detecting fluorescent signals (e.g., using fluorescent microscopy) to determine the presence, location, and/or level of one or more markers of interest. In some embodiments, the fluorescently labeled antibodies are primary antibodies that bind directly to the markers of interest. In some embodiments, the fluorescently labeled antibodies are secondary antibodies that bind to unlabeled primary antibodies that bind directly to the markers of interest. For example, the secondary antibodies may bind to the primary antibodies if the secondary antibodies were raised against antibodies of the host species of the primary antibody. Different techniques can be used for fixing and/or sectioning tissue or cells. For example, tissue or cells can be fixed with formaldehyde or other reagents. In some embodiments, tissue can be fixed by vascular perfusion with a fixative solution. However, tissue or cells also may be fixed by immersion in a fixative solution. In some embodiments, fixed tissue or cells can be dehydrated and embedded in material such as paraffin. However, in some embodiments tissue or cells can be frozen to preserve tissue morphology as opposed to being embedded in a material such as paraffin. In some embodiments, tissue or cells (e.g., fixed, embedded, and/or frozen tissue or cells) can be sectioned, for example using a microtome. In some embodiments, sectioned tissue or cells can be mounted on microscope slides or other suitable support for fluorescent microscopy. Mounted tissue or cells (e.g., mounted sectioned tissue or cells) can be contacted with one or more primary and/or secondary antibodies (e.g., involving several incubation, blocking, and/or washing steps) to obtain labeled tissue or cells.

The computing device 116 processes the MxIF images 102. The computing device 116 processes the MxIF images 102 to generate information 104, including information that identifies the locations of cells in the tissue sample (e.g., by segmenting the image of the tissue sample into cells) and the different types of cells in the tissue sample. In some embodiments, the computing device 116 identifies multiple groups of cells in the tissue sample at least in part by (a) determining feature values for at least some of the cells using the MxIF images 102 and the information indicative of locations of the at least some of the cells (e.g., determining feature values for at least some of the cells identified by the cell location information, such as a cellular mask), and (b) grouping the at least some of the cells into the multiple groups using the determined feature values.

The computing device 116 determines one or more characteristics of the tissue sample using the multiple cell groups. In some embodiments, the computing device 116 determines information about cell types in the tissue sample. For example, the computing device 116 can determine the cell types of the cells of the multiple cell groups in the tissue sample. Examples of the cell types determined by the computing device 116 can include one or more of endothelial cells, epithelial cells, macrophages, T cells (e.g., CD3+ T cells, CD4+ T cells, or CD8+ T cells), malignant cells, NK cells, B cells, and acini cells. The computing device 116 can determine the cell types based on user input and/or using artificial intelligence techniques. For example, the computing device 116 can process the multiple cell groups using one or more trained neural networks to determine the cell type(s) in each cell group. For example, as described herein cell types can be predicted based on group information about the cells as well as other relevant information (e.g., cell shape/size, neighbors in a graph, etc.) and processed by the neural network to determine predicted cell types. As described further herein, the neural networks can be trained, for example, using sets of training data, where each set specifies input data that includes one or more cell groups and/or other relevant input data (e.g., cell shape, masks, etc.) and associated output data identifying the cell type(s) of each cell group in the input data. In some embodiments, the computing device 116 can process the multiple cell groups based on user input to determine the cell types in each group. For example, the user input can include a manual identification of cells that appear related, possible cell types of grouped cells, and/or the like.

In some embodiments, the computing device 116 can determine a percentage of one or more cell types in the tissue sample. For example, the computing device 116 can determine the percentage of one or more of endothelial cells, epithelial cells, macrophages, T cells, malignant cells, NK cells, B cells, and acini cells in the tissue sample.

The computing device 116 uses the information about the cell locations, cell types, and/or other information (e.g., information regarding physical parameters of the cells, such as cell area information, density information, etc.) to determine characteristics 106 of the tissue sample, including determining information regarding neighboring cells (e.g., neighboring cell types) and/or the organization of the cells in the tissue sample. For example, the computing device 116 can determine the neighboring cell types of cells of a cell type of interest. Such neighboring cell type information can be indicative of, for example, whether at least some of the cells of the cell type of interest are (a) closely clustered together in one or more clusters (e.g., if the cells of interest largely neighbor each other), (b) are distributed throughout the tissue sample (e.g., if the cells of interest mostly neighbor other types of cells in the tissue sample), (c) are grouped together with one or more other cell types in the tissue sample (e.g., if the cells of interest mostly neighbor the one or more other cell types in the tissue sample), and/or other cell neighbor information.

The computing device 116 determines one or more further characteristics 108 of the tissue sample based on the MxIF images, information 104 (e.g., cell type and/or cell location), and/or information 106 (e.g., cell neighbors and/or cell organization), such as statistical information (e.g., cell distribution information), spatial information (e.g., distances between cell types), morphological information, and/or the like. For example, the statistical information can include information about a distribution of at least some cells of the multiple cell types. The distribution information can include, for example, distributions between different cell types (e.g., whether two cell types are distributed near each other, are mixed with each other in one or more areas, are separated by a distance, and/or the like), distributions of one or more cell types within the tissue sample (e.g., information about one or more areas in the tissue sample of high or low concentration of the cells), and/or other distribution information.

As another example, in some embodiments the spatial information can include information about locations of at least some cells of the multiple groups of cells. For example, the spatial information can include information about a spatial organization of one or more cell types of the tissue sample (e.g., including information about cell organization in the tissue sample by cell type, compared to other cell types, and/or the like). As another example, the spatial information can include information about one or more areas of the tissue sample that include one or more cell types (e.g., areas that include a number of cells of one or more cell types above a threshold).

As a further example, in some embodiments the morphological information includes information about the form and/or structure of the cells (e.g., such as the shape, structure, form, and/or size of the cells), the form and/or structure of the tissue sample, and/or the like.

The computing devices 112 and 116 can be any computing device, including a laptop computer, desktop computer, smartphone, cloud computing device, and/or any other computing device capable of performing the techniques described herein. The network 114 can be any type of network connection, including a wired and/or wireless network connection, such as a local area network (LAN), wide area network (WAN), the Internet, and/or the like. While FIG. 1 shows two computing devices 112 and 116 in communication over network 114, it should be appreciated that other configurations can be used, such as configurations with one computing device or more than two computing devices, configurations without a network (e.g., if using just one computing device) or with more than one network, and/or other configurations.

FIG. 2 is a diagram 200 showing exemplary MxIF images and related data that can be generated by processing the MxIF images, according to some embodiments of the technology described herein. The MxIF images 202 in this example can include various markers such has those for PCK26 antibodies, CD8 T cells, CD31 antibodies, CD68 antibodies, DAPI (for DNA), and/or the like described herein. The MxIF images 202 can be processed (e.g., using AI-based techniques, as described herein) to determined various information about the tissue sample. The information can include segmentation information 204, which identifies the locations of the cells in the tissue sample. The information can include one or more masks 206 that can be applied to an image to identify features of the tissue, such as stromal masks that include information regarding the locations of stroma in the tissue sample and/or tumor masks that include information regarding tumor cells in the tissue sample. The information can also include information 208 about cell positions and/or information on cell neighbors. The information can further include information 210 about cell types and an analysis of sub-population(s) of cells. Such information can be used, as shown at 212, to process raw MxIF images 202 to identify cellular and/or histological aspects of the tissue sample, including the endothelial cells, macrophages, T cells, and malignant cells in the tissue sample.

Figure 3:
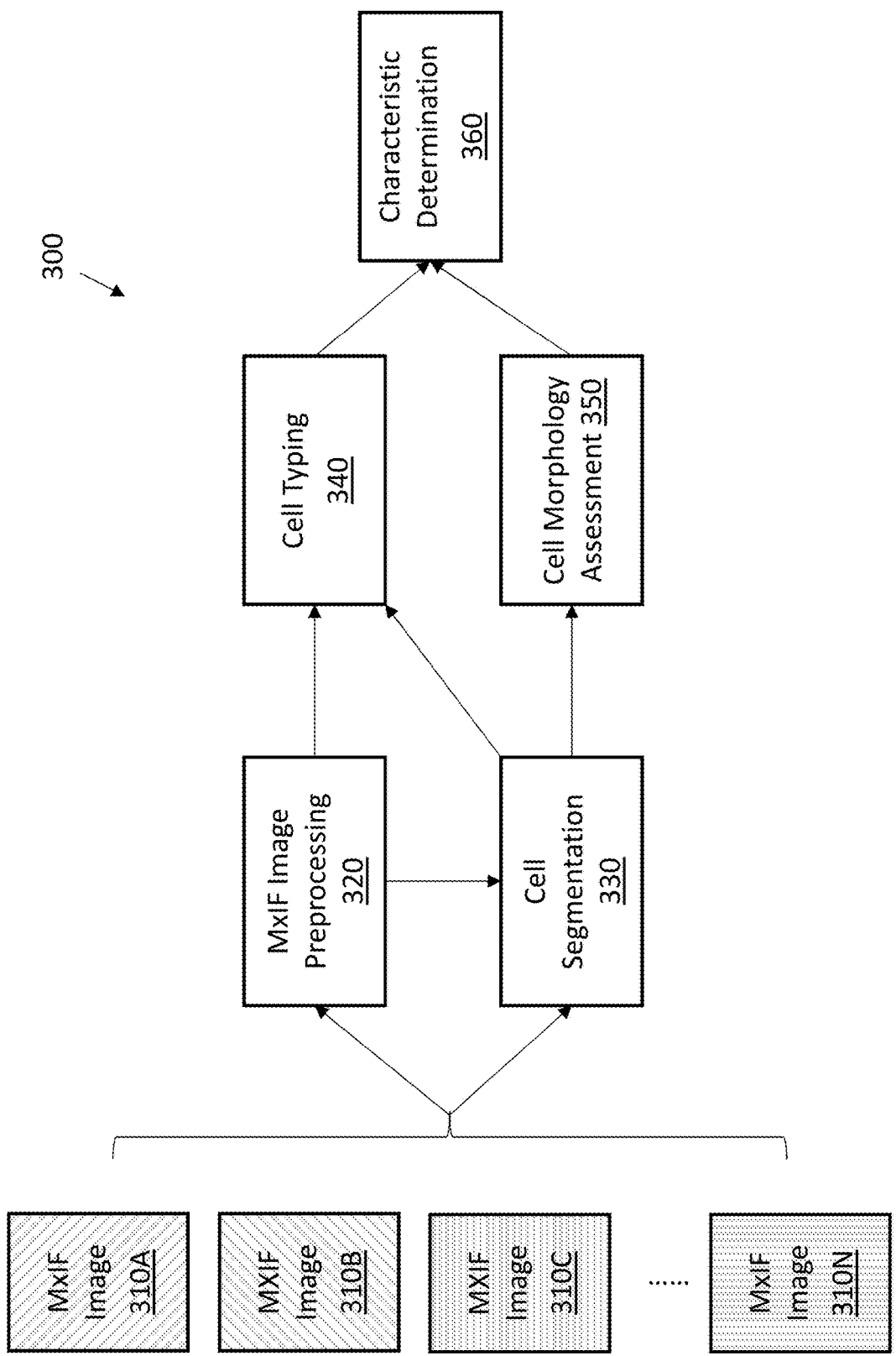
FIG. 3 is a diagram showing exemplary components of a pipeline for processing MxIF images of a tissue sample to determine characteristics of cells in the tissue sample, according to some embodiments of the technology described herein.

FIG. 3 is a diagram 300 showing exemplary components of a pipeline for processing MxIF images of a tissue sample to determine characteristics of cells in the tissue sample, according to some embodiments of the technology described herein. The MxIF images are shown as images 310A, 310B, 310C, through 310N, referred to generally herein as MxIF images 310. As explained above, each MxIF image can be an image of the fluorescence of one or more markers applied to the tissue sample. The pipeline includes an MxIF image preprocessing component 320 that performs one or more preprocessing steps on the MxIF images. The preprocessing can include one or more of background subtraction (e.g., subtracting background noise from the MxIF images), changing the image resolution, down sampling, resizing, filtering, and/or other types of image preprocessing. The pipeline also includes a cell segmentation component 330 that generates information about the locations of cells in the immunofluorescence images (e.g., by segmenting the image to identify cell locations, such as cell segmentation masks).

The pipeline also includes a cell typing component 340 that performs cell typing (e.g., determining cell types) and/or groups cells in the tissue sample into a plurality of different groups based on the cell location information from the cell segmentation component 330 and the preprocessed MxIF images from the MxIF image preprocessing component 320. The pipeline also includes a cell morphology assessment component 350 that uses data from the cell segmentation component 330. The cell morphology assessment component 350 determines parameters of the cells, such as the cell area, cell perimeter, cell size, and/or the like. The pipeline also includes a characteristic determination component 360, which uses data from both the cell typing component 340 and the cell morphology assessment component 350. The characteristic determination component 360 can determine one or more characteristics of the tissue sample, such as information regarding the distribution of cells, distances between cells, and other information as described herein. In some embodiments, the distance information may be the length of a shortest path between two cells that does not cross through another cell or structure (or portions thereof). For example, the distance information can be determined based on a closest distance along a portion of the tissue sample. For example, if two cells are separated through acini, the distance may be a measure of the distance around the acini (rather than a distance through the acini).

Figure 4A:
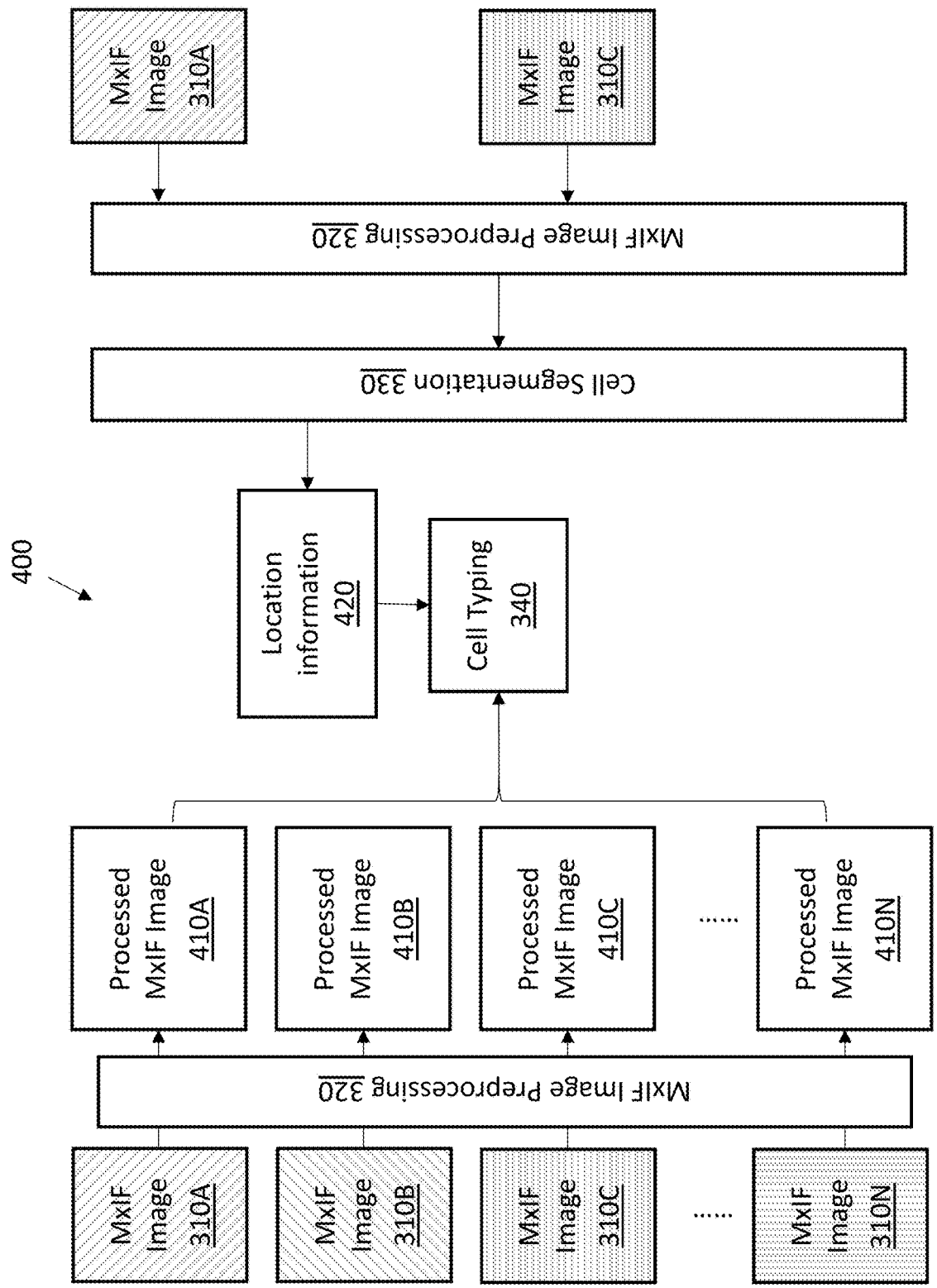
FIG. 4A is a diagram showing an exemplary processing flow of MxIF images using some of the components of FIG. 3, according to some embodiments of the technology described herein.

FIG. 4A is a diagram showing exemplary processing flow 400 of the MxIF images 300 using some of the components of FIG. 3, according to some embodiments of the technology described herein. As shown on the left of FIG. 4A, the MxIF images 310 are preprocessed using the MxIF image preprocessing component 320. In this example, the MxIF image preprocessing component 320 generates a processed MxIF image for each of the MxIF images 310, shown as processed MxIF images 410A, 410B, 410C, through 410N, respectively (which are collectively referred to herein as processed MxIF images 410). As described herein, for example, the processed MxIF images 410 can be processed, such as performing background subtraction (e.g., to remove noise). The processed MxIF images 410 are then provided to and/or otherwise made available to the cell typing component 340. While FIG. 4A shows each of the MxIF images 310 being processed by the MxIF image preprocessing component 320, this is for exemplary purposes only and is not intended to be limiting, as only one or more of the MxIF images 310 may be processed by the MxIF image pre-processing component 320.

In some embodiments, the computing device uses the separate processed MxIF images 410 to generate a combined multi-channel processed MxIF image that is used by the cell clustering component 116 (e.g., where each channel is associated with a different marker). For example, as explained above each marker image can be processed to independently perform background subtraction for each marker in said image. For example, each marker can be processed to subtract noise associated with that marker (e.g., since the noise may be different for each marker). The computing device can generate the combined image so that the cell typing component 340 can perform the cell clustering using a single image that includes a channel for each of the processed markers. Additionally, or alternatively, the cell typing component 340 can perform cell clustering using a plurality of images.

As also shown in FIG. 4A, the cell segmentation component 330 uses at least some of the MxIF images 310, shown as MxIF images 310A and 310C in this example, to generate location information 420 that is indicative of locations of cells in the tissue sample captured by the immunofluorescence images. The MxIF images 310 can also be preprocessed using MxIF image preprocessing component 320 (to generate processed MxIF images that are used by the cell segmentation component 330, which are not shown in FIG. 4A). The location information 420 can include, for example, cell segmentation data, such as cell segmentation masks. The location information 420 is provided to and/or otherwise made available to the cell typing component 340.

It should be appreciated that FIG. 4A is intended just to show an exemplary processing flow. One or more components shown in FIG. 4A could be optional (e.g., MxIF Image Preprocessing 320, cell segmentation 330, etc.) For example, while MxIF Image Preprocessing 320 is shown on both the left and right of FIG. 4A, it need not be used in either or both locations. Further, while FIG. 4A shows the cell segmentation component 330 using two MxIF images, this is for exemplary purposes only, as the cell segmentation component 330 can use any number of the MxIF images 310, including all of the MxIF images and/or the same number of MxIF images processed by the MxIF image preprocessing component 320.

Each of the MxIF images 300 can be captured using different markers (e.g., by staining the tissue with different antibody markers), such that each immunofluorescence image is captured when the tissue sample is subject to a different marker. As a result, the MxIF staining process can be cyclic and include staining the tissue sample for imaging, washing out the marker in preparation for a subsequent staining, and so on. The inventors have appreciated that each time the marker is washed out of the tissue sample, local tissue damage can occur. For example, some staining methods, such as the Cyclic Immunofluorescence (CyCIF) staining method, can be disruptive and cause some local tissue damage (e.g., due to the use of hydrogen peroxide). As a result, individual cells and/or groups of cells could be damaged, such as being washed out and/or shifted relative to the original location in the sample. Such damage can result in incorrect information for the damaged cells being processed through the image processing pipeline, beginning at the step at which the damage occurred and cascading through subsequent steps (e.g., and potentially compounded due to further damaged cell(s)). As a result, in some embodiments the techniques can include checking a tissue for degradation at one or more steps of the MxIF imaging process.

Figure 4B:
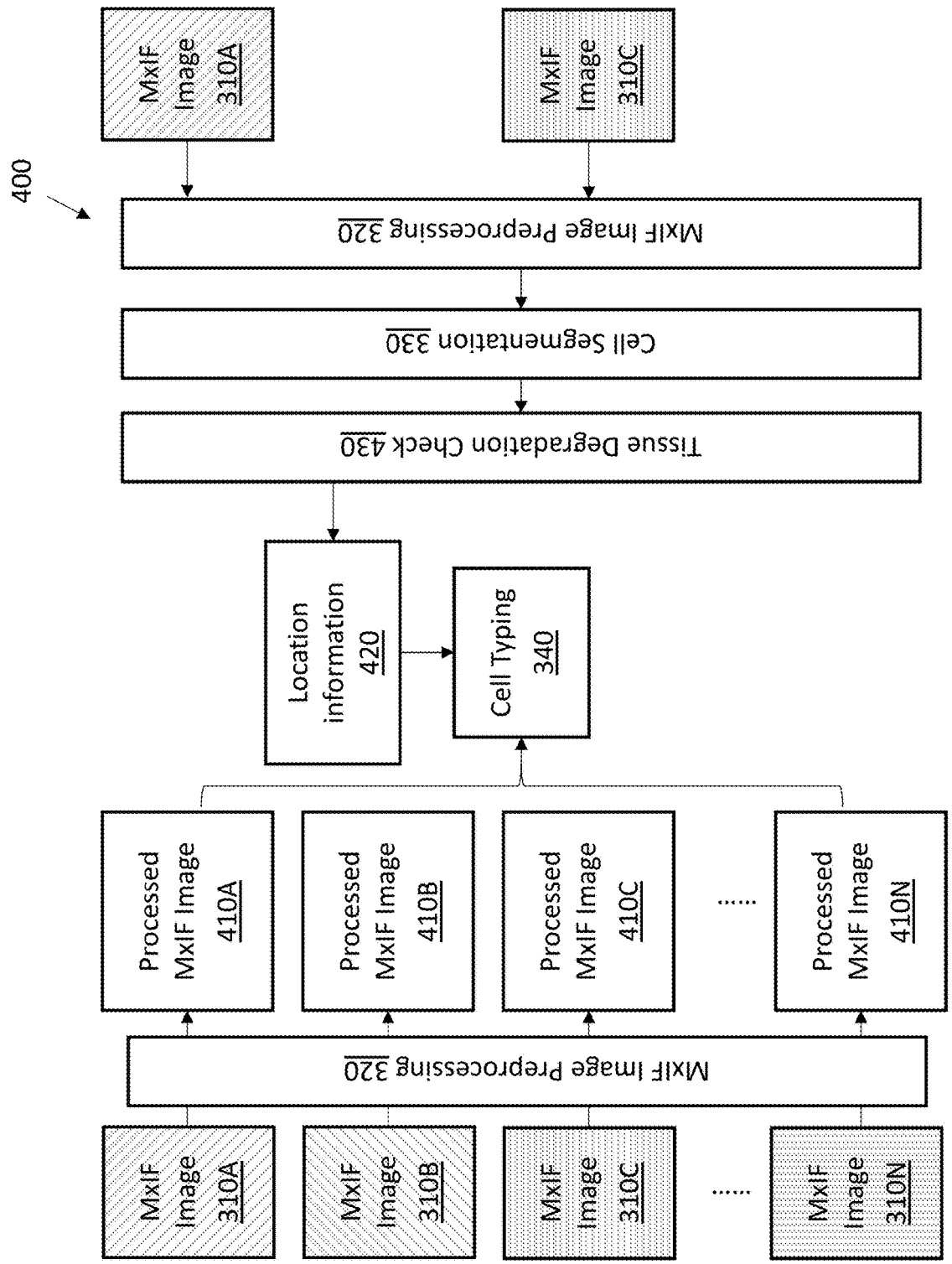
FIG. 4B is a diagram showing the exemplary processing flow of MxIF images of FIG. 4A including an optional tissue degradation check component, according to some embodiments of the technology described herein

FIG. 4B is a diagram showing the exemplary processing flow 400 of FIG. 4A that also includes a tissue degradation check component 430, according to some embodiments of the technology described herein. To avoid potential tissue damage from affecting the tissue analysis, the tissue degradation check component 430 can detect damaged cell(s) and exclude those cells from the tissue analysis. In some embodiments, cellular marker(s) of the immunofluorescence images from different stages can be compared to detect changes in the tissue structure (e.g., by comparing cell nuclei, cell boundaries, etc. over time for changes). For example, immunofluorescence images of nuclei markers (e.g., DAPI) from different stages can be compared to monitor for changes of cell nuclei locations in the tissue sample over time.

In some embodiments, the tissue degradation check component 430 can compare markers from different immunofluorescence imaging stages using a trained neural network. The neural network model can be implemented based on, for example, a ResNets model, such as that described in Kaiming He et al., "Deep Residual Learning for Image Recognition," arXiv:1512.03385v1 (Dec., 2015), available at arxiv.org/abs/1512.03385, which is hereby incorporated by reference herein in its entirety. Such a ResNets model implementation can include various numbers of parameters. Such a model can include many parameters, such as at least half a million parameters, one million parameters, or more. In some embodiments, such a model can include tens of millions of parameters (e.g., ten million parameters, twenty-five million parameters, fifty million parameters, or more). For example, the number of parameters can range from 11 to 55 million parameters based on the implementation. In some embodiments, the parameters can include at least a hundred million parameters (e.g., at least one hundred million parameters, between one million to one hundred million parameters), hundreds of million parameters, at least a billion parameters, and/or any suitable number or range of parameters. As another example, the neural network model can be implemented based on, for example, an EfficientNet model, such as that described in Mingxing Tan and Quoc Le, "EfficientNet: Rethinking Model Scaling for Convolutional Neural Networks," arXiv:1905.11946v5 (September, 2020), available at arxiv.org/abs/1905.11946, which is hereby incorporated by reference herein in its entirety. Such an EfficientNet model implementation can also include various numbers of parameters, such as half a million parameters, at least one million parameters, multiple millions of parameters (e.g., five million parameters), tens of millions of parameters (e.g., ten million parameters, twenty-five million parameters, fifty million parameters, or more). For example, the number of parameters can range from 5 to 60 million parameters. In some embodiments, the parameters can include at least a hundred million parameters (e.g., at least one hundred million parameters, between one million to one hundred million parameters), hundreds of million parameters, at least a billion parameters, and/or any suitable number or range of parameters.

In some embodiments, the trained neural network can take as input a set of immunofluorescence marker images (e.g., DAPI marker images) taken of the same tissue sample over time. The set of immunofluorescence marker images can be stained over multiple immunofluorescence imaging loops, such as each of two different loops (e.g., base and test loops). In some embodiments, the trained neural network can take as input a portion of the immunofluorescence marker images. For example, in some embodiments, the set of immunofluorescence marker images can be processed using a sliding window across the immunofluorescence images to process the images in smaller portions. The window can be of a certain width (e.g., 128 pixels, 256 pixels, etc.), height (e.g., 128 pixels, 256 pixels, etc.) and number of channels that represents the number of markers (e.g., 2, 3, 4, etc.). The sliding window can move across the immunofluorescence images in a preconfigured pattern to process the full content of the immunofluorescence images. For example, the sliding window can begin at the upper-left corner of the immunofluorescence images at a first line, move horizontally across the immunofluorescence images until reaching the right side of the immunofluorescence images, move down to a second line of the immunofluorescence images and work again from left-to-right, and so on, until reaching the bottom-right of the immunofluorescence images. The trained neural network can therefore be used as a convolutional filter for full image processing. The input marker images (or portions thereof) can be normalized, such as by using z-normalization and/or any other normalization technique as appropriate.

In some embodiments, the output of the neural network can be at least a value indicating whether the window is associated with damaged tissue (e.g., a binary value and/or a probability of whether the window is associated with damaged tissue). In some embodiments, the output can include a value for each of a plurality of classes, with at least one of the plurality of classes associated with areas showing signs of tissue damage. For example, if there are three classes (e.g., OK, EMPTY, and DAMAGED areas of the tissue sample), the output can be three values that each reflect a probability for a corresponding class of each of the windows of the immunofluorescence images. In some embodiments, for each window, the class with the highest probability is selected for that window to choose an ultimate class or categorization for the window (e.g., damaged tissue or not). The final output of the tissue degradation check process can combine the determined class for each window and generate a patch mask that reflects the various classes of relevance as described further in conjunction with FIG. 4C. As a result, in some embodiments the patch mask indicates whether tissue is damaged or not down to a granularity provided by the window size.

In some embodiments, an annotated dataset (e.g., annotated by one or more pathologists) can be used to train the neural network to classify portions of the tissue samples into a set of classes. In one example, a dataset used to train the neural network included 2500 annotated DAPI marker images (although it should be appreciated that any marker can potentially be used, as long as the same marker is used on multiple loops or steps of the imaging process). The images can be annotated using a set of classes that can be used to train the neural network to classify new data into the classes (e.g., by determining a likelihood of whether the new data corresponds to each of the classes). As described herein, in some embodiments the neural network can be trained to classify new data into, for example, a first class for empty portions of the tissue (e.g., portions without cells), a second class for unchanged portions, a third class for damaged portions, a fourth class for portions to watch over time, and/or the like. The images can be annotated using the windowing approach discussed herein, such that the images include annotations for windowed portions across the tissue sample on a line-by-line basis (e.g., essentially such that the images are divided into a grid and each block of the grid is annotated with a class). For annotating the immunofluorescence image dataset, in one example the UniversalDataTool (UDT) was used, and the windowed sub-portions of each image were classified into three classes (OK, EMPTY, DAMAGED). In some embodiments, the input images can be augmented using one or more transformations, such as affine transformations and/or other transformations as appropriate. The training process can be a supervised learning training process.

In some embodiments, the tissue degradation check component 430 can generate a patch mask of the tissue sample that represents damaged and/or undamaged portions of the tissue sample. For example, the patch mask can include portions (e.g., corresponding to the windowed portions processed by the neural network) that indicate the different classes that the portions of the tissue sample were classified into by the neural network. The patch mask can be used to filter out some and/or all of the classified portions to prevent further analysis of damaged portions of the tissue sample. For example, the patch mask can be used to filter out segmentation contours (e.g., generated by the cell segmentation module 330) from regions classified as having damage.

FIG. 4C is a diagram showing a patch mask 444 generated based on tissue degradation information determined by comparing two nucleus marker images 440A and 440B (collectively stains 440) of a same tissue sample, according to some embodiments of the technology described herein. The patch mask 444 can be generated using a tissue degradation check process, such as the processes executed by the tissue degradation check component 430 in FIG. 4B. In this example, each of the two nucleus marker images 440 are generated by imaging the tissue sample using DAPI markers during different steps or cycles of the MxIF imaging process. The window 442A in marker image 440A and the window 442B in marker image 440B depicts the window that moves across the marker images 440 to iteratively process the marker images 440 by comparing the windowed portions of the marker images 440 to check for tissue disturbances across MxIF imaging steps. The windowed portions of the marker images 440 were compared using a trained neural network, which classified patches of the tissue sample into three classes (empty, damaged, and undamaged) as described herein, and the class with the highest probability is selected for each window. The resulting patch mask 444 includes sections 444A to indicate the windowed portions of the tissue sample that were classified as mostly or entirely empty, sections 444B for the windowed portions of the tissue sample that include sufficiently undamaged tissue such that those portions of the tissue sample are OK to use for further analysis, and sections 444C that include a sufficient number of damaged cells (e.g., one or more damaged cells, a number of damaged cells above a predetermined threshold, etc.) such that the sections 444C should be excluded from further analysis.

Figure 4D:
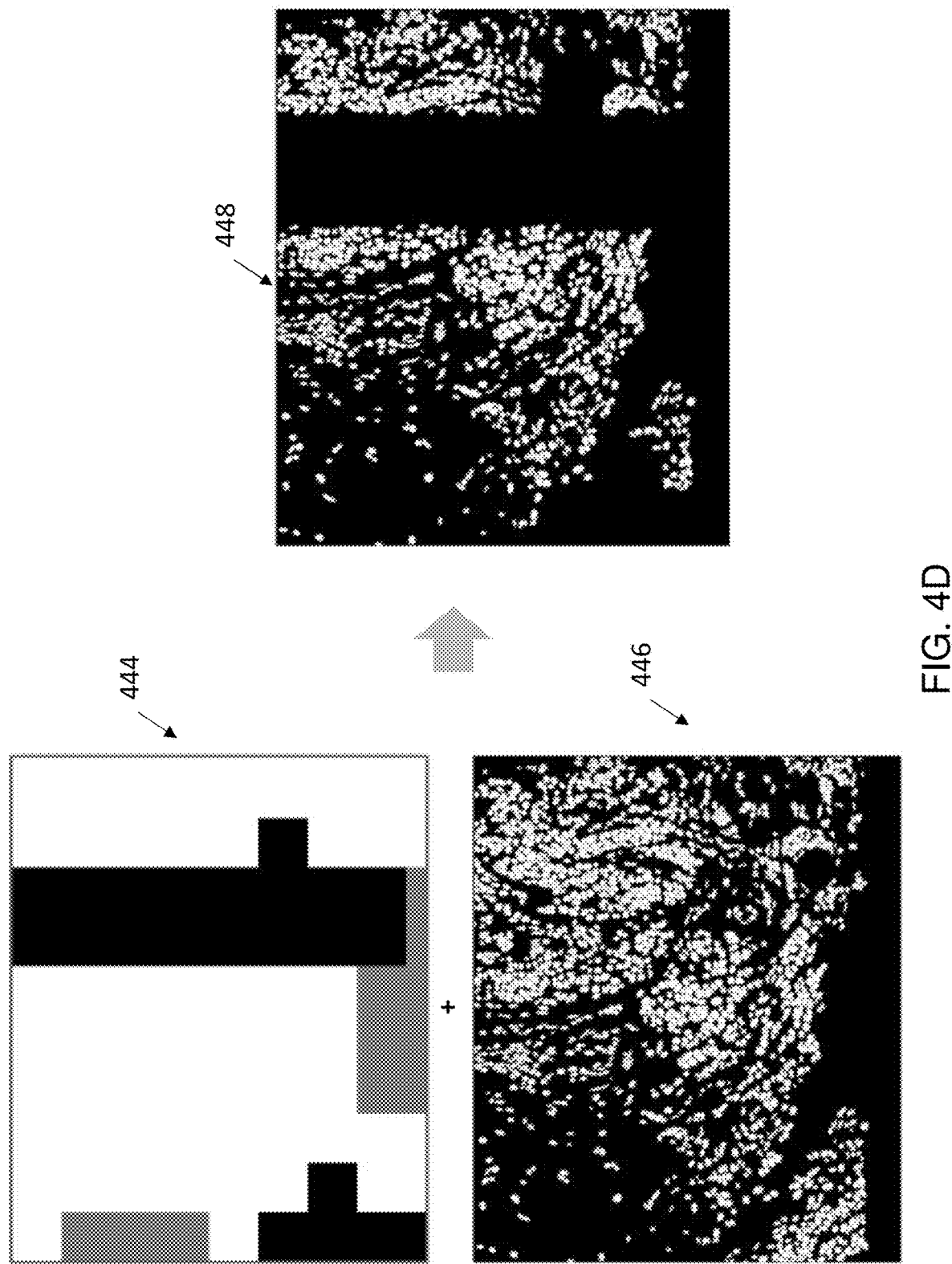
FIG. 4D is a diagram showing use of the patch mask from FIG. 4C to filter areas of a tissue sample for processing, according to some embodiments.

FIG. 4D is a diagram showing use of the patch mask 444 from FIG. 4C to filter areas of a tissue sample for processing, according to some embodiments. The patch mask 444 can be used to filter out the sections 444C that included damaged cells. As shown in FIG. 4C, the patch mask 444 is applied to the segmentation mask 446 to filter out the sections 444C. The result is filtered segmentation mask 448 that can be used in the image processing pipeline (instead of segmentation mask 446), including for cell typing and further tissue analysis as described herein. By using the filtered segmentation mask 448, the image processing pipeline (e.g., the cell typing component 340, cell morphology assessment component 350, and/or characteristic determination component 360 of FIG. 3) does not process the sections 444C that are removed from the mask for cell typing and/or characteristic determination.

It should be appreciated that while the tissue degradation check module 430 is illustrated in FIG. 4B after the cell segmentation module 330, this is for exemplary purposes only. For example, the tissue degradation check can be performed as part of the cell segmentation module 330, prior to cell segmentation (e.g., as part of the MxIF image preprocessing module 320), and/or at any other point of the process. In some embodiments, the tissue degradation check can be performed after background subtraction is performed on the MxIF images. Further, it should be appreciated that the tissue degradation check module 430 is optional and therefore a tissue degradation check need not be performed as part of the image processing pipeline.

The cell typing component 340 uses the processed MxIF images 410 and the location information 420 to perform cell typing and/or to group the cells into a plurality of groups (e.g., based on the cells exhibiting similar feature values). The plurality of groups can be used by the characteristic determination component 360 to determine one or more characteristics of the tissue sample. FIG. 5A is a flow chart showing an exemplary computerized process 500 for processing MxIF images of a tissue sample based on cell location data to group cells of the tissue sample to determine at least one characteristic of the tissue, according to some embodiments of the technology described herein. The computerized process 500 can be executed by, for example, the computing device 116 described in FIG. 1. The computing device 5100 of FIG. 51 can be configured to execute one or more of the aspects of the pipeline described in conjunction with FIGS. 3-4B for processing MxIF images.

At step 502, the computing device obtains at least one multiplexed immunofluorescence image of a same tissue sample (e.g., MxIF images 310 discussed in conjunction with FIG. 3). As described herein, the at last one multiplexed immunofluorescence image can be a single multi-channel immunofluorescence image of the same tissue sample and/or multiple immunofluorescence images of the same tissue sample (each of which may have one or multiple channels). In some embodiments, the computing device obtains the multiplexed immunofluorescence image(s) by obtaining previously-generated image(s) (e.g., accessing one or more images stored using one or more computer-readable storage devices and/or receiving one or images over at least one communication network). For example, the MxIF images may be captured by imaging the tissue sample using a microscope, stored for subsequent access prior to execution of process 500, and accessed during act 502. In other embodiments, act 502 may encompass capturing the images. The tissue sample is an in vitro sample that has been previously obtained from a patient (e.g., from a patient having, suspected of having, or at risk of having cancer).

The inventors have appreciated that it can be desirable to process the MxIF images, such as to remove noise from the MxIF images for some of the processing described herein. For example, the system may be able to perform cell segmentation (e.g., cell segmentation 330 in FIG. 3) on MxIF images without removing noise, since the noise may not affect the system's ability to determine the locations of cells in the tissue sample. However, noise may cause issues with cell clustering (e.g., performed as part of cell typing 340 in FIG. 3). For example, a low signal to noise level can impact cell clustering, and therefore the raw MxIF images and/or the data generated by the cell segmentation process may not be sufficient for cell clustering.

In some embodiments, the techniques include processing at least one of the immunofluorescence images to generate a corresponding processed image. Processing an immunofluorescence image can include performing background subtraction. The background subtraction can, for example, remove at least some noise. The noise can include, for example, noise in the image caused by the microscope that captured the image, noise caused by aspects of the tissue, such as noise due to surrounding cells (e.g., fluorescence noise), noise due to antibodies, and/or the like. In some embodiments, the images can be processed at different regions in the image. For example, noise can be removed from particular regions in the image since some regions may exhibit noise more than other regions. Additionally or alternatively, in some embodiments the images can be processed on a per-image basis and/or a per-channel basis. For example, noise can also be removed on a per-marker basis, since each marker channel may exhibit different noise.

Figure 17:
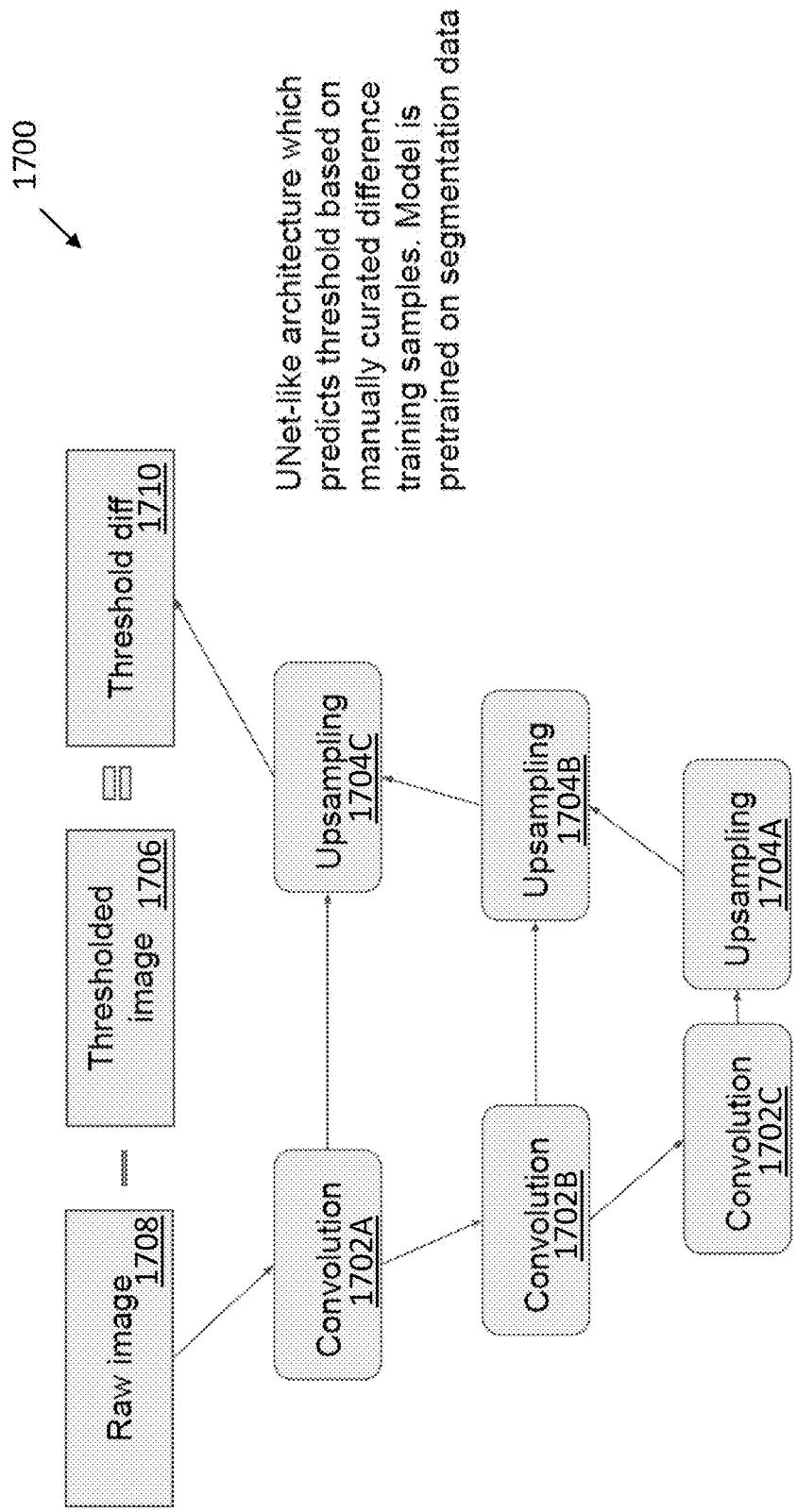
FIG. 17 is a diagram of a convolutional network architecture for predicting a noise subtraction threshold for subtracting noise from a raw immunofluorescence image, according to some embodiments of the technology described herein.

In some embodiments, the techniques can include applying a trained neural network model to each of the immunofluorescence images to remove at least some noise. FIG. 17 is a diagram of a convolutional network architecture 1700 for implementing a trained neural network that can predict a noise (e.g., for background subtraction) subtraction threshold for subtracting noise from a raw immunofluorescence image, according to some embodiments of the technology described herein. The convolutional neural network architecture 1700 can be implemented and/or executed as part of the MxIF image preprocessing, such as part of MxIF image preprocessing 120 in FIG. 1 and/or MxIF image preprocessing 320 shown in FIGS. 3-4B. The convolutional neural network architecture 1700 can be implemented and/or performed as part of other processes and sub-processes described herein. For example, the architecture 1700 can be used to remove noise as part of steps 502, 504 and/or 506 in FIG. 5A. As another example, the architecture 1700 can be used to remove noise as part of steps 612, 614 and/or 616 in FIG. 6A. As a further example, a trained neural network implemented using the architecture 1700 can be used to remove noise as part of steps 704, 706 and/or step 708 of FIG. 7A.

A neural network implemented according to the convolutional network architecture 1700 is trained to predict the threshold images 1706 based on raw input images 1708. As shown in the example of FIG. 17, the convolutional network architecture 1700 may have a "U" structure with convolutional layers 1702A, 1702B and 17002C being first applied to a sequence of successively lower-resolution versions of the raw image 1708 data (along the down-sampling path) and, second, to a sequence of successively higher-resolution versions of the raw image 1708 data (along the up-sampling path), shown as up-sampling layers 1704A, 1704B and 1704C. In some embodiments, while not shown in the convolutional network architecture 1700, the resolution of the data may be decreased (e.g., along the down-sampling path) using one or more pooling layers and increased (e.g., along the up-sampling path) using one or more corresponding unpooling layers. Such a neural network implementation can include various numbers of parameters. Such a model can include many parameters, such as at least half a million parameters, one million parameters, two million parameters, five million parameters, or more. In some embodiments, such a model can include tens of millions of parameters. For example, the number of parameters can include at least ten million parameters, twenty million parameters, twenty-five million parameters, fifty million parameters and so on, based on the implementation. In some embodiments, the parameters can include at least a hundred million parameters (e.g., at least one hundred million parameters, between one million to one hundred million parameters), hundreds of million parameters, at least a billion parameters, and/or any suitable number or range of parameters.

In some embodiments, the model can be pre-trained using noise removal information. In some embodiments, the model can be trained to use thresholding to remove noise. In such embodiments, the model can be trained using thresholded data, such as thresholded images representative of an appropriate threshold for noise removal. The training data can also include immunofluorescence images as the input images and corresponding thresholded images (with noise removed) as the output images so that the model can learn to generate the thresholded images from the raw images. For example, referring further to FIG. 17, the training data can include raw images 1708 and corresponding thresholded images 1706, which when compared have the threshold differences 1710. In some embodiments, the thresholding can be performed globally across the immunofluorescence images (e.g., after a smoothing step, such as a Gaussian smoothing step). In some embodiments, the techniques can divide immunofluorescence images into sub-images for noise removal. For example, the intensity of a marker may change across an immunofluorescence image, and therefore the threshold used for one portion of an image may be different than that used for another portion of an image. The techniques can include, for example, breaking an immunofluorescence image into a set of sub-images of a same size, such as 256×256, 512×512, 256×512, and/or the like.

Referring further to FIG. 5A, at step 504 the computing device obtains information indicative of locations of cells in the multiplexed immunofluorescence image (e.g., the cell location information 420 discussed in conjunction with FIGS. 4A-4B). The information indicative of locations of cells can include data indicative of the locations of some and/or all of the cells in the immunofluorescence image(s). In some embodiments, the cell location information can include cell boundary information, information from which cell boundary information can be derived (e.g., expression levels of one or more markers of the immunofluorescence image(s) that are expressed by, for example, cellular membranes and/or nuclei), and/or masks. In some embodiments, the cell locations for some and/or all of the cells may be the same in each of the immunofluorescence images. For example, if the immunofluorescence images are all of the same tissue sample, then the cell locations may be the same in each image. In some embodiments, the cell location information can be specified using a cell segmentation mask, which can be applied to one or more of the immunofluorescence images to identify the locations of cells in the immunofluorescence images.

In some embodiments, a mask can be a binary mask and/or multi-valued mask. A binary mask can, for example, indicate a binary value (e.g., present or not present) for one or more cells, tissue structure, and/or pixels in the imaged tissue sample. A multi-valued mask can, for example, indicate a range of values for the pixels, cells, and/or tissue structure in the imaged tissue sample. For example, a multi-value mask can be used to also indicate partial presence of a tissue component (e.g., in addition to fully present or not present components), multiple aspects of the tissue (e.g., the presence of different cells, tissue structure, etc.), and/or other non-binary information. In some embodiments, a cell boundary mask can be created based on cell boundary information obtained from the immunofluorescence images. In some embodiments, a binary cell boundary mask indicates either the presence (e.g., via a white pixel) or absence (e.g., via a black pixel or other non-white colored pixel) of detected cell boundaries in the tissue sample.

In some embodiments, the computing device accesses the cell location information. For example, the cell location information can be generated by a separate computing device and transmitted to the computing device (e.g., over wired and/or wireless network communication link(s)), stored in a memory accessible to the computing device, and/or the like.

Figure 8:
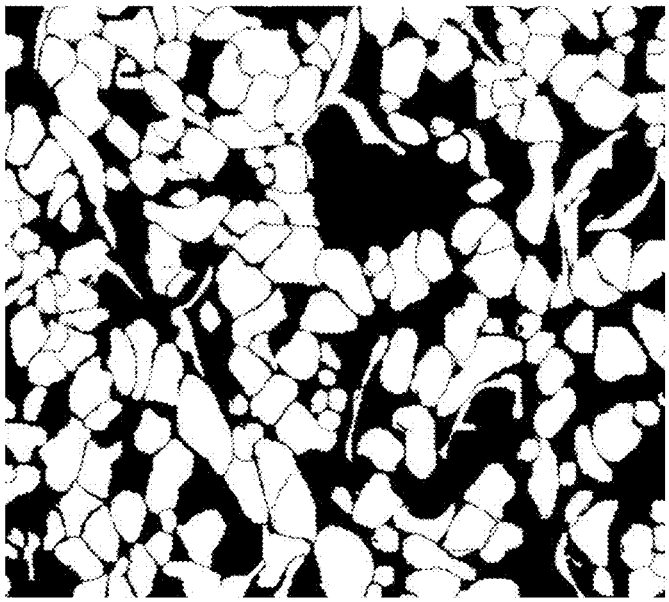
FIG. 8 shows an exemplary MxIF image and manual cell location/segmentation data for the MxIF image, according to some embodiments of the technology described herein.
Figure 8:
Figure 8:
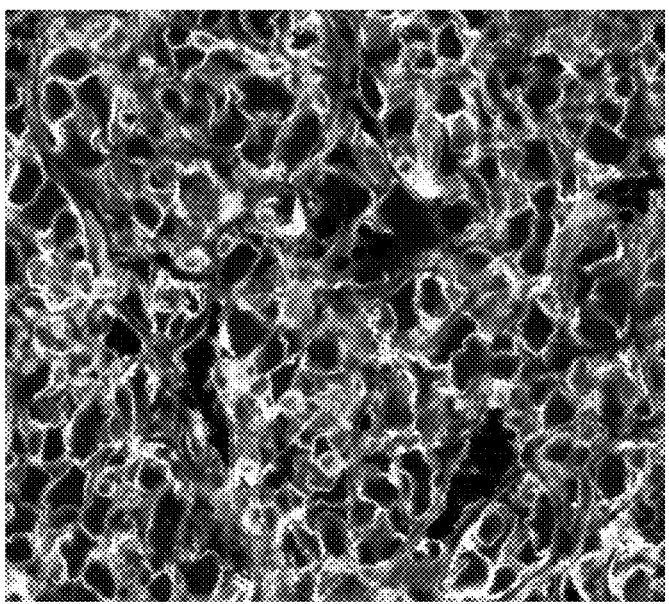

In some embodiments, the cell location information can be generated manually and accessed for use by the techniques described herein. FIG. 8 shows an exemplary MxIF image 800 and manual cell location/segmentation data 802 for the MxIF image, according to some embodiments of the technology described herein.

In some embodiments, the computing device generates the cell location information using at least one multiplexed immunofluorescence image. For example, referring to FIGS. 3-4B, the computing device can be configured to execute one or more aspects of the cell segmentation component 330 to generate the cell location information. In some embodiments, the computing device selects a set of channels of the one or more multiplexed immunofluorescence images for generating the cell location information, where each selected channel includes marker data that is indicative of cell structure information. For example, the selected channels can include data of cell membranes, cell types, cell nuclei, and/or the like, which can be used to generate the cell location information. For example, cell nuclei can be shown using DAPI, H3K36TM, and/or other markers. As another example, cell surface markers can include CD20, CD3, CD4, CD8, and/or the like. As a further example, cytoplasm markers can include S6 and/or the like. In some embodiments, a plurality of markers are used for generating cell location information. For example, the immunofluorescence markers used to generate the cell location information can include using DAPI as a cell nuclei marker, NaKATPase as a cell membrane marker, and S6 as a cell cytoplasm marker.

In some embodiments, the computing device uses machine learning techniques to generate the cell location information. For example, the computing device can apply a convolutional neural network model to one or more of the immunofluorescence image channels to generate cell location data. In some embodiments, the computing device selects the channel(s) with cell structure information, and applies the convolutional neural network model to the selected subset of the immunofluorescence images to generate the cell location information.

In some embodiments, the convolutional neural network model can include a neural network model with a "U" shape as described in conjunction with FIG. 17, such as a U-Net architecture.

In some embodiments, the neural network architecture can include a region-based convolutional neural network (R-CNN) architecture, such as a Mask R-CNN. An example of a Mask R-CNN is that described in Kaiming He et al., "Mask R-CNN," arXiv:1703.06870 (January, 2018), available at arxiv.org/abs/1703.06870, which is hereby incorporated by reference herein in its entirety. Such a model can include a large number of parameters. For example, such a model can include at least half a million parameters, at least a million of parameters, multiple millions of parameters (e.g., at least one million parameters, two million parameters, three million parameters, etc.), and/or tens of millions of parameters (e.g., at least ten million parameters, twenty-five million parameters, fifteen million parameters, etc.). For example, such a model can include forty (40) to forty-five (45) million parameters (e.g., forty million parameters, forty-two million parameters, and/or forty-five million parameters). In some embodiments, the parameters can include at least a hundred million parameters (e.g., at least one hundred million parameters, between one million to one hundred million parameters), hundreds of million parameters, at least a billion parameters, and/or any suitable number or range of parameters. The input to R-CNN model can include multiple channels, including a nuclei marker and one or more membrane markers. For example, the input can include three channels, including a nuclei marker for the first channel (e.g., DAPI), a membrane marker that is present on most cells for the second channel (e.g., CD45 or NaKAT-Pase), and an additional membrane marker with sufficient staining quality for the third channel (e.g., including CD3, CD20, CD19, CD163, CD11c, CD11b, CD56, CD138, etc.). In some embodiments, the input channels can be normalized (e.g., to be within the range of 0-1).

In some embodiments, the input image (or images) is split into intersecting squares (e.g., of size 128×128 pixels, 256×256 pixels, etc.) and processed on a window-by-window basis. In such embodiments, the network output can be an array of mask proposals for each separate cell. In some embodiments, the output can be a binary mask for each window. Additionally, or alternatively, the output can be a set of images with values that represent the probability of a given pixel being part of the cell's mask (e.g., a value in the range of 0-1). For such embodiments, the pixels of the output images can be thresholded and/or selected among using various techniques to determine the ultimate mask values. For example, if each pixel includes two probabilities that add up to 1, then the output pixels can be thresholded using a value of 0.5 to obtain the ultimate pixels for a binary mask.

In some embodiments, windows of prediction may include overlapping data. For example, windows may share data and/or intersect if a cell is located in-between window edges. Such redundancy can be avoided by processing only cells from some, but not all, portions of the windows. For example, the pixels of the center, top and right corners of each image can only be processed for each window (e.g., such that the down and right parts of the image are processed only if the current window is the last window from the right or down side). The resulting cell segments can then be aggregated into the final output mask (e.g., with integer values representing individual cell instances).

In some embodiments, the architecture (e.g., U-Net, R-CNN, etc.) can use an encoder head (e.g., as the first layer or layers of the model), such as a ResNets model as described herein (e.g., ResNet-50). As a result, multiple segmentation networks can be created with a similar and/or the same encoder head to allow for model interchangeability.

In some embodiments, the convolutional neural network model is trained using a set of training immunofluorescence images as input images and associated cell segmentation images as output images. Various training set sizes can be used for training a neural network model, such as approximately 100 images, approximately 200 images, approximately 300 images, approximately 2,000 images, 3,000 images, 4,000 images, 5,000 images, 6,000 images, 10,000 images, and/or the like. In some embodiments, the training set size can depend on the input image size, such that the training set size may range from approximately 4,000 to 5,000 images. In some embodiments, squares of images can be (e.g., randomly) sampled from original full images (e.g., and therefore fewer training images may be required). The training immunofluorescence images can be of certain tissue samples, and the cell segmentation images associated with the training immunofluorescence images can include location information for the cells in the tissue samples. In some embodiments, the neural network model can be trained using multi-channel images and/or single channel images as the input images.

Figure 9:
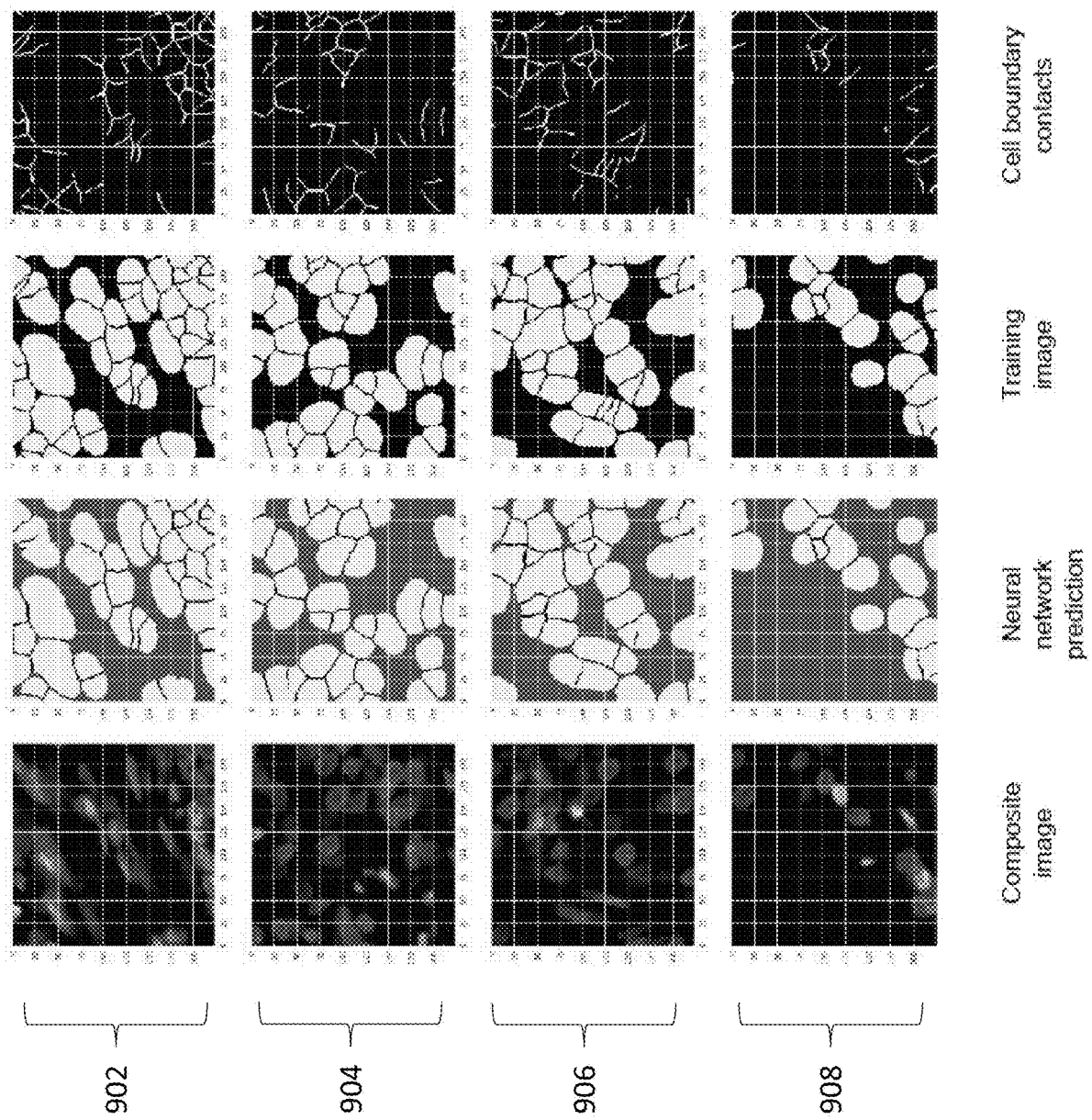
FIG. 9 shows examples of images that can be used to train a neural network to identify cell location information, according to some embodiments of the technology described herein.

The training images may include a plurality of markers, one marker for each channel. For example, a three-channel image (or images) can be used as described herein, where the first channel is a nuclei marker, the second channel is a membrane marker expressed by most cells for tissue type(s) of interest, and the third channel is an additional membrane marker. For example, three-channel images can be created using DAPI, NaKATPase, and S6 markers. The corresponding output images used for training can be manually-generated sample output images (e.g., cell location information, such as cell segmentation masks with outlines of cell contours). In some embodiments, the training set (e.g., including the input images and/or associated output images) can be preprocessed for training. For example, a preprocessing step can be performed on the training output images to detect bordering cells (e.g., which can include cells with a number of intersecting pixels greater than a threshold, such as greater than 3 pixels of the cell borders). FIG. 9 shows examples of images that can be used to train a neural network to identify cell location information, according to some embodiments of the technology described herein. Each set of images 902, 904, 906 and 908 shows the composite immunofluorescence image, the corresponding neural network prediction image of the cell locations, the training image of the cell locations used to train the neural network, and an image of the cell boundary contacts (e.g., where the cells contact other cells).

The neural network model can be trained using various backpropagation algorithms. In some embodiments, the convolutional neural network is trained using a backpropagation algorithm with ADAM optimizer with 0.001 learning rate. At each training step, the neural network model is trained with multi-channel input images to produce cell location information. For example, in some embodiments the neural network model can be trained using three-channel input images to produce two-channel output images (e.g., one channel with a segmentation map and another channel with a boundary cell contact map) that closely match the associated training output images. The neural network model can be trained using various loss functions. For example, a categorical cross-entropy loss function can be used since the model is performing a pixel classification task.

Figure 10:
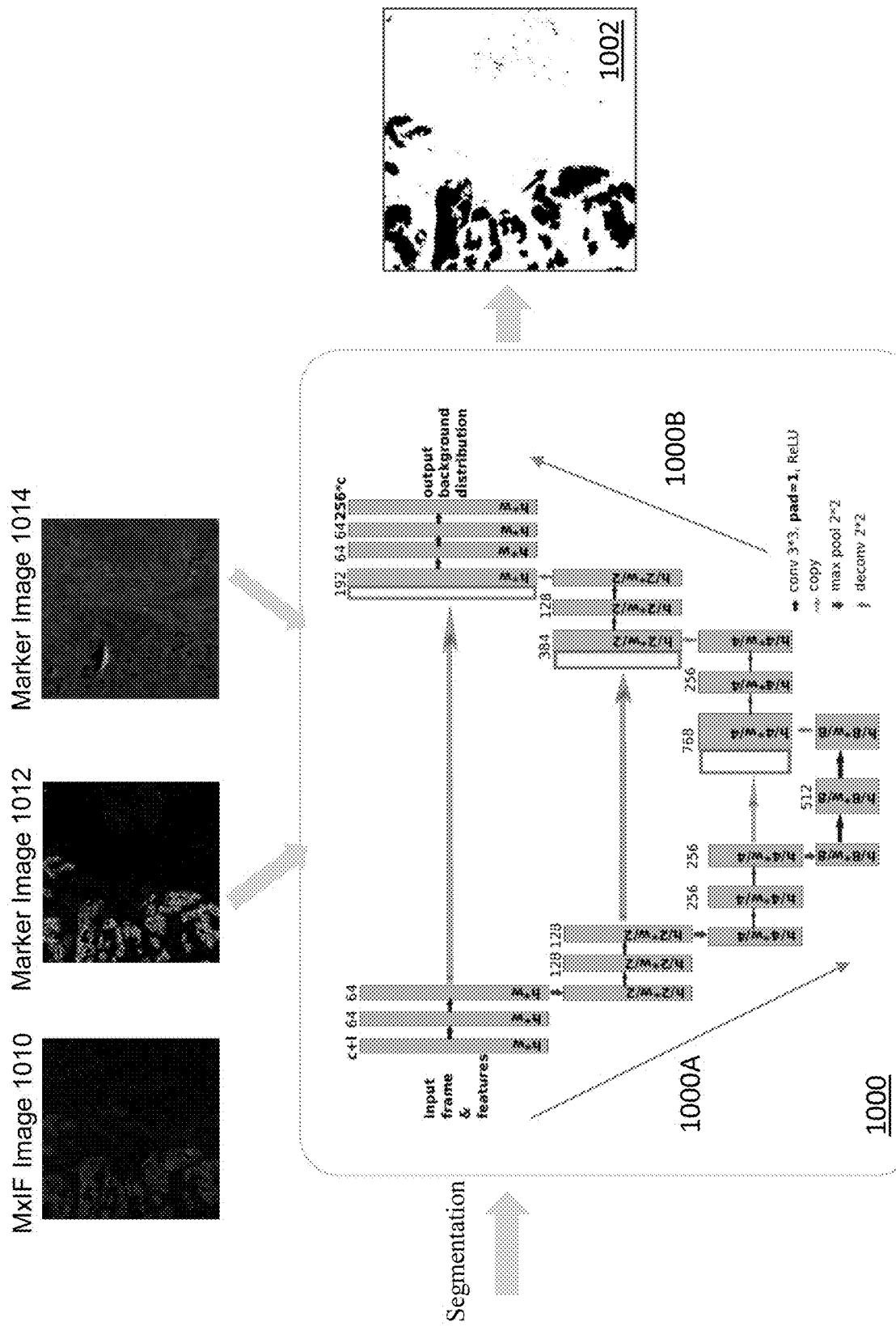
FIG. 10 is a diagram pictorially illustrating an example of using a convolutional neural network model to process MxIF images obtained of a tumor to generate cell segmentation data, according to some embodiments of the technology described herein.

FIG. 10 is a diagram pictorially illustrating an example of using a trained convolutional neural network model 1000 to process MxIF images obtained of a tumor to generate cell segmentation data 1002, according to some embodiments of the technology described herein. In the example of FIG. 10, the MxIF image 1010 includes a first marker image 1012 and a second marker image 1014. The computing device uses the trained neural network model 1000 to process the first marker image 1012 and the second marker image 1014 to generate the cell location/segmentation information 1002.

As described in conjunction with FIG. 17, the convolutional neural network model has a "U" structure in which convolutional layers are applied to successively lower-resolution versions of the data along the down-sampling path 1000A and, then, to successively higher-resolution versions of the data along the up-sampling path 1000B. As indicated by the red arrows, the resolution of the data may be decreased along the down-sampling path 1000A using one or more pooling layers. As indicated by the green arrows, the resolution of the data may be increased along the up-sampling path 1000B using one or more corresponding unpooling layers.

Figure 11:
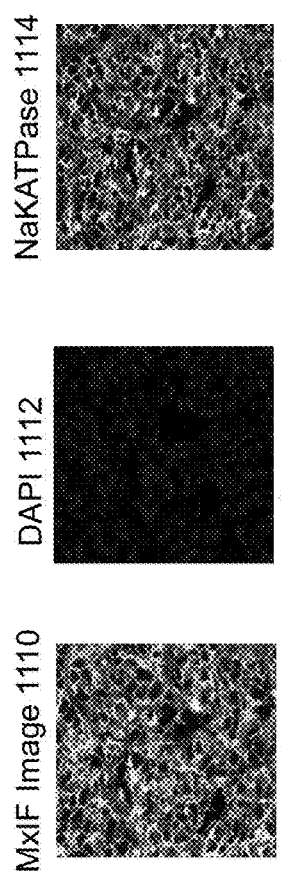
FIG. 11 is a diagram pictorially illustrating another exemplary use of a neural network to process immunofluorescence images to generate cell location/segmentation data, according to some embodiments of the technology described herein.
Figure 11:
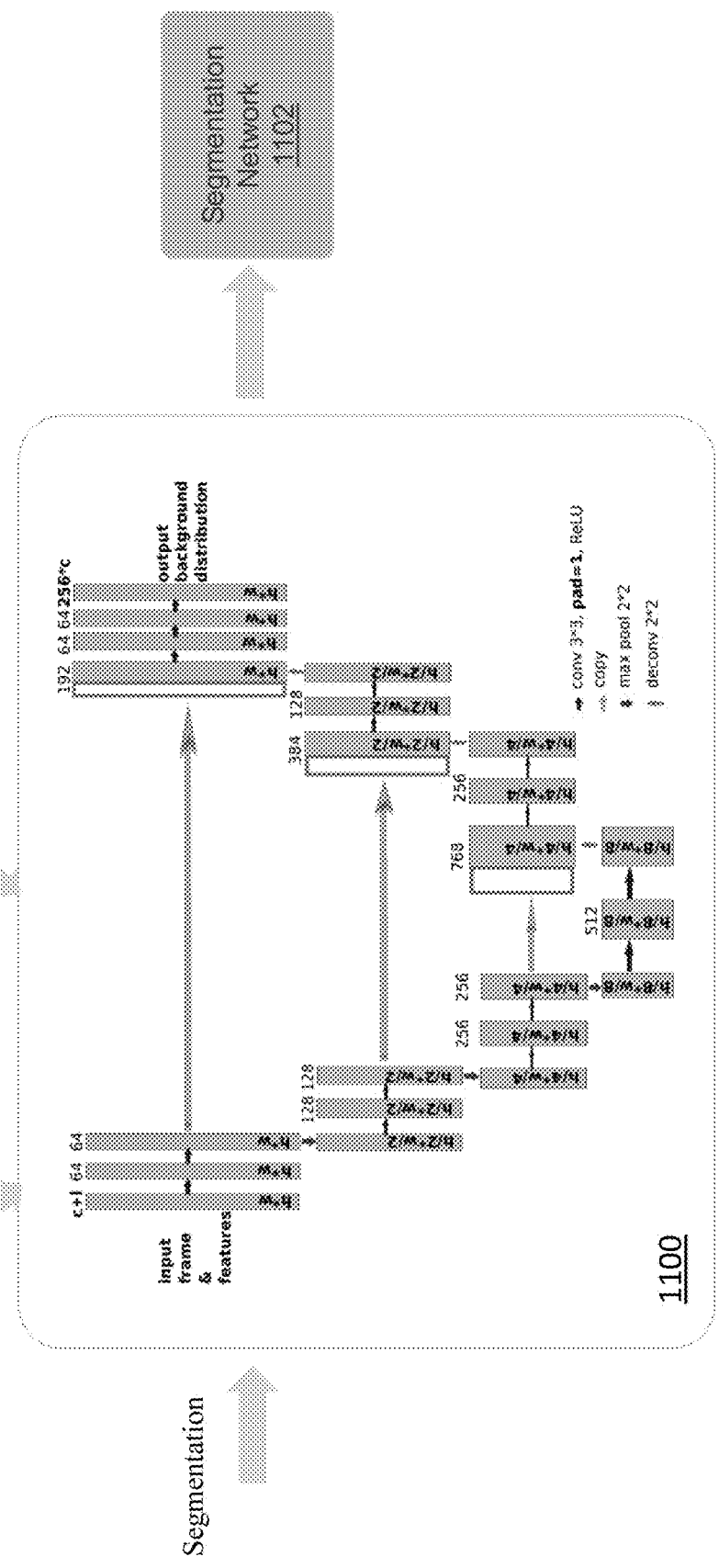

FIG. 11 is a diagram pictorially illustrating another exemplary use of a trained neural network 1100 to process immunofluorescence images to generate cell location/segmentation data 1102, according to some embodiments of the technology described herein. In this example, the MxIF image 1110 includes DAPI marker image 1112, and NaKATPase marker image 1114, where DAPI is a fluorescent DNA stain and NaKATPase is a membrane marker. It should be appreciated that DAPI, NaKATPase, and/or other markers can be used. For example, other markers can include a cytoplasm marker S6, a membrane marker PCK26, Carbonic anhydrase IX (CAIX), CD3, and/or the like. The computing device uses the trained neural network 1100 to process the DAPI marker image 1112 and the NaKATPase marker image 1114 to generate the cell location/segmentation information 1102.

Figure 12:
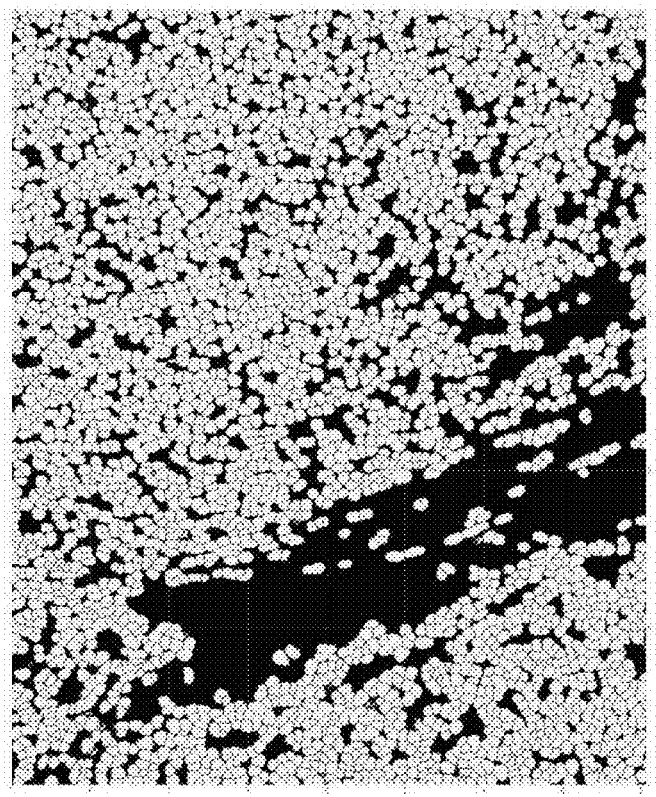
FIG. 12 shows a MxIF image and cell segmentation data generated based on the MxIF image, according to some embodiments of the technology described herein.
Figure 12:
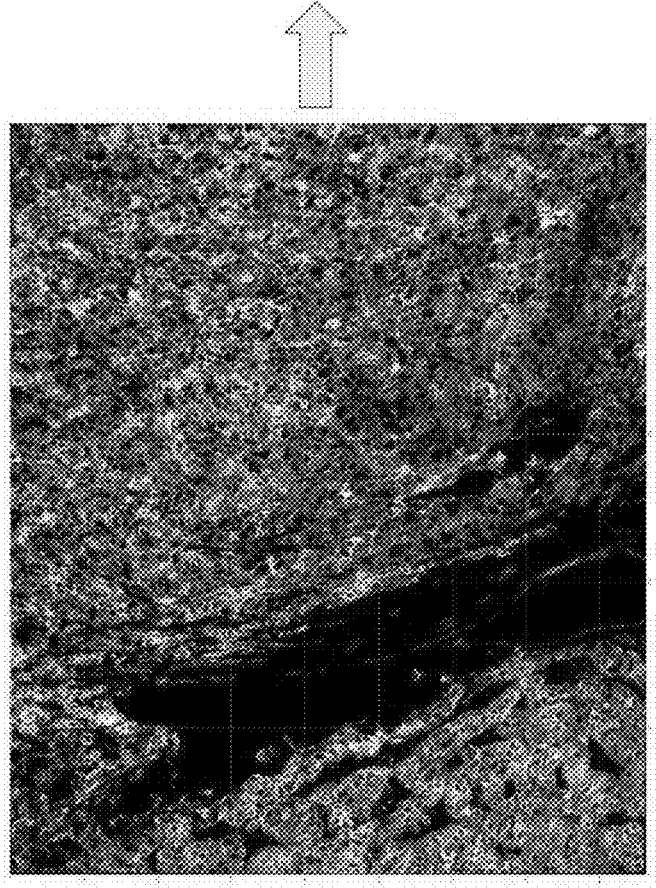
Figure 13:
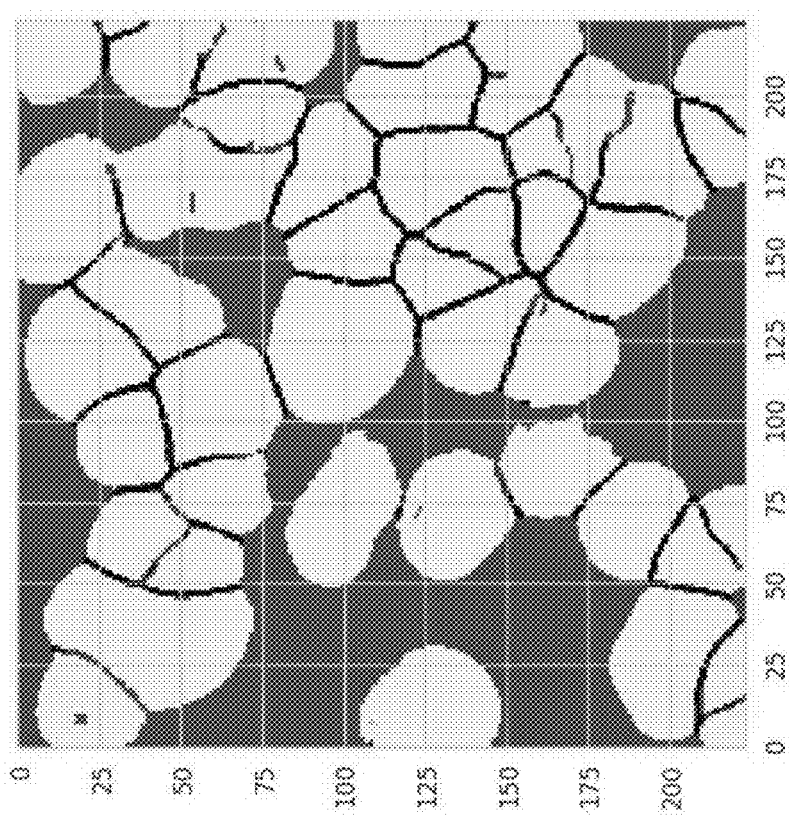
FIG. 13 shows a composite fluorescence image and cell segmentation data generated based on the composite fluorescence image, according to some embodiments of the technology described herein.
Figure 13:
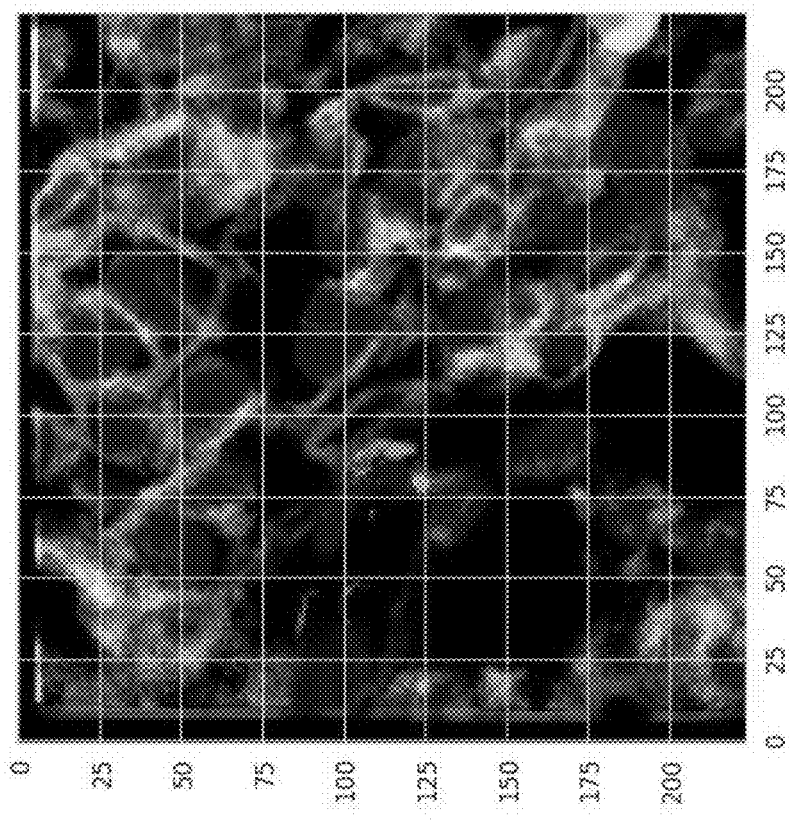
Figure 14:
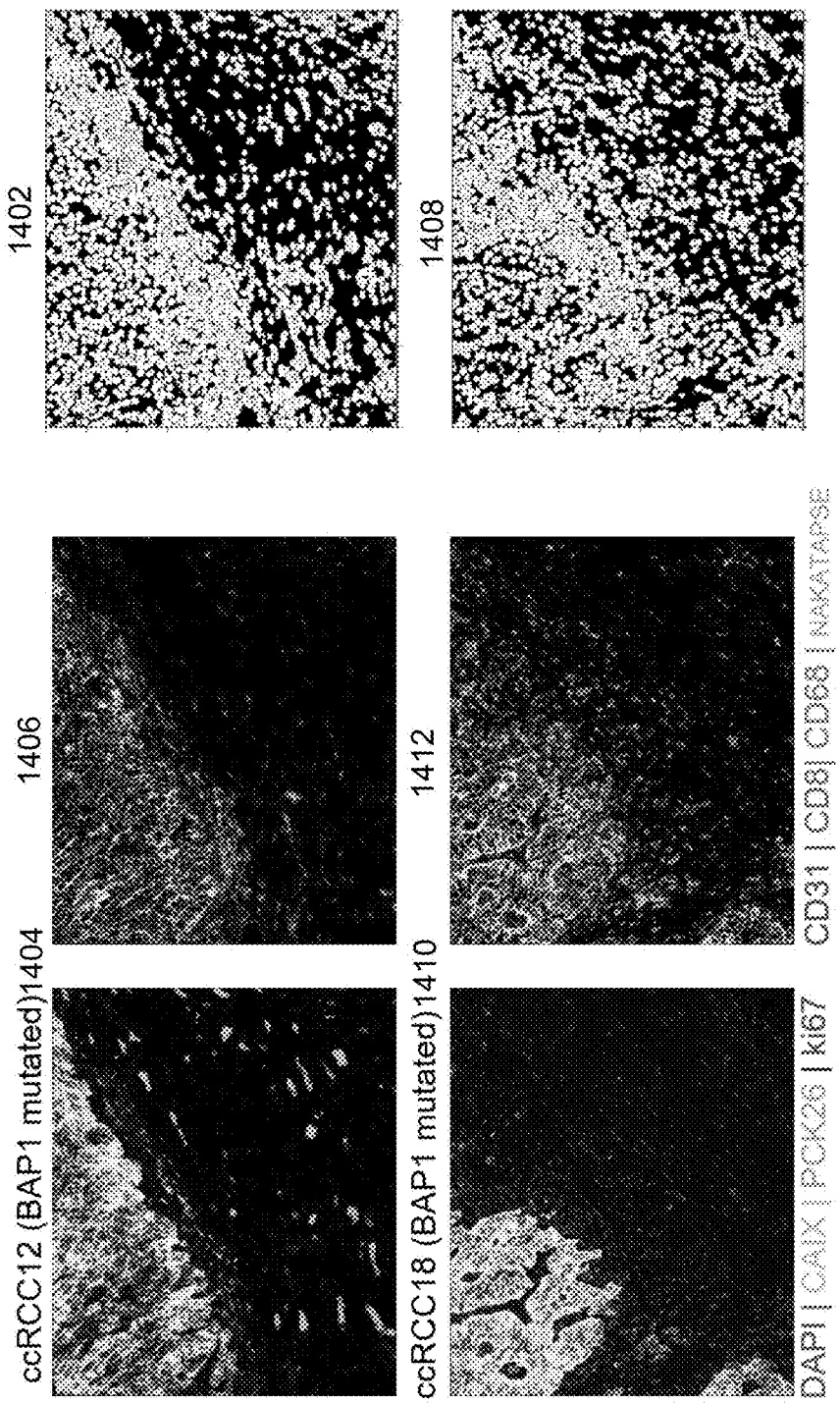
FIG. 14 is a diagram showing exemplary cell segmentation data for exemplary MxIF images obtained of kidney tissue, according to some embodiments of the technology described herein.

FIGS. 12-16 show examples of immunofluorescence images and associated cell location information (e.g., in this example, cell segmentation masks), according to some embodiments of the technology described herein. The cell location data can be accessed by the system and/or generated by the system, such as by the cell segmentation module 330 of FIG. 3. FIG. 12 shows a MxIF image 1200 and cell segmentation data 1202 generated based on the MxIF image 1200, according to some embodiments of the technology described herein. FIG. 13 shows a composite fluorescence image 1300 and cell segmentation data 1302 generated based on the composite fluorescence image, according to some embodiments of the technology described herein. FIG. 14 is a diagram showing exemplary cell segmentation data for exemplary MxIF images obtained of kidney tissue, according to some embodiments of the technology described herein. The exemplary cell segmentation data 1402 was determined based on MxIF images 1404 and 1406, and exemplary cell segmentation data 1408 was determined based on MxIF images 1410 and 1412. Images 1404 and 1410 include DAPI, CAIX, PCK26, and ki67 protein markers. Images 1406 and 1412 include CD31, CD8, CD68 and NaKATPase markers.

Figure 15:
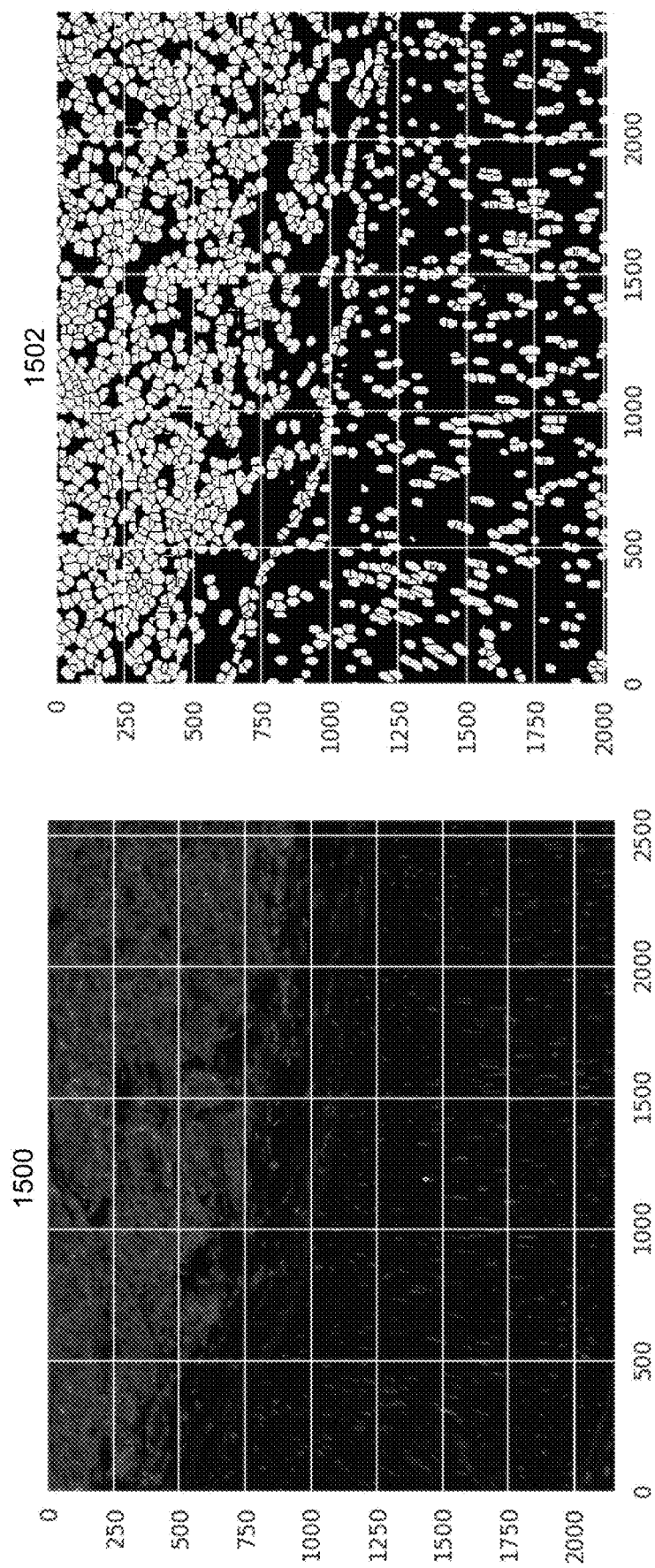
FIG. 15 shows a clear cell renal cell carcinoma (CCRCC) MxIF image and corresponding cell segmentation data, according to some embodiments of the technology described herein.
Figure 16:
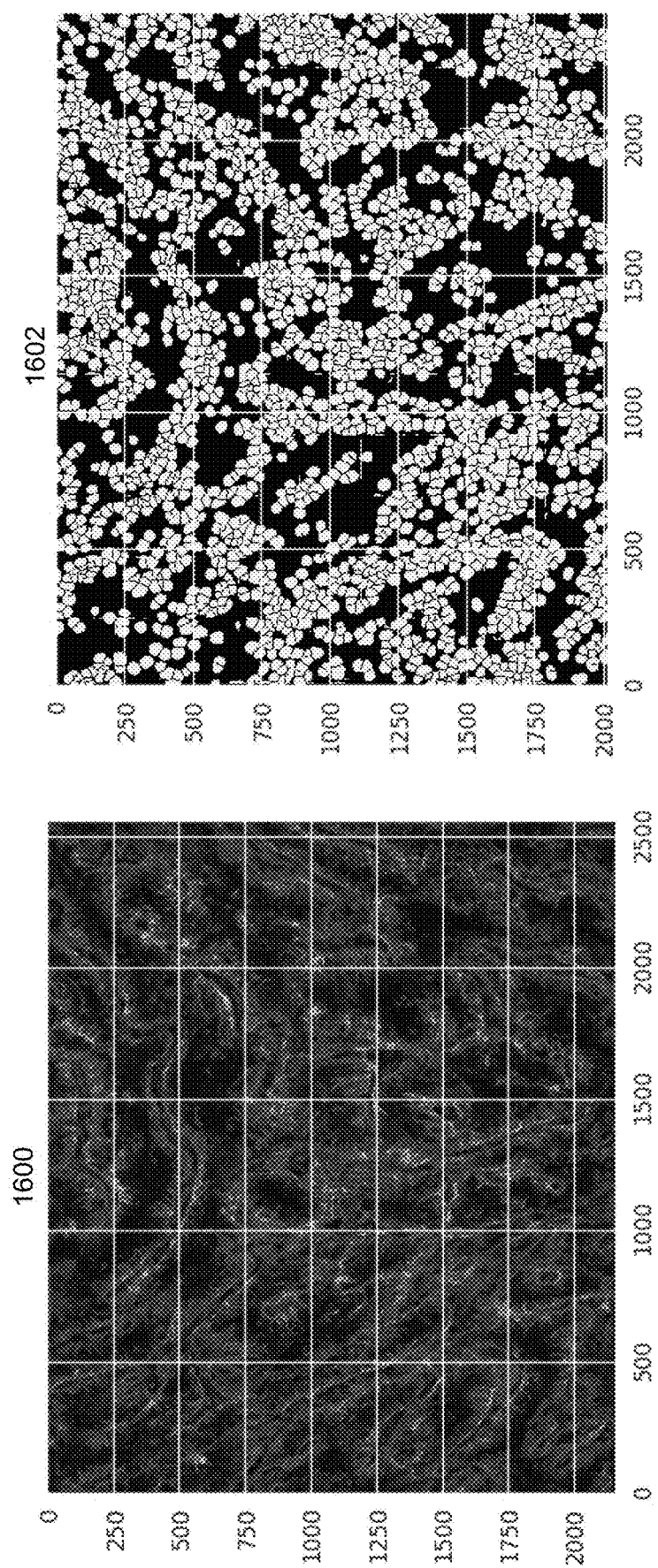
FIG. 16 shows a CCRCC MxIF image and corresponding cell segmentation data, according to some embodiments of the technology described herein.

FIG. 15 shows a clear cell renal cell carcinoma (CCRCC) MxIF image 1500 and corresponding cell segmentation data 1502, according to some embodiments of the technology described herein. FIG. 16 shows a CCRCC MxIF image 1600 and corresponding cell segmentation data 1602, according to some embodiments of the technology described herein.

Referring further to FIG. 5A, the computing device identifies multiple groups of cells in the tissue sample at least in part by performing steps 506-508. At step 506, the computing device determines feature values for at least some of the cells using the immunofluorescence images and the information indicative of locations of the at least some of the cells. In some embodiments, the techniques can include determining feature values for most of the cells in the immunofluorescence images and/or all of the cells in the immunofluorescence images.

In some embodiments, the techniques can include determining feature values for cells based on at least one pixel value associated with a location of the cell in at least one of the immunofluorescence images. As described further herein, the feature values can include and/or be determined based on values of pixels in the multiplexed immunofluorescence image for the location of the at least some of the cells (e.g., pixels at or near the location of the cells). For example, if the multiplexed immunofluorescence image includes multiple single channel images, the techniques can use pixel values of respective locations of the cells in the single channel images (e.g., which may be the same location across the different images, and/or different images, depending on how the images were acquired). As another example, if the images include one or more multi-channel images, the location in the multi-channel image may be the same location for each channel. In some embodiments, the feature values include one or more values derived from values of pixels in the cells. For example, the feature values can include a contribution determined for each of the channel(s) of the immunofluorescence image(s). A contribution can be, for example, a value indicative of how much the pixels associated with a cell contribute (e.g., are expressed) for that channel. For example, a contribution can be determined for each channel that ranges from 0% (e.g., no contribution) to 100% (e.g., full contribution). The contribution can be determined according to various techniques that summarize the pixels of the cells, such as by determining an average across pixels at the cell location, a mean across pixels at the cell location, a proportion of positive pixels in the cell to negative pixels in the cell, and/or the like.

Figure 5B:
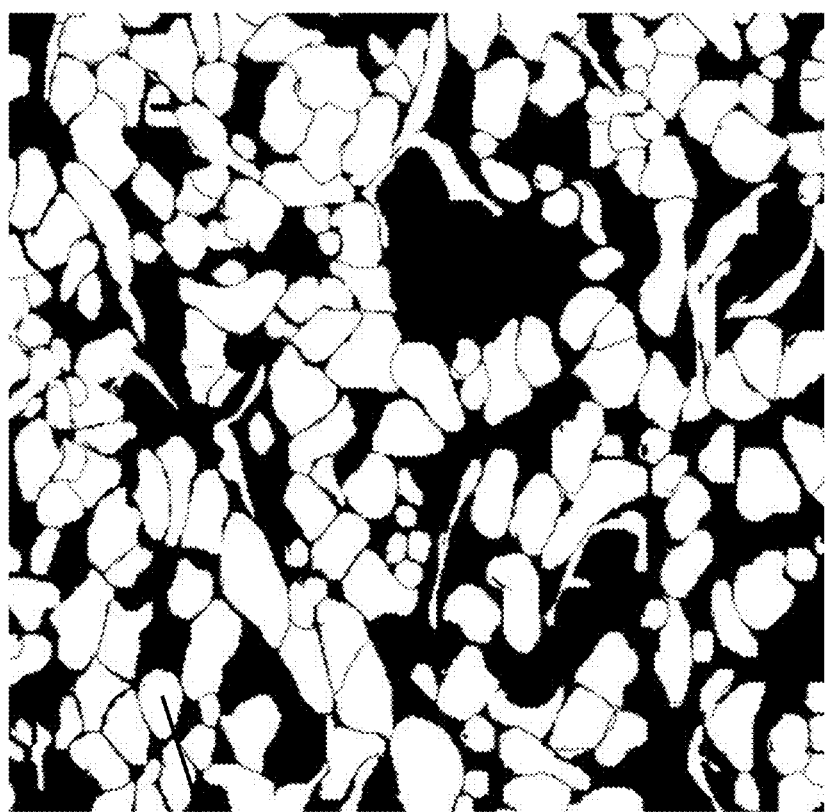
FIG. 5B shows an example of feature values for an associated cell location of cell location data, according to some embodiments of the technology described herein.

In some embodiments, the techniques can determine feature values for the cells using pixel values of immunofluorescence at or near the locations of the cells in the immunofluorescence images. FIG. 5B shows an example of feature values 600 for an associated cell location of cell location data 602, according to some embodiments of the technology described herein. The feature values can be determined by, for example, the cell typing component 340 of FIG. 3. In the example of FIG. 5B, the feature values 600 include a percentage for each channel 1, channel 2 through channel N, where N is a whole number that represents the number of channels associated with the cell location. Each channel can be associated with, for example, one or more immunofluorescence markers, one or more immunofluorescence images, and/or the like. The feature values 600 show that channel 1 has a 25% contribution (e.g., a mean contribution) towards the cell location, channel 2 has a 40% contribution towards the cell location, and channel N has an 85% contribution towards the cell location.

Figure 7A:
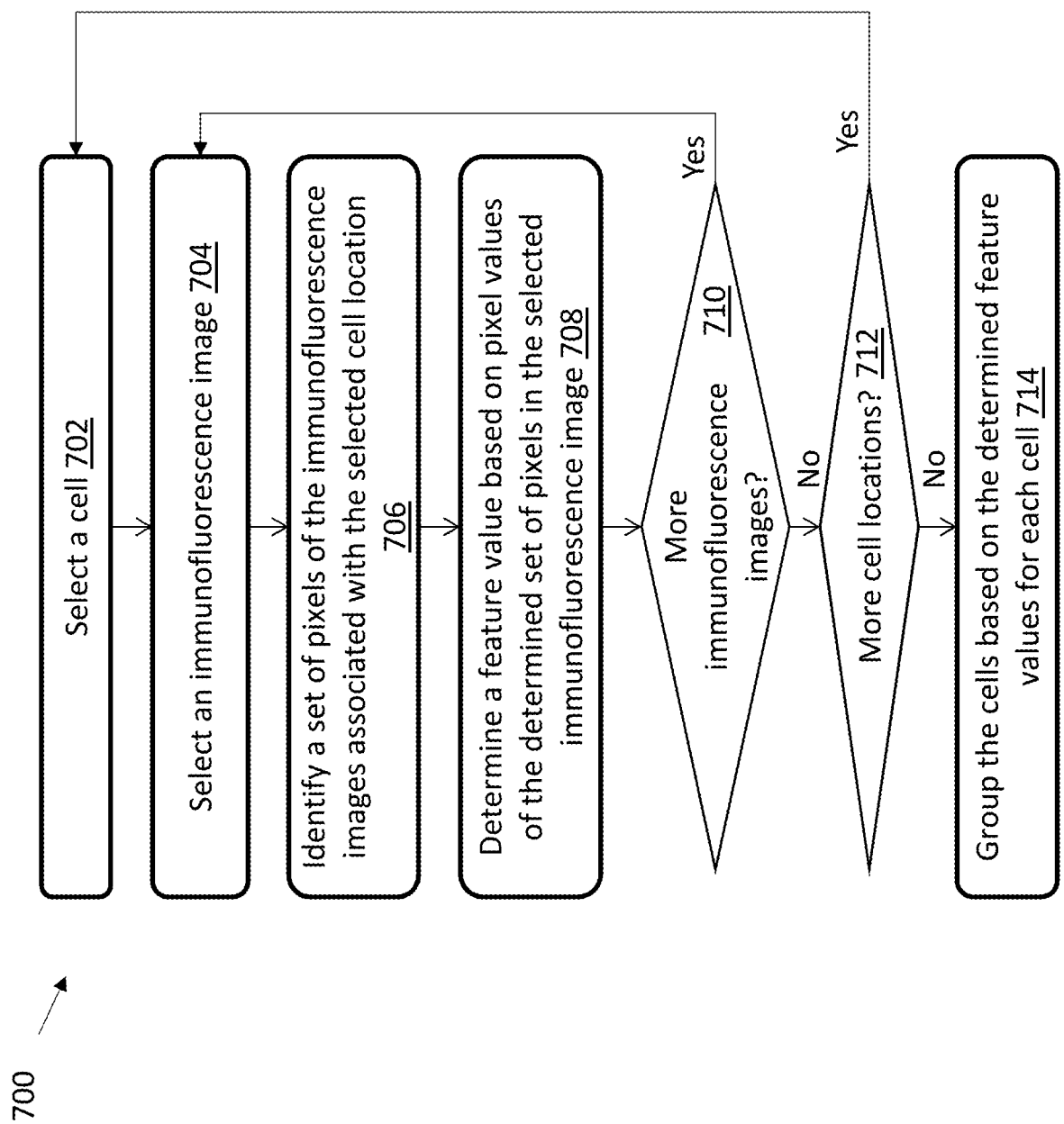
FIG. 7A is a flow chart showing an exemplary computerized process for processing MxIF images of a tissue sample based on cell location data to cluster the cells of the tissue sample into multiple cell groups, according to some embodiments of the technology described herein.

Referring further to FIG. 5A, at step 508 the computing device groups the cells into the multiple groups using the determined feature values. FIG. 7A is a flow chart showing a computerized process 700 for processing MxIF images of a tissue sample based on cell location data to cluster the cells of the tissue sample into multiple cell groups, according to some embodiments of the technology described herein. The computerized process 700 can be performed by, for example, the computing device 116 described in conjunction with FIG. 1. For example, the computing device 5100 of FIG. 51 can be configured to execute one or more aspects discussed in conjunction with the cell typing component 340 of FIGS. 3-4B. The computerized process 700 can be performed as part of other processes and sub-processes described herein. For example, the computerized process 700 can be performed as part of step 508 of FIG. 5A to group the cells into multiple cell groups.

At step 702, the computing device selects a cell to compute one or more feature values for the cell. At step 704, the computing device selects an immunofluorescence image. At step 706, the computing device identifies a set of pixels at or near the location of the selected cell in the immunofluorescence image. For example, the techniques can include identifying a set of pixels that are at least partially (e.g., partially or fully) within a cell boundary of the cell.

At step 708, the computing device determines a feature value for the cell based on the determined set of pixels. In some embodiments, the techniques can include determining the feature value based on the pixel values of the set of pixels. The feature value may include a summarized value based on the pixel values of the set of pixels, such as an average value across the set of pixels or an indication of the proportion of pixels that satisfy one or more criteria (e.g., presence of a respective marker, fluorescence value associated with a respective marker above a threshold, etc.). In some embodiments, the feature value can be representative of a contribution of each of one or more immunofluorescence markers and/or one or more immunofluorescence images to the cell, as described herein. In some embodiments, the computing device can determine the feature value based on how the pixel values contribute to the cell. For example, the computing device can determine that the pixel values of the determined set of pixels include fluorescence present and/or present above a certain threshold for a certain percentage of the cell location (e.g., 30% of the cell location, 40% of the cell location, etc.).

At step 710, the computing device determines whether to analyze additional immunofluorescence images for the selected cell. For example, the computing device can be configured to determine a feature value for a certain number of immunofluorescence markers (e.g., e.g., one marker, two markers, all of the markers, etc.), for a certain number of immunofluorescence images (e.g., one image, two images, all of the images, etc., which may have one or multiple channels) and/or the like. As another example, the computing device can be configured to determine a feature value for each of a certain set of immunofluorescence markers and/or images associated with certain features (e.g., immunofluorescence markers and/or images associated with certain markers indicative of cell structure, etc.). If the computing device determines at step 710 that it is to analyze one or more additional immunofluorescence images, the computing device proceeds back to step 704 and selects another immunofluorescence image.

If the computing device determines at step 710 that there are no further immunofluorescence images to analyze for the selected cell, the computing device proceeds to step 712 and determines whether there are one or more cell locations to determine feature value(s) for. For example, the computing device may be configured to determine feature value(s) for a certain set of cells (e.g., a certain number of cells, cells in one or more locations, and/or the like) and/or for all of the cells. If the computing device determines at step 712 that it is to determine feature value(s) for one or more further cells, the computing device proceeds back to step 702 and selects another cell.

If the computing device determines that there are no further cells to analyze, the computing device proceeds to step 714 and performs cell clustering (e.g., as part of cell typing 340) to group the cells into one or more cell groups based on the determined feature value(s). In some embodiments, the techniques include analyzing the feature value(s) to determine relationships among cells (e.g., similar marker expressions, marker expressions that match known cell typing data, a probability analysis of cells being of a same type and/or having similar properties, etc., as described herein), and grouping cells based on the determined relationships such that each cell in a cell group has feature values that are indicative of a relationship among the cells in the cell group.

The techniques can include applying one or more clustering algorithms (e.g., unsupervised clustering algorithms) to identify relationships among cells based on the determined feature values. Some examples of clustering algorithms that can be used to group cells include hierarchical clustering, density-based clustering, k-means clustering, and/or any other suitable unsupervised clustering algorithm, a self-organizing map clustering algorithm, a minimum spanning tree clustering algorithm, and/or the like, as aspects of the technology described herein are not limited in that respect. In some embodiments, the techniques can perform cell clustering using the FlowSOM algorithm, which can analyze the data using a self-organizing map.

At step 510, the computing device determines at least one characteristic of the tissue sample using the multiple cell groups. In some embodiments, the techniques can include generating a report indicative of the at least one characteristic. The report can also include other information, such as information about the plurality of groups and/or any other information determined about the at least one MxIF image as described herein. The report can be provided to a user. For example, the report can be provided by displaying the report via a graphical user interface (e.g., via a web-based or in an application program executing on a device, transmitting an electronic file (e.g., a PDF file or a file in any suitable format) to the user, and/or any other sufficient technique to provide the report to the user.

In some embodiments, the techniques include using the immunofluorescence images obtained at step 502 in conjunction with the cell grouping information obtained at step 504 to determine the one or more characteristics of the cells of the tissue sample. The at least one characteristic of the tissue sample may characterize the cellular composition of the tissue sample (e.g. cell type, cell morphology, etc.) and/or organization of the tissue sample (e.g. cell localization, multi-cellular structure localization, etc.). As described herein, the one or more characteristics can include, for example, cell types in the tissue sample (e.g., where each group is associated with a different cell type). In some embodiments, the computing device identifies cell types of individual cells in the tissue sample. In some embodiments, the computing device identifies cell types of at least a threshold percentage of the individual cells in the tissue sample. For example, the threshold percentage can be at least 25%, 30%, 35%, 40%, 45%, 50%, 55%, 60%, 65%, 70%, 75%, 80%, 85%, 90%, 95%, 99%, etc.

As another example, the one or more characteristics can include statistical information about a distribution of the cells, such as a distribution of one or more cell types in the tissue sample (e.g., distributions among the cells of a group), distributions between different cell types (e.g., distributions between different groups of cells), and/or the like. As another example, the computing device can determine spatial information about locations of the cells, such as a spatial organization of one or more cell types (e.g., where each cell type is associated with a different group) of the tissue sample, such as cell neighbor information indicative of which type(s) of cells neighbor other type(s) of cells and/or cell contact information indicative of what type(s) of cells contact other type(s) of cells. As a further example, the computing device can determine morphological information about the size, shape, and structure of the cells and/or other aspects of the tissue, such as cell areas, cell perimeters, cell sizes, and/or the like. It should be appreciated that any of the characteristics described herein can be determined for a tissue sample. Therefore, in some embodiments the techniques include determining a plurality of characteristics for the tissue sample, such as cell type, cell distribution information, spatial information, morphological information, multi-cellular structure organization, and/or any other characteristics described herein.

In some embodiments, the techniques include performing cell typing by determining relationships among the cells based on the feature values, such as by using a probabilistic analysis based on the feature values. As discussed in conjunction with FIGS. 5A-5B, channel contributions (e.g., mean channel contributions) can be used to determine cell types, which can be used to determine the cell groups. However, in some situations the inventors have appreciated that such channel contributions may not provide for stable cell typing. For example, the inventors have appreciated that the channel contributions can depend on the quality of segmentation, the size of the cells, the shape of the cells, the conditions of the tissue staining, and/or the like. As another example, the inventors have appreciated that channel contributions do not take into account information about intracellular signal localization (e.g., which can be useful to help distinguish real signal data from noise). As a further example, the inventors have also appreciated that without an ability to set the range of values of channel contributions for specific types of cells, it can be difficult to purposefully search for cell types of interest (e.g., instead, clustering can be used, which may not find cells of interest). As an additional example, given such potential problems, results may need to be checked manually, which can increase delays and impact automation.

To address such potential problems, the inventors have developed techniques for cell typing that leverage a marker expression signature. FIG. 6A is a flow chart showing an exemplary computerized process 610 for processing MxIF images of a tissue sample based on cell location data of a cell in the tissue sample to predict a type of the cell, according to some embodiments of the technology described herein. The computerized process 610 can be performed by, for example, by the cell typing component 340 of FIG. 3. The computerized process 610 can be performed as part of other processes and sub-processes described herein. The computerized process 610 can be performed, for example, as part of steps 506 and/or 508 of FIG. 5A.

At step 612, the computing device obtains at least one multiplexed immunofluorescence image of a tissue sample that was obtained using MxIF imaging (e.g., as described in conjunction with step 502 of FIG. 5A). As described herein, the marker images can be provided as separate images and/or as combined images with multiple channels. The at least one immunofluorescence image can include various markers, such as of nuclei marker(s) (e.g., FOXP3, DAPI), membrane marker(s) (e.g., CD3e), cytoplasm marker(s) (e.g., CD68), and/or the like. At step 614, the computing device obtains information indicative of a location of a cell in the at least one multiplexed immunofluorescence image. For example, the location information can include cell boundary information, information from which cell boundaries can be determined (e.g., marker expressions), and/or one or more cell masks (e.g., a cell mask for one or more of the received immunofluorescence images) as described in conjunction with step 504 of FIG. 5A.

Figure 6B:
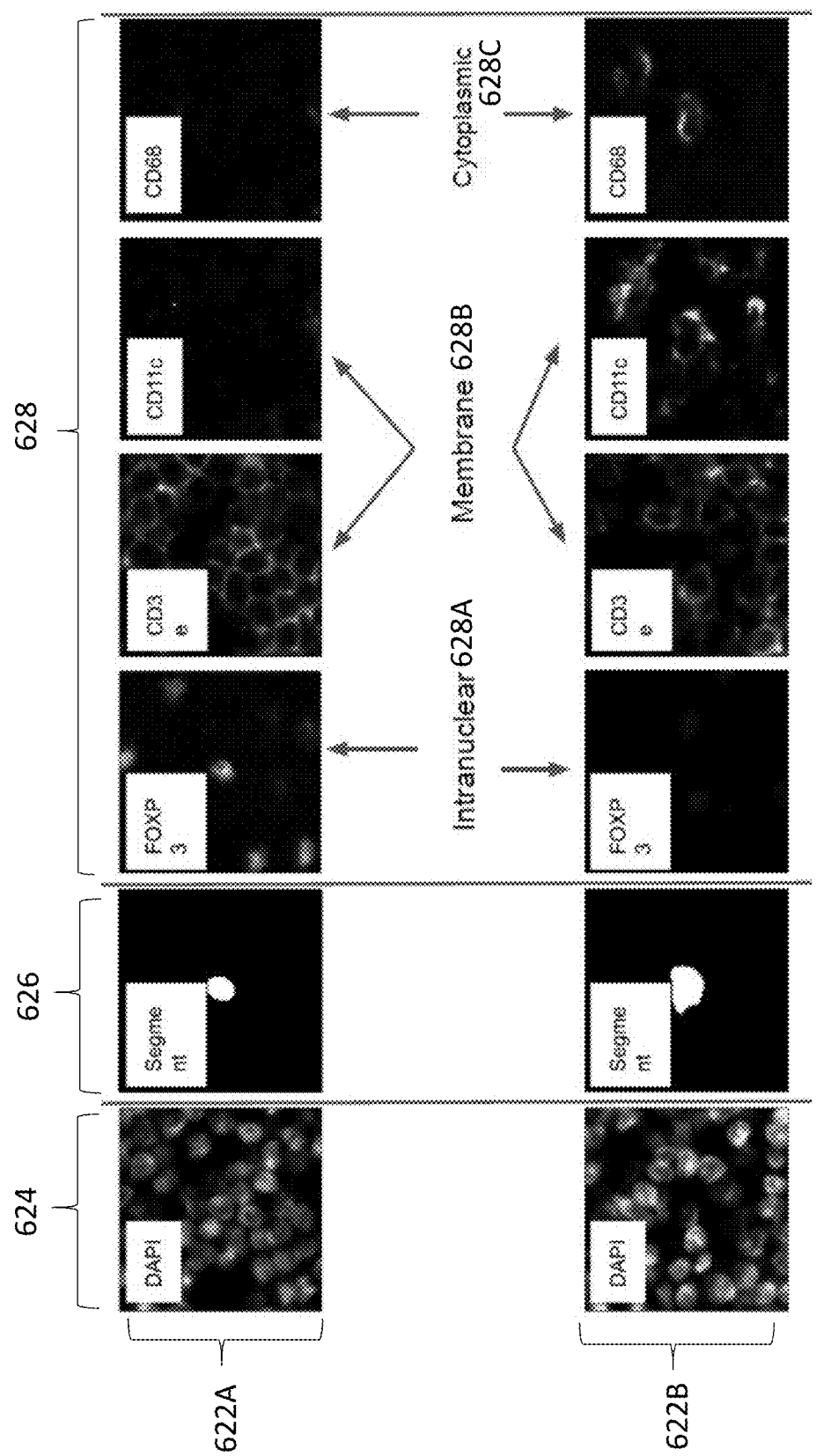
FIG. 6B show examples of immunofluorescence images and cell location data used for cell typing, according to some embodiments.

FIG. 6B shows examples of immunofluorescence images and cell location data that can be used for cell typing, according to some embodiments. FIG. 6B shows data for a first set of data for a first cell 622A and a second set of data for a second cell 622B (collectively cells 622). For each cell 622, the data includes a nuclei marker (DAPI) image 624, a cell segmentation (binary) mask 626, and a set of marker images 628 that can be used to search for various expressions of the cell. In this example, the marker images 628 can be roughly categorized as intranuclear marker images 628A (FOXP3 images), membrane marker images 628B (CD3e and CD68 images), and cytoplasmic images 628C (CD68) based on the marker image localization.

At step 616, the computing device determines a marker expression signature that includes, for each particular type of marker of the at least one multiplexed immunofluorescence image obtained at step 612, a respective likelihood that the particular type of marker is expressed in the first cell. Therefore, the cell location information (e.g., cell masks) can be used to identify cell locations in the immunofluorescence images. In some embodiments, the computing device can use a trained neural network to determine the marker expression signature. The neural network can be trained to determine the likelihood of whether (or not) a marker signal is present and expressed for the cell. The neural network model can be implemented based on, for example, a ResNets model as described herein. As described herein, such a model can include a large number of parameters. For example, such a model can include at least half a million parameters, at least a million of parameters, multiple millions of parameters (e.g., at least one million parameters, two million parameters, three million parameters, etc.), and/or tens of millions of parameters (e.g., at least ten million parameters, fifteen million parameters, twenty-five million parameters, fifty million parameters, etc.). For example, such a model can include forty (40) to forty-five (45) million parameters (e.g., forty million parameters, forty-two million parameters, and/or forty-five million parameters). In some embodiments, the parameters can include at least a hundred million parameters (e.g., at least one hundred million parameters, between one million to one hundred million parameters), hundreds of million parameters, at least a billion parameters, and/or any suitable number or range of parameters.

The input to the model can be at least one multiplexed immunofluorescence image of different markers, such as separate one-channel MxIF images, a two-channel MxIF image, a three-channel MxIF image, etc. Each immunofluorescence image can have a height (e.g., 128 pixels, 256 pixels, etc.) and a width (e.g., 128 pixels, 256 pixels, etc.). In some embodiments, the first channel or image can be, for example, a DAPI image (e.g., cropped to be centered by cell of interest), the second channel or image can be another immunofluorescence marker image (e.g., also cropped), and the third channel or image can be a segmentation mask (a segmentation mask of only one cell of interest). Referring to FIG. 6B, for example, for each cell 622, the input to the model can include a nuclei marker image 624, a segmentation mask 626, and one of the marker images 628 (e.g., one of the intranuclear images 628A, membrane images 628B and cytoplasmic images 628C). In some embodiments, the input images (e.g., the MxIF images or channels) can be normalized. For example, the pixel values of the images can be normalized to be within a range of 0-1, which can be performed based on the bit depth of the image. For example, the values of an 8-bit image can be divided by 255, the values of a 16-bit image can be dived by 65535, and/or the like. Such normalization can be used in conjunction with other processes and sub-processes described herein, such as part of the image preprocessing that is performed by the MxIF image preprocessing module 320 discussed in conjunction with FIGS. 3-4B.

The neural network can output either a binary classification (e.g., a 0 or 1 for the classification) and/or the likelihood of the cell having a signal of proper intensity and shape (e.g., in the 0 to 1 range) for the associated input marker image. For example, referring to FIG. 6B, for the data set 622A, for the input of the nuclei marker image 624, the cell segmentation mask 626, and the intranuclear image 628A (FOXP3), the output can be the likelihood of the intranuclear image 628A having a proper intensity and shape of a cell that would be expressed by the intranuclear image 628A.

The neural network can be trained to process the at least one multiplexed immunofluorescence image (or a portions thereof) and the location information. For example, the neural network can be configured to compare a portion of the at least one multiplexed immunofluorescence image (e.g., 128×128 pixels) that includes the cell in the center of the image as identified by a cell mask. As described herein, the immunofluorescence image(s) can be nuclei marker images of the area as well as other expression images, including cell contour images or membrane images, intranuclear images, cytoplasmic images, and/or the like. A sample data set with such information can be used to train the neural network to distinguish whether a marker image is likely a real marker expression for the cell (or not) based on the intensity and shape of the marker image.

The neural network can be trained on a library of images. As an example, the neural network can be trained on immunofluorescence images and/or cell location data that is annotated by professional pathologists. In an illustrative example not intended to be limiting, three different training sets can be used: a first set with 2,186 images (training set) and 403 images (test set) of 4 markers for nuclei localized markers (e.g. Ki67); a second set with 9,485 images (training set) and 1,979 images (e.g., validation set) of 28 markers for membrane localized markers (e.g. CD3, CD20); and a third set with 898 images (training set) and 427 images (validation set) of 8 markers with defined localization (e.g. CD68). As a result, the neural network can be trained to provide the likelihood of whether the marker image(s) of a cell are a real marker expression.

In some embodiments, the techniques can include executing a plurality of trained neural networks to determine the marker expression signature. For example, different neural networks can be trained and used for different markers. In some embodiments, different neural networks can be used for markers with different cell localization information (e.g., nuclei, membrane or cytoplasmic markers). For example, a first neural network can be trained to detect expression of intranuclear images, a second neural network can be trained to detect expression of cell membrane images, a third model can be trained to detect expression of cytoplasmic images, and/or the like.

In some embodiments, the marker expression signature for the tissue sample can include a set of probabilities or likelihoods indicative of whether a cell is expressed for each marker of the at least one immunofluorescence image. In some embodiments, the likelihood values can range from 0 (e.g., no expression) to 1 (e.g., expression). Each likelihood can be determined based on not only the marker intensity in the image, but also using other information that can be determined based on the cell mask (e.g., the form of the cell, pixel intensity across the cell area, etc.).

At step 618, the computing device compares the marker expression signature to cell typing data. In some embodiments, the cell typing data can include, for each cell type, a set of known marker signature entries for a set of markers (e.g., the set of markers of the at least one multiplexed immunofluorescence image). Each known marker signature can include binary data (e.g., 0 or 1) indicative of whether the marker is an expression or not for the cell (e.g., where 0 means no expression and 1 means that expression should be seen in the associated cell type). In some embodiments, if a particular marker is ambiguous and/or uninformative, and therefore is not necessarily an expression or not (e.g., the marker may be expressed or not expressed for a cell), the data for the marker can indicate as such (e.g., by including both 0 and 1). As an example of cell typing data, a cell typing table can be generated based on known marker expressions of cells as provided in literature and/or databases, such as the Cluster of Differentiation available from Sino Biological (e.g., www.sinobiological.com/areas/immunology/cluster-of-differentiation) and/or human immune cell markers available from Bio-Rad (e.g., www.bio-rad-antibodies.com/human-immune-cell-markers-selection-tool.html).

In some embodiments, the marker expression signature can be compared to the cell typing data to generate comparison data that compares the marker expression signature to known expression signatures of the cells in the cell typing data. For example, the comparison data can indicate a comparison between each probability of the marker expression signature and the associated marker values of each known marker signature for cells in the cell typing data. The comparison data can include a comparison metric, such as a distance between the expression signatures, a percentage of overlap of the expression signatures, a similarity score between the expression signatures, and/or any other applicable comparison that can be used to compare the marker expression signature with the known cell signatures in the cell typing data. For example, a distance between the marker expression signature and known marker expression signatures of the cell typing data can be determined by using a cosine distance, a Euclidian distance, a Manhattan distance, and/or the like. At step 620, the computing device determines, based on the comparison, a predicted cell type. For example, referring to FIG. 6B, the first set of data 622A can be processed to predict a Regulatory T-cell type, and the second set of data 622B can be processed to predict a Macrophage CD68+ cell type.

In some embodiments, the computing device can analyze the computed comparison of each cell type of the cell typing data to select a top candidate cell type. For example, when computing a distance, the computing device can select among the various cell types by choosing the cell type with the smallest distance. In order to attempt to only have one top candidate, the cell typing data can be configured to include unique entries for each cell type (e.g., such that the comparison done at step 618 does not result in the same value for multiple cell types in the cell typing data).

Figure 6C:
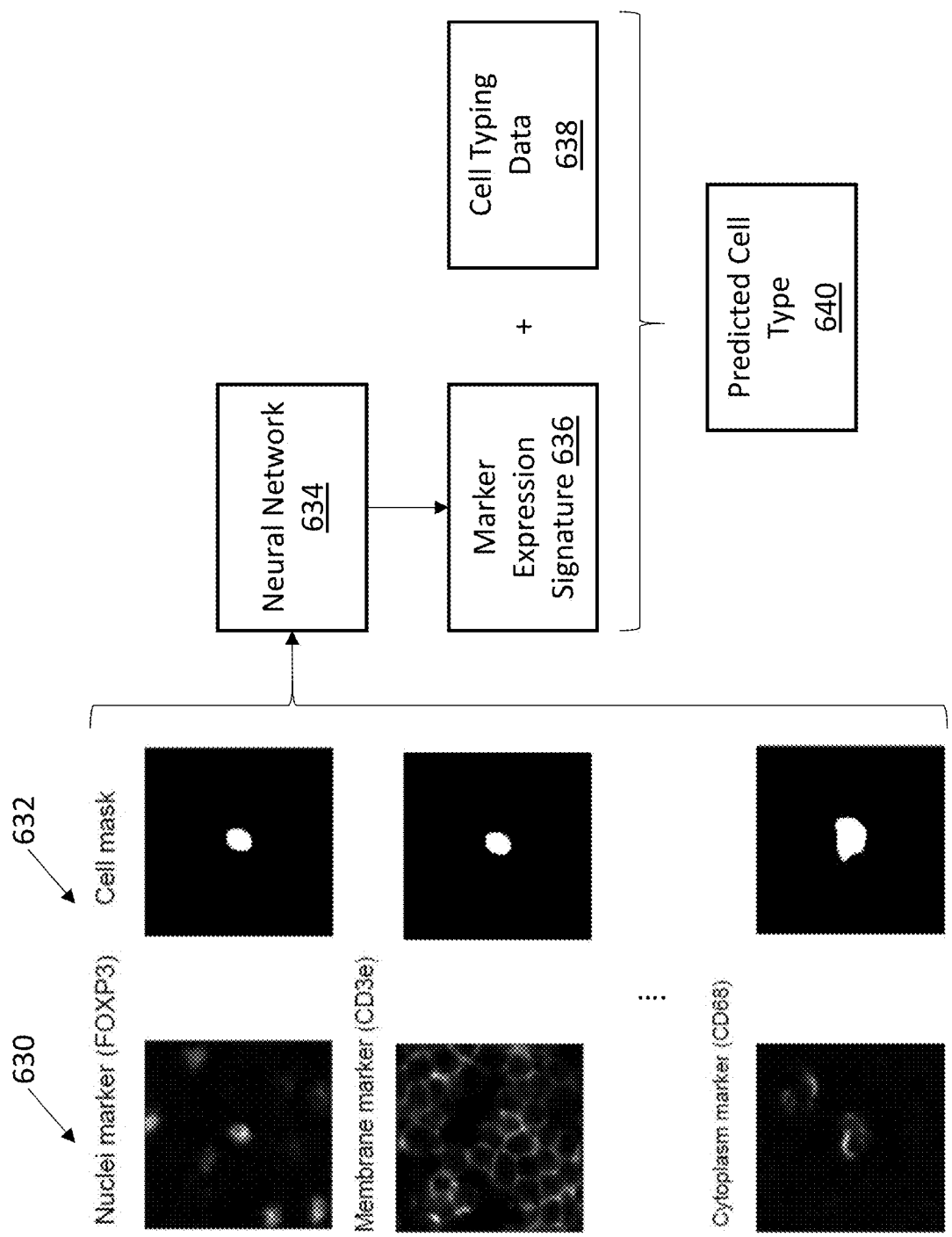
FIG. 6C shows an example of using a neural network to generate expression data that is compared to cell typing data to determine a predicted cell type, according to some embodiments of the technology described herein.
Figure 6D:
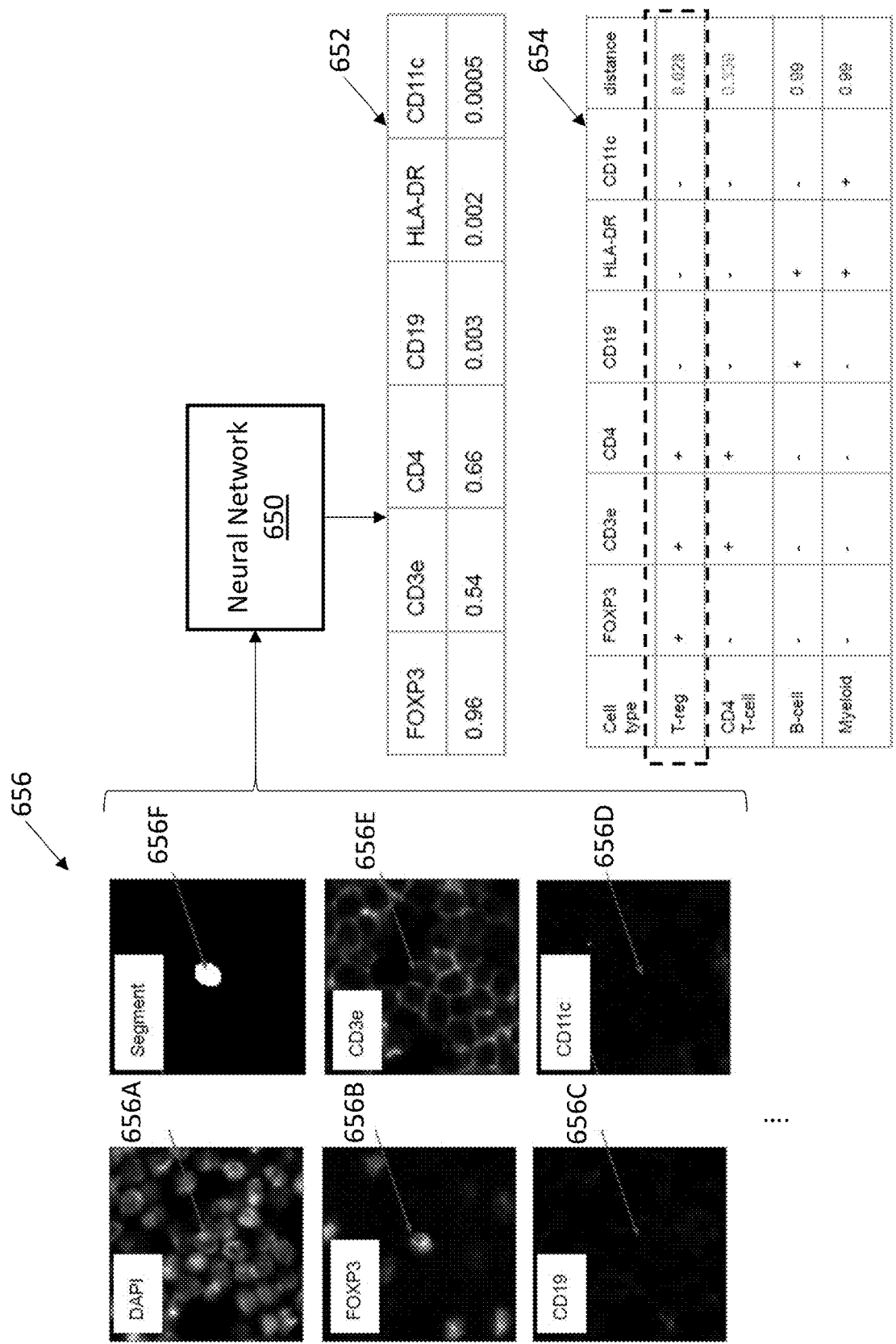
FIGS. 6D-6E show examples of using a neural network to generate a probability table that is compared to a cell typing table to determine a predicted cell type, according to some embodiments of the technology described herein.

FIG. 6C shows an example of using a neural network 634 to generate marker expression signature 636 that is compared to cell typing data 638 to determine a predicted cell type 640, according to some embodiments of the technology described herein. In some embodiments, the marker expression signature can be a list, array, table, database, etc., or any data structure as appropriate, of probabilities for each marker. The cell typing data can likewise include a list, array, table, or other data structure of the binary value(s) for each marker. FIG. 6D shows an example of using a neural network 650 to generate a set of probabilities (shown in this example as a probability table 652) that is compared to cell typing data (shown in this example as cell typing table 654, which includes a known expression signature for each cell type) to determine a predicted cell type, according to some embodiments of the technology described herein. The neural network 650 processes input 656, which include images 656A (DAPI marker), 656B (FOXP3 marker), 656C (CD19 marker), 656D (CD11c marker) and 656E (CD3e marker), as well as segmentation mask 656F for the cell. As described above, separate neural networks can be used to process applicable marker images. For this example, each neural network execution can include processing (a) one of the images 656B (FOXP3 marker), 656C (CD19 marker), 656D (CD11c marker) and 656E (CD3e marker), along with CD4 and HLA-DR images that are not shown, in conjunction with (b) the image 656A (DAPI marker) and (c) the segmentation mask 656F for the cell.

Therefore, a first trained neural network can be used to process the intranuclear FOXP3 marker image, a second trained neural network can be used to process the membrane marker images (e.g., CD3e image 656E and CD11c image 656D), and so on such that separate neural networks can be used to process images based on different localizations of the markers. Therefore, while only one neural network 650 is shown in FIG. 6D, multiple different trained neural networks can be used to process associated marker image(s).

In this example of FIG. 6D, the neural network 650 generates the following probabilities in the probability table 652: 0.96 for FOXP3 marker, 0.54 for CD3e marker, 0.66 for CD4, 0.003 for CD19, 0.002 for HLA-DR, and 0.0005 for CD (with the probabilities closer to 0 meaning less of a probability of expression, and those closer to 1 meaning a higher probability of expression for the marker).

The computing device computes a cosine distance between the probabilities in table 652 and the values for the markers for each cell type. In this example, a "+" means the marker is expressed by the cell, while a "−" means the marker is not expressed by the cell. The comparison results in cosine distance values of 0.028 for the T-reg cell type, 0.339 for the CD4 T-cell type, 0.99 for the B-cell type, and 0.99 for the Myeloid cell type. In this example, the smaller the distance the more likely that the associated cell type is the cell type of the cell under analysis. As a result, the computing device selects T-reg (with the lowest distance value of 0.028) as the cell type for the cell.

Figure 6E:
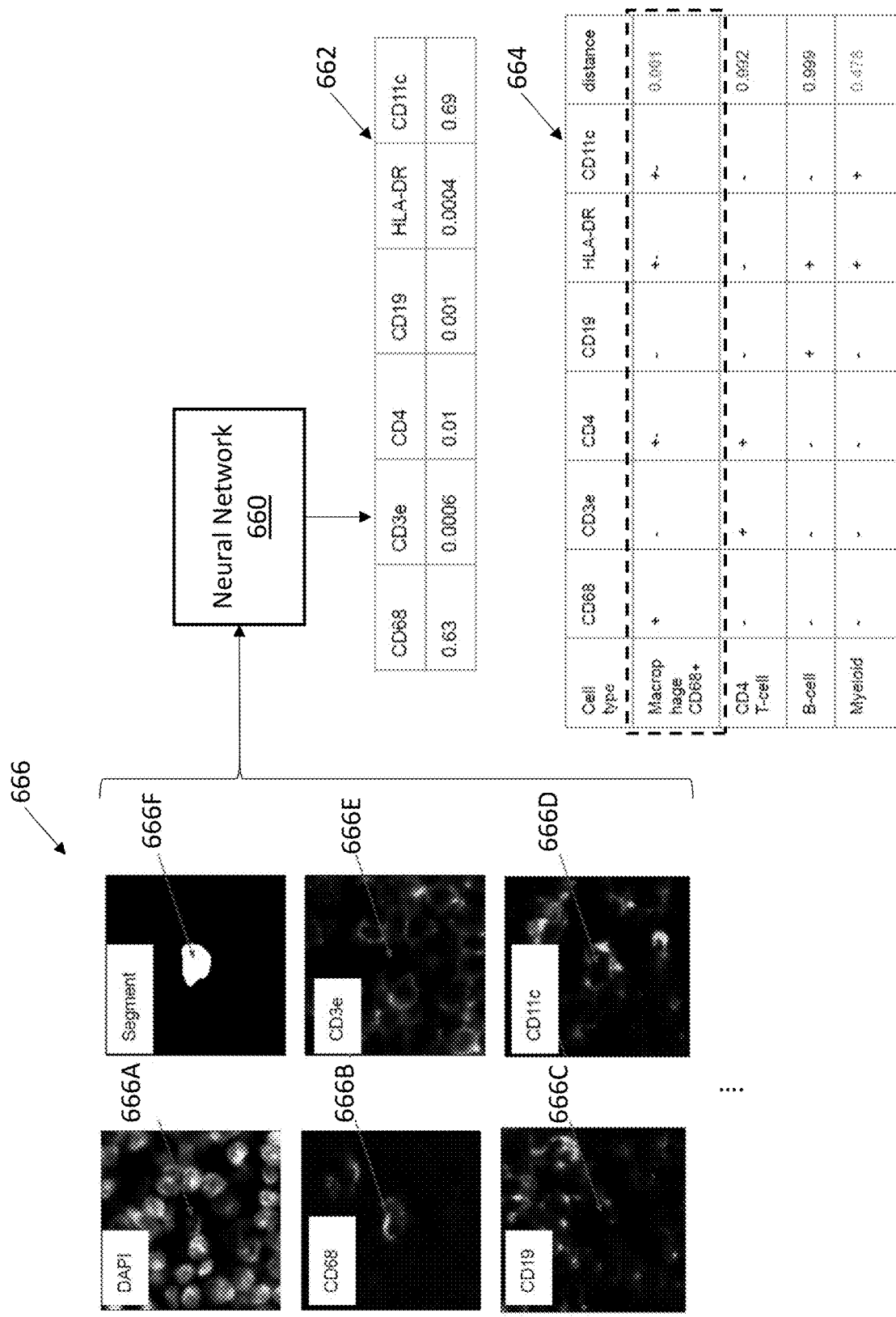

FIG. 6E shows an example of using a neural network 660 to generate a set of probabilities (shown in this example as a probability table 662) that is compared to cell typing data (shown in this example as cell typing table 664) to determine a predicted cell type, according to some embodiments of the technology described herein. The neural network 660 processes input 666, which include MxIF images 666A (DAPI marker), 666B (CD68 marker), 666C (CD19 marker), 666D (CD11c marker) and 666E (CD3e marker), as well as segmentation mask 666F for the cell. As described herein, one or more neural networks can be used to process each of the images 666B, 666C, 666D and 666E (in conjunction with the DAPI image 666A and the segmentation mask 666F). In this example, the neural network 660 generates the following probabilities in the probability table 652: 0.63 for CD68 marker, 0.0006 for CD3e marker, 0.01 for CD4, 0.001 for CD19, 0.0004 for HLA-DR, and 0.69 for CD11c (again, with the probabilities closer to 0 meaning less of a probability of expression, and those closer to 1 meaning a higher probability of expression for the marker).

The computing device computes a cosine distance between the probabilities in table 662 and the values for the markers for each cell type. In this example, a "+" means the marker is expressed for a particular cell, a "−" means the marker is not expressed for a particular cell, and a "+−" means the marker may or may not be expressed for the cell. For this example, the comparison results in cosine distance values of 0.001 for the Macrophage CD68+ cell type, 0.992 for the CD4 T-cell type, 0.999 for the B-cell type, and 0.478 for the Myeloid cell type. In this example, the smaller the distance is again the more likely that the associated cell type is the cell type of the cell under analysis. As a result, the computing device selects Macrophage CD68+ (with the lowest distance value of 0.001) as the cell type for the cell.

In some embodiments, the techniques can include identifying clusters or communities of cells based on cell characteristics. For example, it can be desirable to search for certain cell structures in a tissue sample, such as a cell structure indicative of a cancer (e.g., breast cancer, renal carcinoma, etc.). The techniques can include identifying cell communities in a tissue sample, and identifying information of those cells, such as cell types, distances (e.g., to provide information regarding sparsely populated cell clusters, close cell clusters, etc.). The communities of cells can include cells of different types. In some embodiments, the cell clusters represent at least a part of a tissue structure of the tissue sample. The tissue structure can include, for example, mantle tissue, stromal tissue, a tumor, a follicle, a blood vessel, and/or any other tissue structure.

Figure 7B:
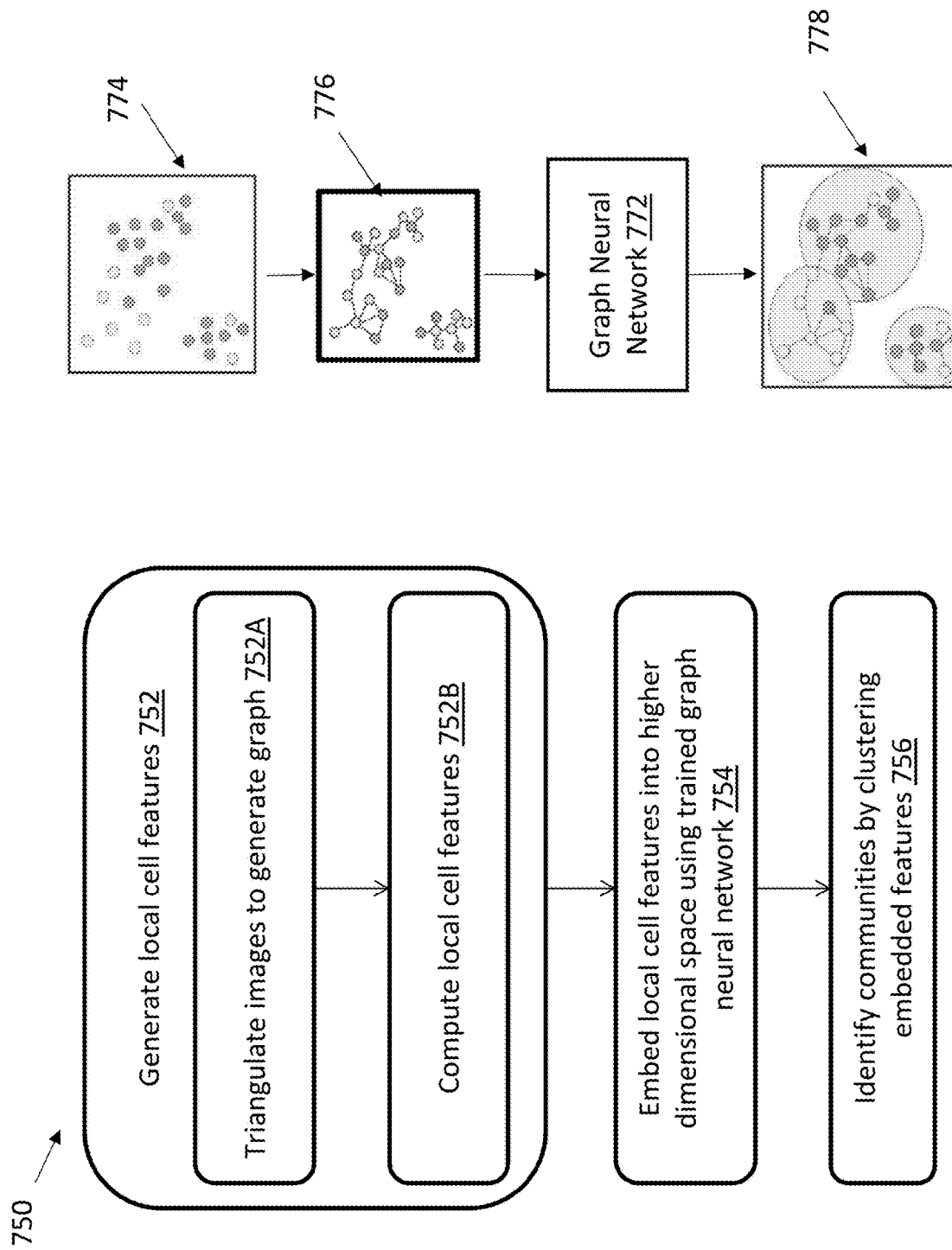
FIG. 7B is a flow chart showing an exemplary computerized process for processing a first set of cell features (local cell features) using a graph neural network to identify one or more communities of cells, according to some embodiments of the technology described herein.

FIG. 7B is a flow chart showing an exemplary computerized process 750 for identifying communities by obtaining and processing a first set of cell features (local cell features), according to some embodiments of the technology described herein. In the example of FIG. 7B, the computerized process 750 processes the obtained local cell features using a graph neural network 772 to identify one or more communities of cells 778. The computerized process 750 can be executed by, for example, the cell typing component 340 of FIG. 3. The computerized process 750 can be performed as part of other processes and sub-processes described herein. For example, the computerized process 700 can be performed as part of step 508 of FIG. 5A to group the cells into multiple cell groups and/or as part of step 510 to determine at least one characteristic (e.g., communities of cells) for the tissue sample. At step 752, the computing device generates local cell features, which includes obtaining cell data 774 (e.g., locations of cells, a cell mask, and/or other cell localization data) and triangulating the cell data 774 to generate a graph 776 at step 752A. For example, the computing device can be configured to use triangulation techniques (e.g., Delaunay triangulation) to construct an arrangement of the cells 774 (e.g., based on centroids of the cells) to obtain the graph representation 776 of the cellular structure of the tissue. In some embodiments, the graph 776 includes a number of nodes that is equal to the number of detected cells. In some embodiments, aspects of the graph generation can be constrained. For example, in some embodiments the edge length of each edge in the graph 776 can be limited to below an upper limit edge threshold (e.g., based on a pixel distance, such as 200 pixels, 300 pixels, etc.). Therefore, the number of edges in the graph 776 can vary depending on cell distances in the tissue, such that the techniques can include pruning edges that are below a predetermined length threshold.

The computing device then computes, based on the graph representation of the tissue 776, the local cell features at step 752B. The local cell features can include information about the cells that can be determined based on the cell data 774 and/or the graph 776. For example, the local cell features can include, for each cell, a cell type, cell neighbors determined based on the edges of the graph 776, neighboring cell types, neighbor distance data (e.g., median distance to neighbors, mask-related data (e.g., a percentage of area filled with positive pixels for marker masks under each cell (e.g., a CD31 mask for blood vessels, etc.)), and/or the like. Each node can therefore have an associated set of local data points (e.g., represented as a vector). In some embodiments, the node data can include the cell type, which can be encoded using a plurality of variables. For example, if there are seven discovered cell types in the tissue sample, then "cell type 6" can be encoded as [0, 0, 0, 0, 0, 1, 0]. In some embodiments, the node data can include the median value of lengths of all node edges for the cell. In some embodiments, the node data can include the percentage of positive pixels of a given mask for a cell, which can be extended to include data for each of a plurality of masks (if present). In some embodiments, the data can include the percentage of the cells located within one or more masks of selected markers (e.g., a percentage of the area of the cell mask filled with positive cells). Such mask-based data can allow the computing device to leverage information about cells and/or structures that may otherwise be difficult to segment. As a result, in some embodiments the total number of data points for each node is L, which is the sum of (1) the number of cell types, (2) the number of masks to consider (if any), and (3) a value for the median distance of edges of given node.

The graph 776 can be encoded for input into the graph neural network 772. In some embodiments, the node information can be stored in a matrix with dimensionality n by L, where n is a number of nodes and L is the number of node features. In some embodiments, the graph is encoded, such as into a sparse adjacency matrix (e.g., with dimensionality n by n nodes), into an adjacency list of edges, and/or the like.

At step 754, the computing device inputs the graph (e.g., an encoded version of the tissue graph 776) to the graph neural network, which embeds the local cell features into a higher dimensional space. The graph neural network processes the input graph using the structure of the graph, including the edges and nodes of the graph. The graph neural network can have different architectures. In some embodiments, the graph neural network 772 is an unsupervised convolutional graph neural network. For example, the graph neural network can be implemented using a Deep Graph Infomax architecture that uses graph convolutional network layers of any suitable type to perform embedding in graphs. The Deep Graph Infomax architecture is described in, for example, Petar Veličković et al., "Deep Graph Infomax," ICLR 2019 Conference Blind Submission (Sep. 27, 2018), available at openreview.net/forum?id=rklz9iAcKQ, and/or arXiv:1809.10341, which is hereby incorporated by reference herein in its entirety. Examples of different types of convolution layers that can be used in the graph neural network include GCN as described in Thomas Kipf and Max Welling, "Semi-Supervised Classification with Graph Convolutional Networks," arXiv1609.02907 (Feb., 2017), available at arxiv.org/abs/1609.02907, or SAGEConv as described in William Hamilton et al., "Inductive Representation Learning on Large Graphs," arXiv1706.02216 (September, 2018), available at arxiv.org/abs/1706.02216, which are both hereby incorporated by reference herein in their entirety. In addition to graph convolutional layers, the graph neural network can have a discrimination layer that is used in training. The neural network implementation can include various numbers of parameters, such as at least half a million parameters, one million parameters, two million parameters, five million parameters, or more. In some embodiments, such a model can include tens of millions of parameters (e.g., at least ten million parameters, fifteen million parameters, twenty million parameters, twenty-five million parameters, fifty million parameters, and so on, based on the implementation). In some embodiments, the parameters can include at least a hundred million parameters (e.g., at least one hundred million parameters, between one million to one hundred million parameters), hundreds of million parameters, at least a billion parameters, and/or any suitable number or range of parameters.

The graph neural network can be trained to reconstruct each node embedding using a variant of noise contrastive estimation, such that the neural network essentially learns internal representations of nodes (e.g., cells) in order to discern between correct representations (e.g., based on real data) and incorrect representations (e.g., based on noise representations). The graph neural network can be used for feature representation since the graph neural network can represent both local and global features of the tissue structure from information including cell labels, neighboring cells, cell distances, mask sizes (e.g., in some radius), and/or other input. The node embeddings generated by the graph neural network can therefore include not only local node or cell neighborhood information, but also preserve a global context through global features. The resulting feature embeddings can therefore include a predetermined same number of features for each cell (e.g., represented using a fixed size vector, array, and/or other data structure).

In some embodiments, the output of the neural network can be the activations of the last graph convolutional layer of the network. Since different types of convolution layers can be used (e.g., GCN, SAGEConv, etc. as described above), the number of dimensions of the output can vary, such as 16 dimensions, 32 dimensions, etc. Each dimension of the output can be an embedding from a space with a higher dimensionality to a lower dimensionality, and can generally be thought of as an aggregate of information from the tissue structure for representation. There can therefore be at least some correlation between the value of embeddings and specific cell type compositions, for example. In some embodiments, as described further below, clustering can be performed using these embeddings and the clusters can be described in terms of prevalent cell types in them.

In some embodiments, a data set can be generated to train the graph neural network 772 that includes, for each of a plurality of training tissue samples, a graph representation of the tissue sample and local cell features computed as described above for steps 752A and 752B (e.g., for each node, the cell type, mask-related data, and median distance of edges). In some embodiments, a loss function can be maximized, such as $loss = \log(P_i) + \log(1-P'_i)$, where $P_i$ is the probability that the node (a cell obtained through cell segmentation) is similar to all graph nodes, and $P'_i$ is the probability that a permutated node is similar to all graph nodes. As described herein, each node has associated information (e.g., cell type assignment, cell median distance to neighbors, mask information, etc.), which can be in the form of a feature vector. In some embodiments, the Deep Graph Infomax architecture uses a summary vector, which can be the mean value of feature vectors for all nodes in a given sample graph. The classifier layer of the architecture can be trained to distinguish using embeddings between (a) a given node feature vector that is classified as belonging to the graph summary vector, and (b) a permuted (e.g., shuffled in place) node feature vector that is classified as not belonging to the graph summary vector.

At step 756, the cell embeddings (including the neighborhood data) are clustered to determine one or more clusters 778. Various clustering techniques can be used to determine the clusters. For example, as described herein the techniques can include using a centroid-based clustering algorithm (e.g., K-means), a distribution based clustering algorithm (e.g., clustering using Gaussian mixture models), a density-based clustering algorithm (e.g., DBSCAN), a hierarchical clustering algorithm, PCA, ICA, and/or any other suitable clustering algorithm. For each determined cluster, the percentage of cells within the cluster and associated mask(s) can be used to generate description data for each cluster as shown in 778.

Figure 7C:
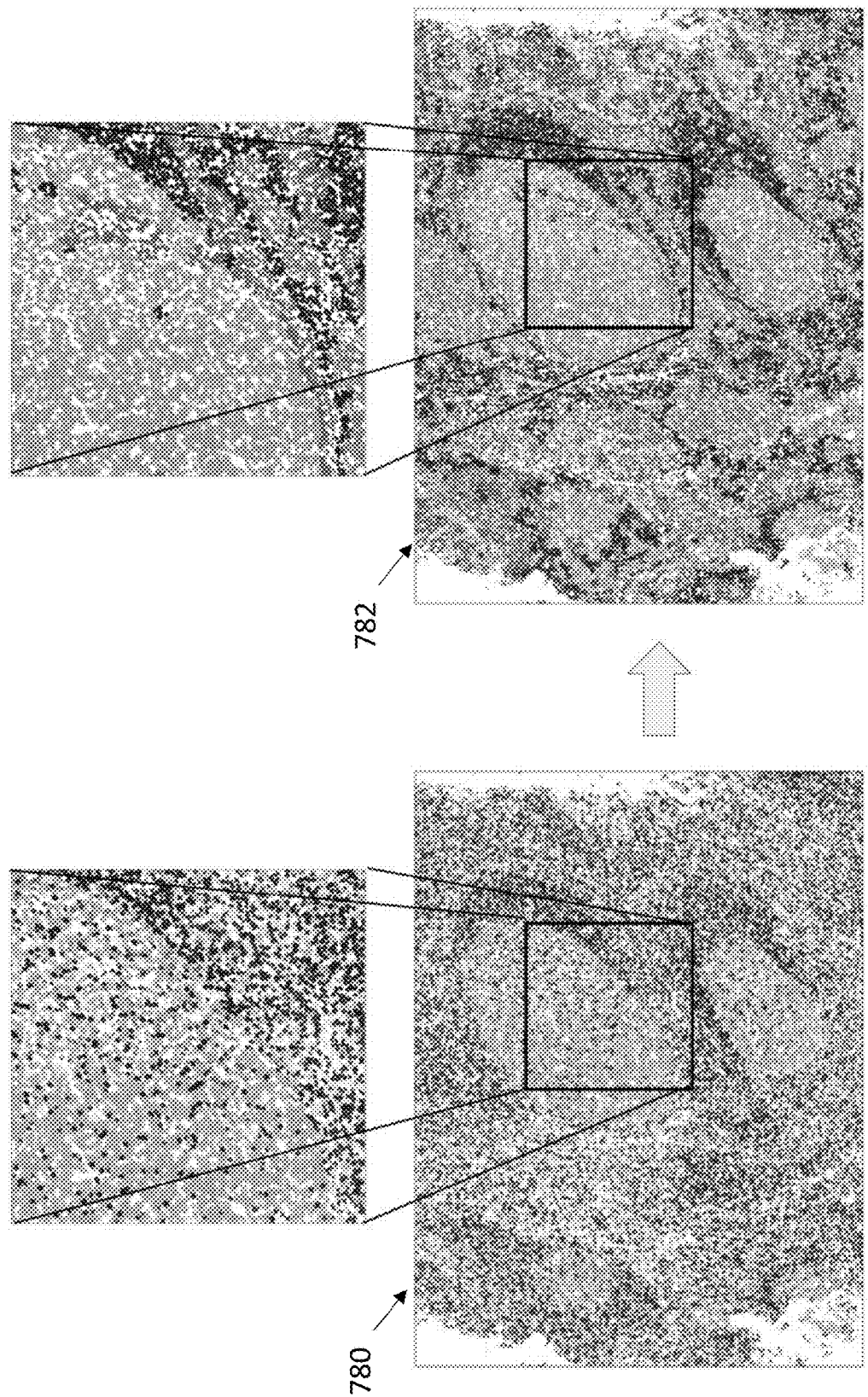
FIG. 7C shows examples of an image of tissue contours shaded based on cell types and an image of the same tissue with the contours shaded based on cell clusters, according to some embodiments.

FIG. 7C shows examples of an image 780 of tissue contours shaded based on cell types and an image 782 with the contours shaded based on cell clusters (e.g., determined as discussed in conjunction with FIG. 7B) for the same tissue sample, according to some embodiments. The image 782 demonstrates how cell clusters can be used to more clearly visualize parts of some tissue structures (e.g., follicles of the dark, light and/or mantle zones) compared to shading based on cell types in image 780.

Figure 18:
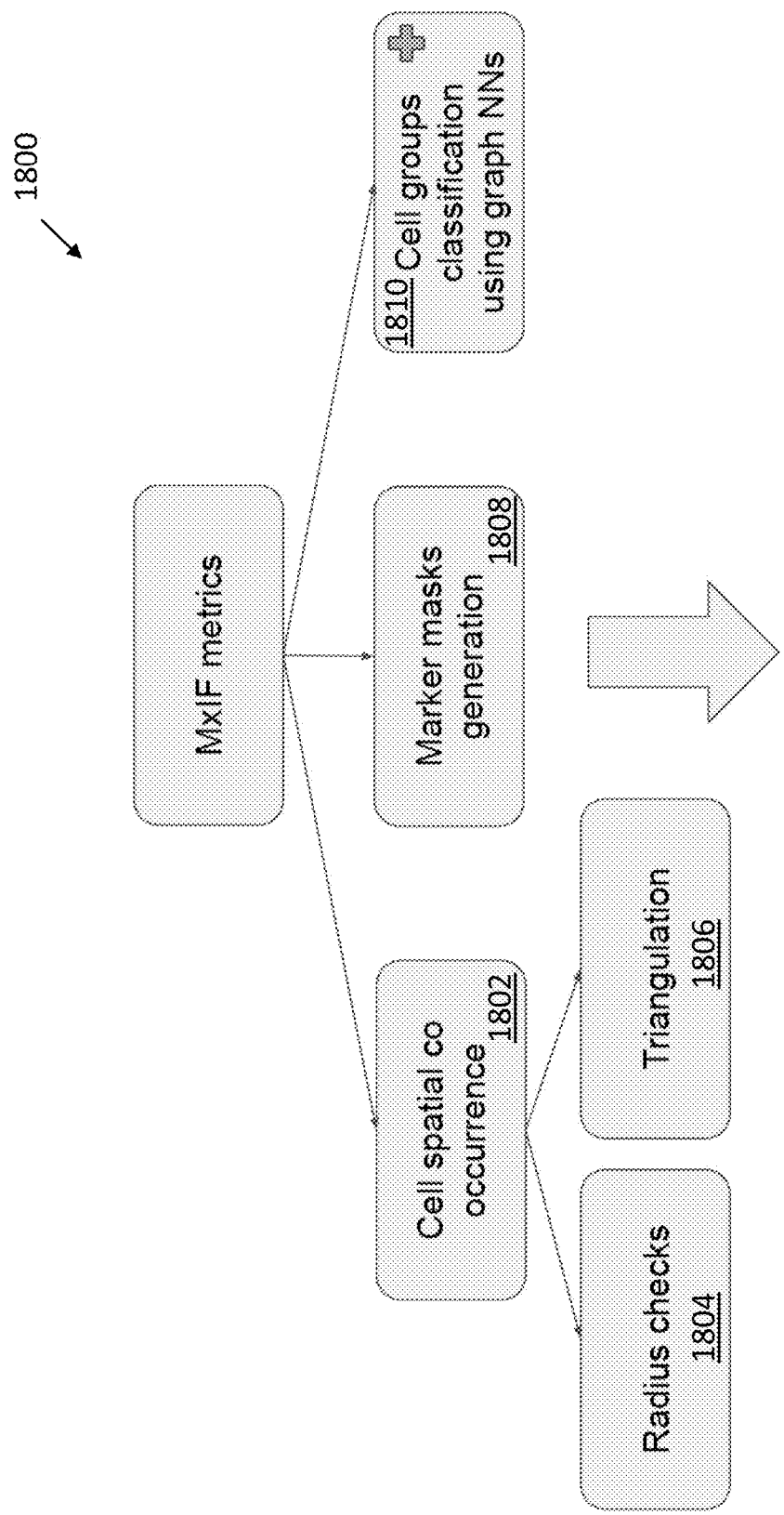
FIG. 18 is a diagram illustrating exemplary tissue characteristics that can be determined by processing MxIF images, according to some embodiments of the technology described herein.

FIG. 18 is a diagram 1800 illustrating exemplary tissue characteristics that can be determined by processing MxIF images, according to some embodiments of the technology described herein. One or more of the tissue characteristics can be determined by, for example, the characteristic determination module 360 in FIG. 3. The tissue characteristics discussed in conjunction with FIG. 18 can be determined as part of various processes and sub-processes described herein. For example, one or more of the tissue characteristics can be determined as part of step 510 of FIG. 5A. As shown, the characteristics can include and/or be used to determine cell spatial co-occurrences 1802, which can be used for radius checks 1804 and/or triangulation 1806. The characteristics can be used to generate one or more masks 1808. The characteristics can include and/or be used to classify cell groups 1810. In some embodiments, the techniques can include classifying the cell groups using graph neural networks.

In some embodiments, the cell grouping information can be used to determine one or more masks that can be applied to the immunofluorescence images to indicate aspects of the tissue. An example of a mask is a tumor mask that includes data indicative of the cells of a tumor in the tissue sample. Another example of a mask is an acini mask that includes data indicative of the spacing among the cells in the tissue sample, which can identify ducts that form gaps/spaces between the cells. For example, the acini mask can show the ductal tubes of a tumor that produce secretions, and can therefore provide information regarding the shape of the tubes (e.g., since different tumors may have different shapes/sizes of the tubes). A further example of a mask is a stroma mask that includes information indicative of the supportive tissue and/or stromal cells in the tissue sample.

In some embodiments, the masks can be used to identify cells in different regions of the tissue sample. For example, masks of the acini, tumor, and stroma can be created and used to understand where certain cells are in the tissue sample, such as T cells. For example, the masks can be used to identify T cells in stromal areas and/or non-stromal areas.

Figure 19A:
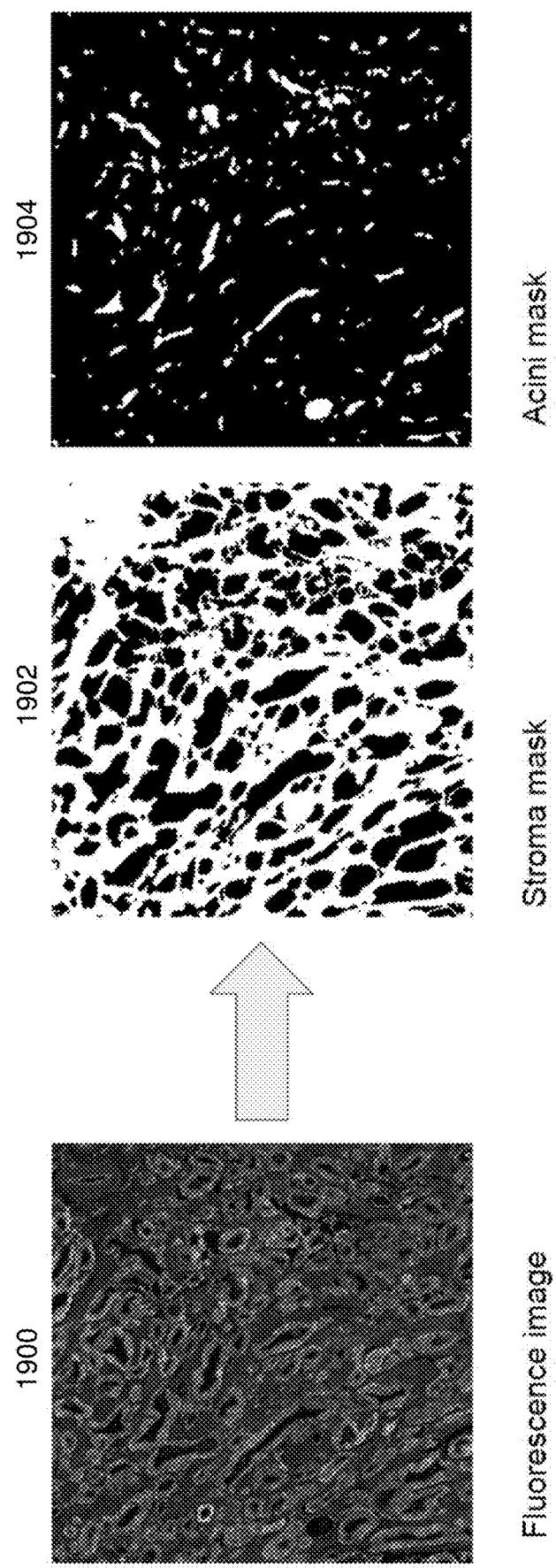
FIG. 19A is a diagram of a stroma mask and an acini mask generated by processing an immunofluorescence image, according to some embodiments of the technology described herein.

FIG. 19A is a diagram of a stroma mask 1902 and an acini mask 1904 generated by processing an immunofluorescence image 1900, according to some embodiments of the technology described herein. As described above, the stroma mask 1902 includes data indicative of the supportive tissue of the tissue sample, and the acini mask 1904 includes data indicative of the spacing of the cells in the tissue sample. In some embodiments, the techniques can include generating a stromal mask using a cytoplasmic marker (e.g., S6 marker, which is expressed in most, if not all, cells) to identify cytoplasmic areas in the tissue sample and excluding areas identified using an epithelial marker (e.g., PCK26 epithelial marker). In some embodiments, the cytoplasmic marker image can be smoothed and/or thresholded to perform noise removal as described herein. In some embodiments, the epithelial marker image can have holes filled (e.g., such that inner portions of contiguous shapes are filled, and therefore removed from the ultimate stromal mask). In some embodiments, the techniques can include generating an acini mask using an epithelial marker (e.g., a smoothed PCK26 mask), which can be inverted and stromal zone(s) can be removed to generate the ultimate acini mask. Epithelial markers can be used to generate other masks as well, such as tumor masks (using a smoothed PCK26 mask).

Figure 19B:
FIG. 19B is a diagram of using features of a tissue sample to generate an object mask, according to some embodiments of the technology described herein.
Figure 19B:
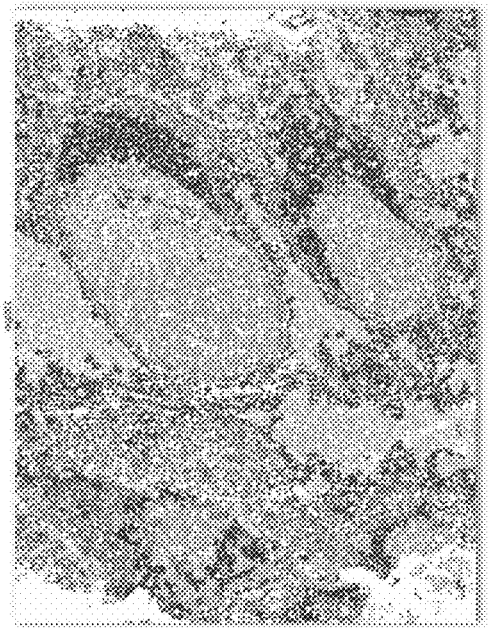
Figure 19B:
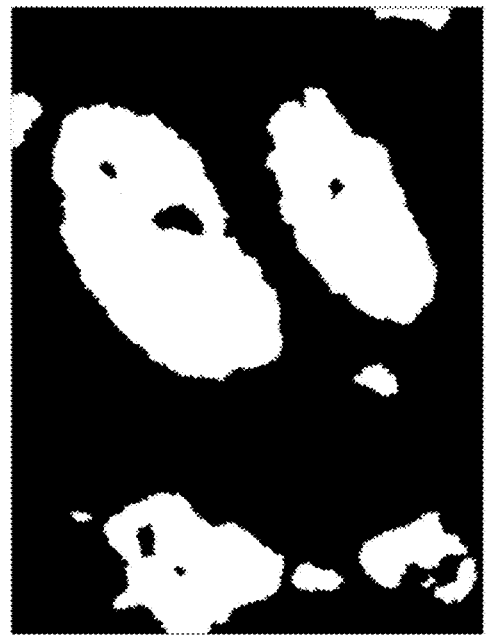
Figure 19B:
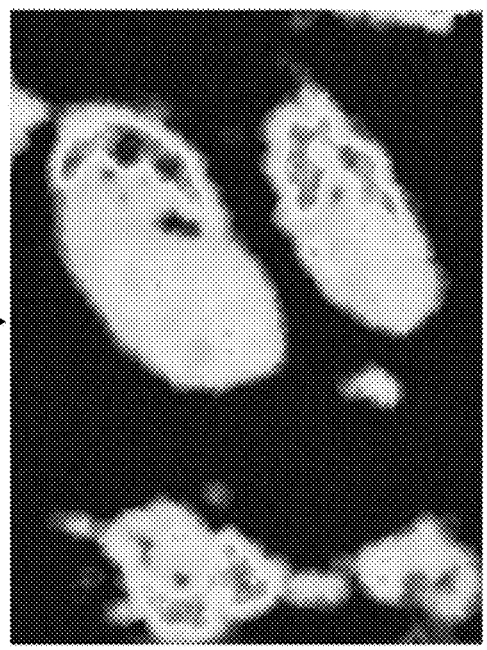

In some embodiments, objects can be masked based on cell community information (e.g., determined as discussed in conjunction with FIG. 7B). For example, an object mask can be created based on the cell community information, such that each one or more cell communities identified in the cell community information correspond to an associated object in the mask. Objects in the object mask can therefore correspond to single and/or multicellular structures identified in the cell community information. FIG. 19B is a diagram of using features of a tissue sample to generate an object mask 1956, according to some embodiments of the technology described herein. The object mask 1956 can be generated based on cell features of the tissue sample, such as cell coordinates, cell labels (e.g., community information), and image shape data, as shown by 1950 and 1952. In particular, image 1950 in this example shows cell contours shaded based on community type, and image 1952 in this example shows cells that belong to identified communities. One or more object detection algorithms can be used to process the cell features to determine regions (e.g., using Voronoi tessellation) and to count objects. For example, the object detection algorithms can generate cell labels and count the cell labels to generate Voronoi regions/cells from a tessellation of the tissue sample (e.g., a randomly created tessellation of the tissue sample). As a result, a density heatmap 1954 can be generated based on the object detection algorithms. The density heatmap 1954 is shaded with dark or light colors based on the number of cells detected in each Voronoi cell from image 1952. The computing device can perform thresholding to create the object mask 1956 of objects with high density of the cells with chosen labels. As an illustrative example, lymph node follicles can be detected based on communities relative to dark, light and mantle zones of the lymph node tissue sample.

Figure 20:
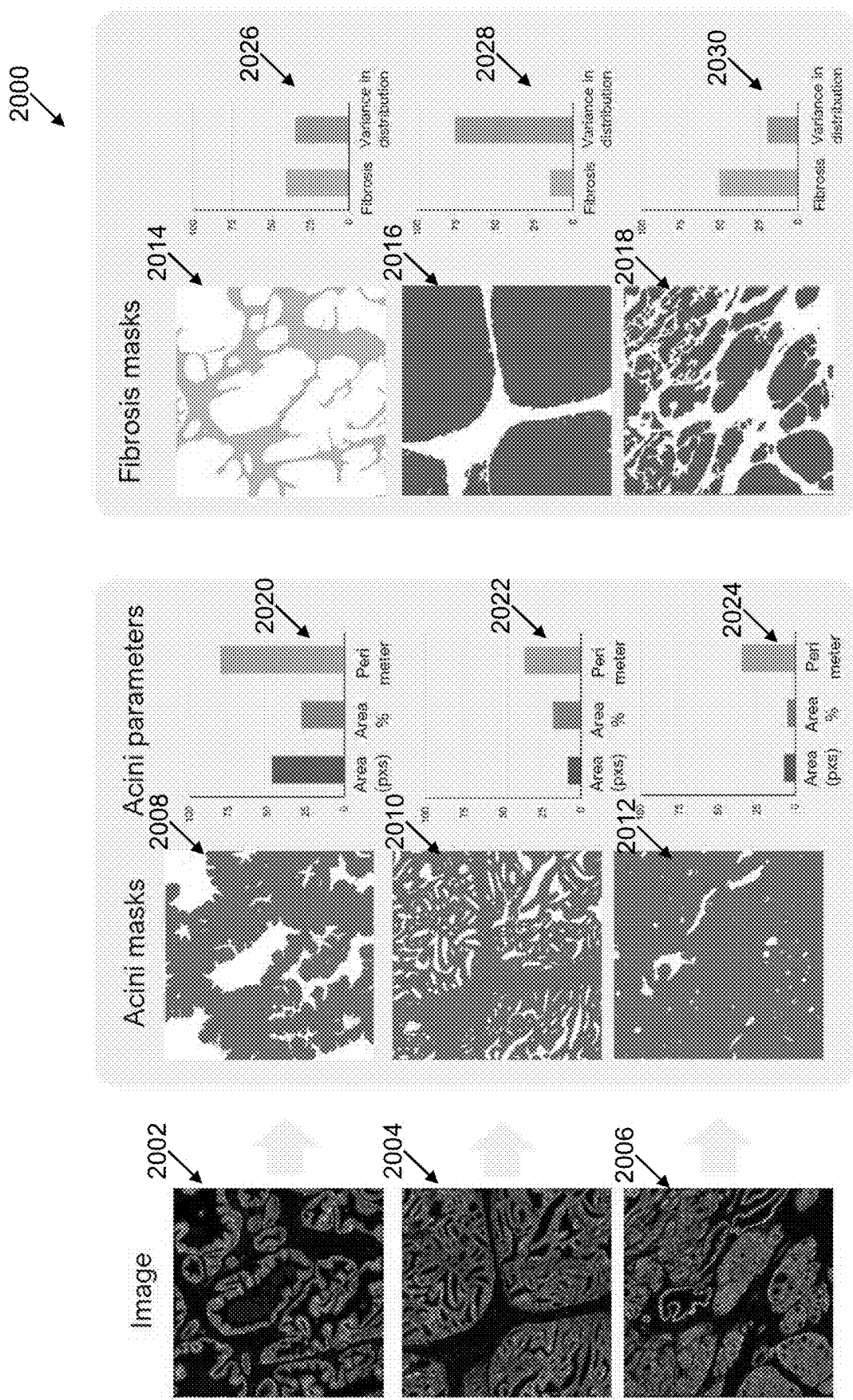
FIG. 20 is a diagram showing examples of measuring acini shape, area and perimeter, according to some embodiments of the technology described herein.

FIG. 20 is a diagram 2000 showing examples of measuring acini shape, area and perimeter characteristics, according to some embodiments of the technology described herein. The diagram 2000 includes three images 2002, 2004 and 2006. The diagram 2000 shows corresponding acini masks 2008, 2010 and 2012 for images 2002, 2004 and 2006, respectively. As shown in FIG. 20, each acini mask 2008, 2010 and 2012 has a corresponding set of parameters 2020, 2022 and 2024, including a measure of the area of the acini structure in the acini mask in pixels, a measure of the area of the acini structure as a percentage of the acini mask (e.g., the percentage of mask pixels to the total number of image pixels), and a measure of the perimeter of the acini structure in pixels. Such parameters can provide information about the acini structure. For example, comparing the acini area to acini perimeter (e.g., as a ratio) can provide information about the overall structure of the acini. The diagram 2000 also shows corresponding fibrosis masks 2014, 2016 and 2018 for images 2002, 2004 and 2006, respectively. The fibrosis masks show connective tissue, which is a stromal mask and can therefore be generated as described herein for stromal masks. Each fibrosis mask 2014, 2016 and 2018 has a corresponding set of parameters 2026, 2028, and 2030, including a measure of the area of the fibrosis mask filled by stromal tissue, and a measure of the variance in distribution of the stromal tissue (e.g., which can provide information regarding how spread out the stromal tissue is in the mask).

Figure 21:
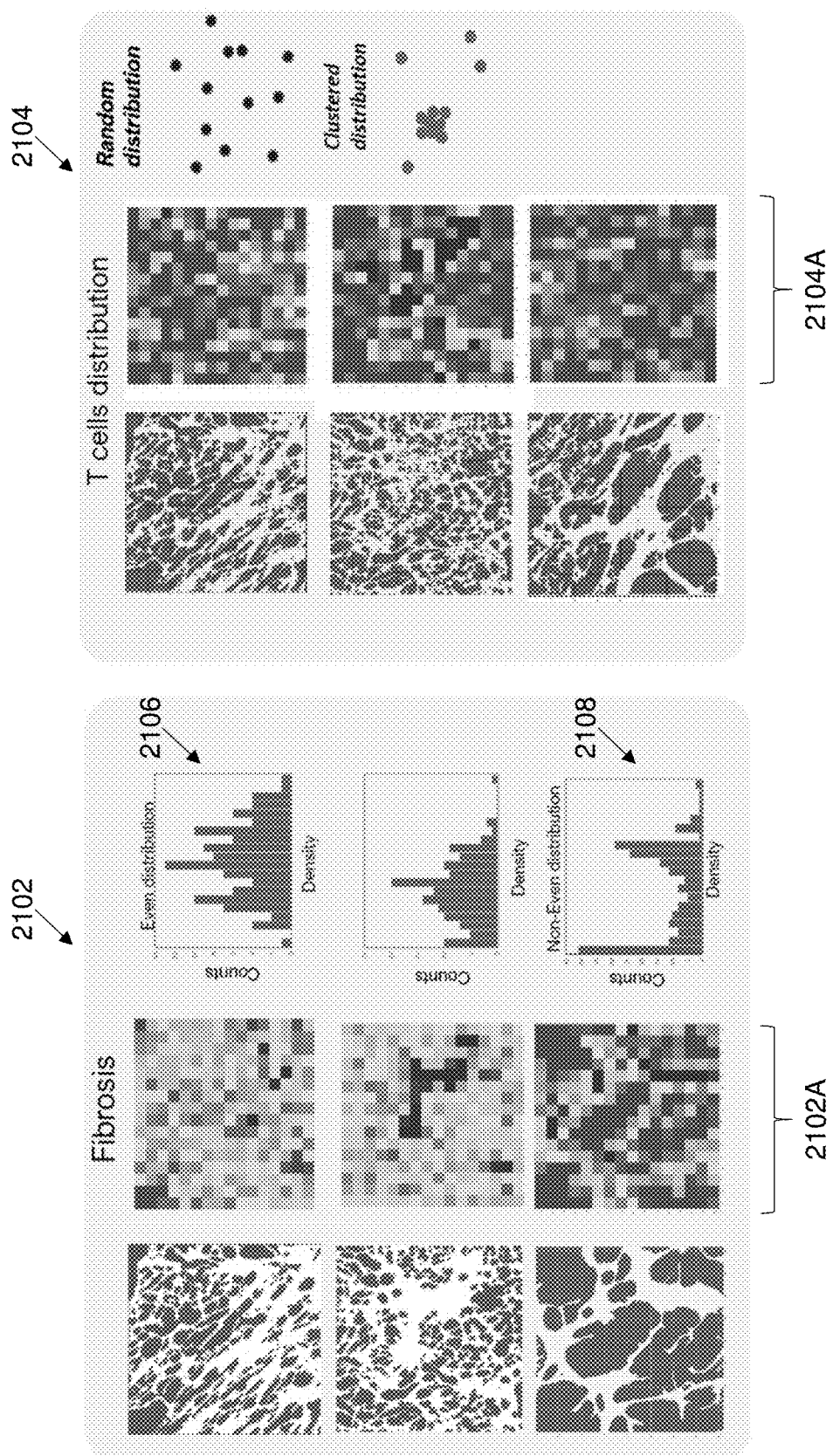
FIG. 21 is a diagram showing examples of spatial distribution characteristics, according to some embodiments of the technology described herein.

FIG. 21 is a diagram showing examples of spatial distribution characteristics, according to some embodiments of the technology described herein. FIG. 21 includes examples 2102 of measuring fibrosis distributions and examples 2104 of measuring t cell distributions. The fibrosis heatmaps 2102A and the t cell heatmaps 2104A can be shaded to indicate fibrosis and t cell densities, respectively. For example, a darker color (e.g., dark red) can indicate the most dense areas, a lighter color (e.g., light red) can indicate the next most dense areas, then another color (e.g., light blue) can indicate further less dense areas, and another color (e.g., dark blue) can show the least dense areas (e.g., and may be another darker color to improve contrast from denser areas). In some embodiments, the distribution can be used to provide a concentration measure of the stromal tissue. For example, the variance in distribution of the stromal tissue (e.g., as discussed in conjunction with FIG. 20) can be determined based on the standard deviation of the stromal distribution. In some embodiments, for example, the stromal distribution can be determined by splitting a stromal mask image into squares of equal size (e.g., using tessellation), and a representative value can be determined for each square for comparison with other squares. For example, the percentage of pixels indicative of stromal tissue can be used as a distribution for which standard deviation can be calculated. In such examples, the techniques can measure how homogenously distributed the stroma is in the mask. For example, top fibrosis distribution 2106 has an even distribution that is indicative of the mask not including large areas without stroma, while bottom fibrosis distribution 2108 is not even and therefore indicative of the mask including areas with no stroma.

Figure 22:
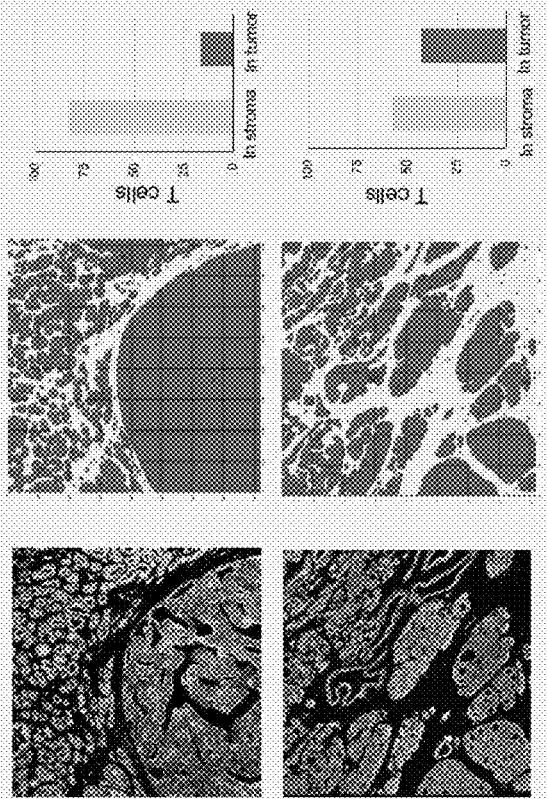
FIG. 22 is a diagram showing examples of spatial organization characteristics, according to some embodiments of the technology described herein.
Figure 22:
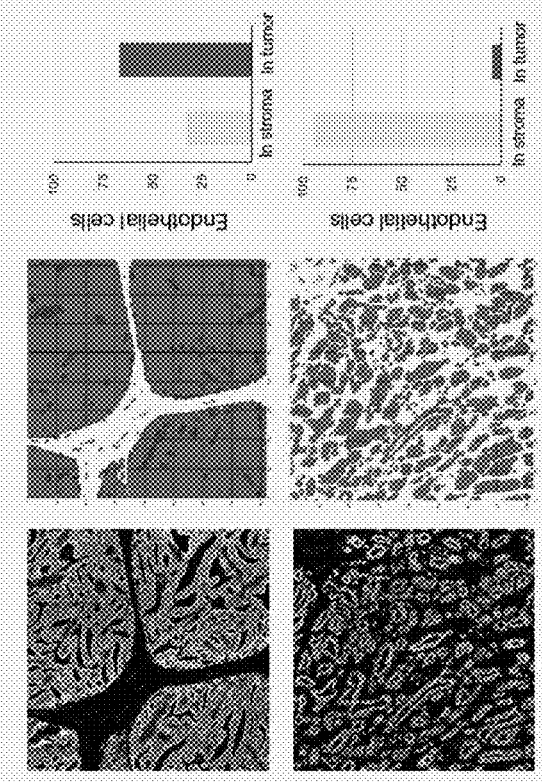

FIG. 22 is a diagram showing examples of spatial organization characteristics, according to some embodiments of the technology described herein. FIG. 22 includes examples 2202 of measuring the distribution of endothelial cells in positive areas in the tumor mask (in the malignant cells) and in negative areas in the tumor mask (in non-malignant compartments), and examples 2204 of measuring the distribution of T cells in the malignant cells and non-malignant compartments.

Figure 23:
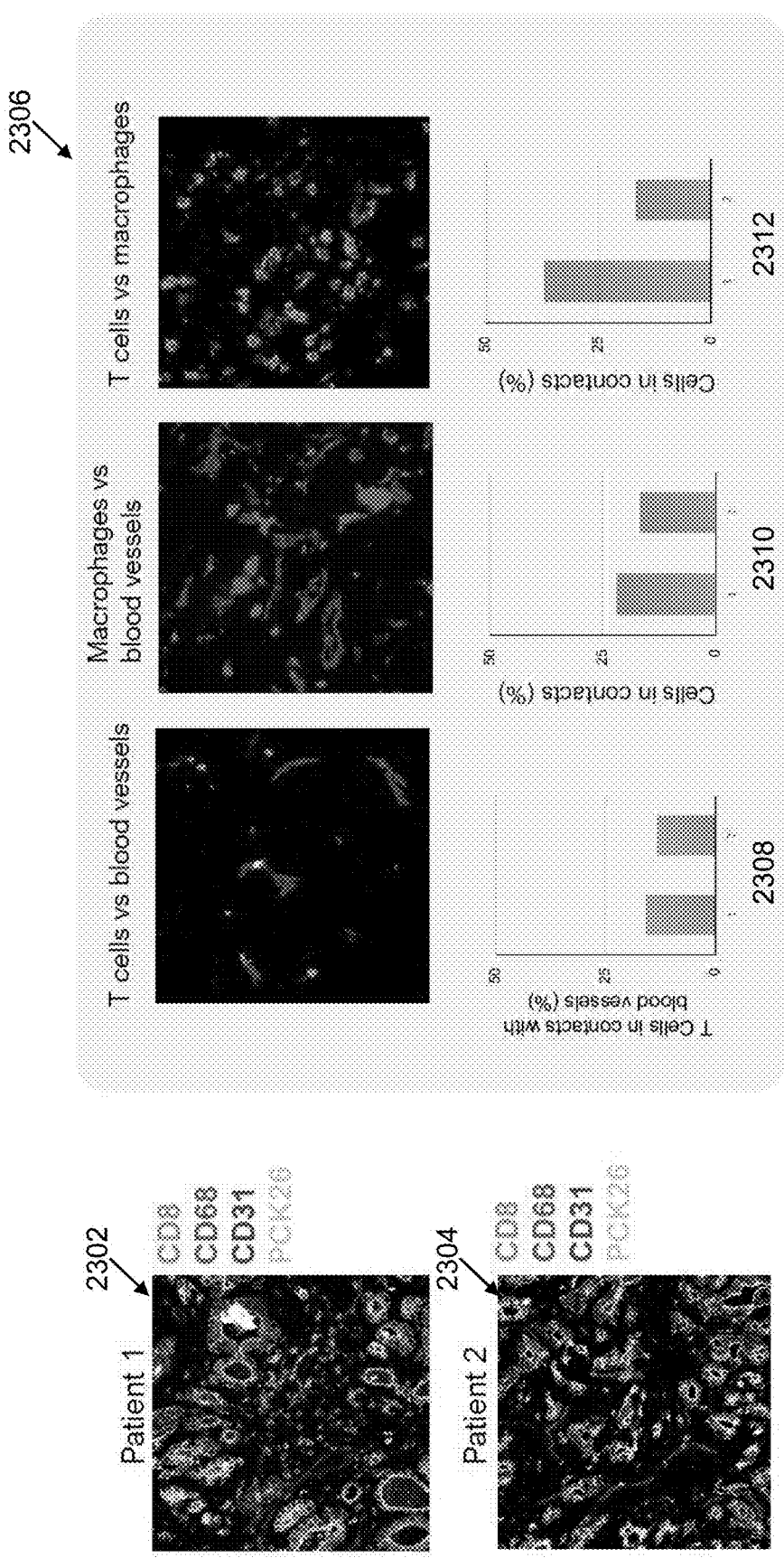
FIG. 23 is a diagram showing an example of cell contact information for immunofluorescence images for two different patients, according to some embodiments of the technology described herein.

FIG. 23 is a diagram showing an example of cell contact information for immunofluorescence images for two different patients, according to some embodiments of the technology described herein. As described herein, the cell contact information can be one of the determined characteristic(s) of the tissue sample. For example, the cell contact information can be determined as part of step 510 of FIG. 5A, and can be determined based on multiple groups of cells determined for a tissue sample (e.g., where each group is associated with a different cell type). Immunofluorescence image 2302 is of a tissue sample of patient 1, and immunofluorescence image 2304 is of a tissue sample of patient 2. Both images 2302 and 2304 include markers for CD8, CD68, CD31 and PCK26. The characteristic information 2306 includes, for each of patient 1 and 2, information 2308 regarding the percentage of T cells in contact with blood vessels, information 2310 regarding the percentage of macrophages in contact with blood vessels, and information 2312 regarding the percentage of T cells in contact with macrophages.

Figure 24:
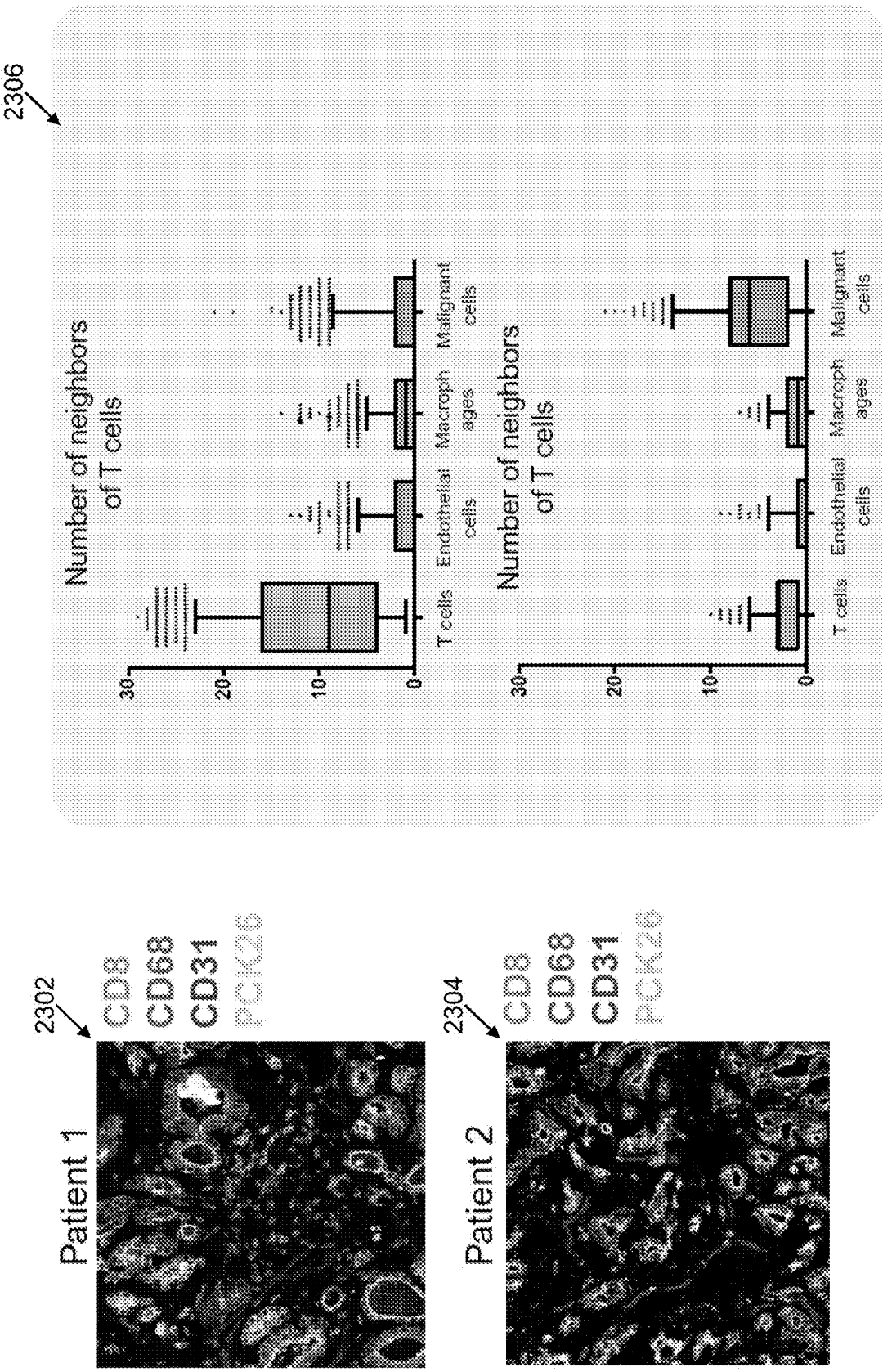
FIG. 24 is a diagram showing examples of information regarding cell neighbor information for the two different patients of FIG. 23, according to some embodiments of the technology described herein.

FIG. 24 is a diagram showing examples of information regarding cell neighbors for the two different patients of FIG. 23, according to some embodiments of the technology described herein. As described herein, the cell neighbor information can be one of the determined characteristic(s) of the tissue sample, and can indicate which types of cell(s) neighbor other cell type(s). The cell neighbors can include both cell type(s) in contact with a cell type, as well as cells that are not in contact with the cell type but also do not have other cell(s) between them. FIG. 24 includes the immunofluorescence images 2302 and 2034 from FIG. 23. FIG. 24 also includes characteristic information 2306 showing the number of neighbors of T cells for each of immunofluorescence images 2302 and 2034.

Figure 25:
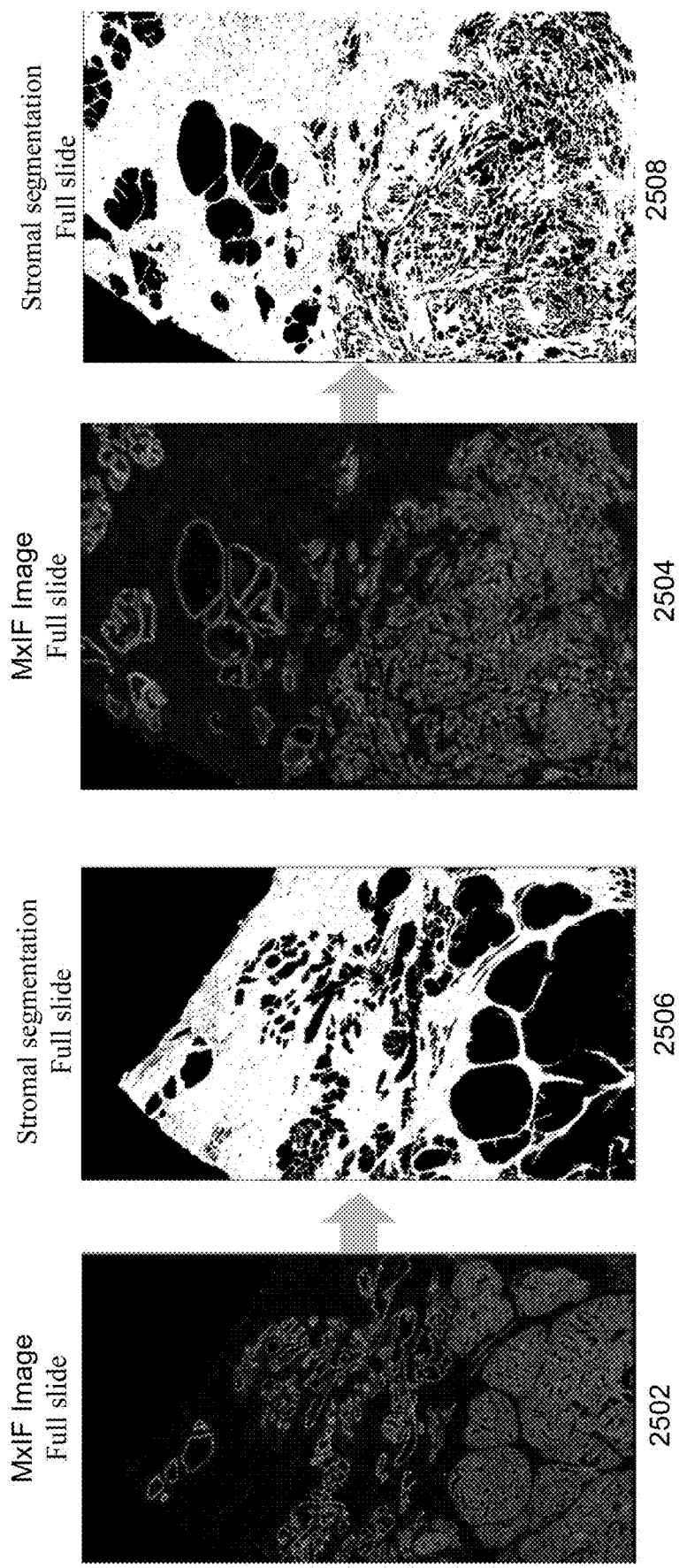
FIG. 25 shows two examples of MxIF images and corresponding stromal segmentation masks, according to some embodiments of the technology described herein.

FIG. 25 shows two examples of MxIF images 2502, 2504 and corresponding stromal segmentation masks 2506, 2508, respectively, according to some embodiments of the technology described herein.

Figure 26:
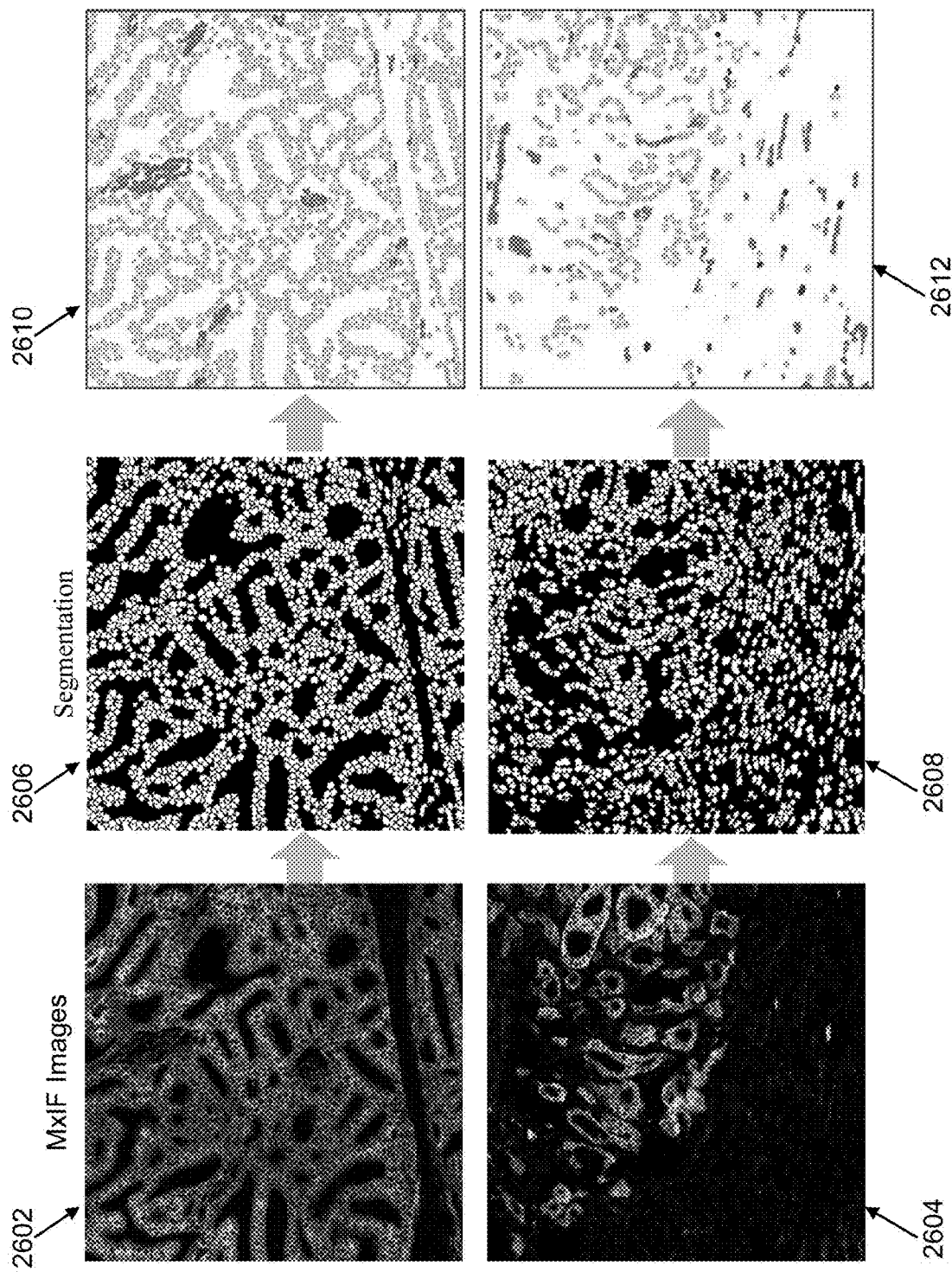
FIG. 26 shows exemplary MxIF images, segmentation masks, and corresponding cell groups, according to some embodiments of the technology described herein.

FIGS. 26-35 show various aspects of cell groups and related characteristic information determined using the techniques described herein. FIG. 26 shows exemplary MxIF images 2602 and 2604, segmentation masks 2606 and 2608, and corresponding cell groups 2610 and 2612, according to some embodiments of the technology described herein.

Figure 27:
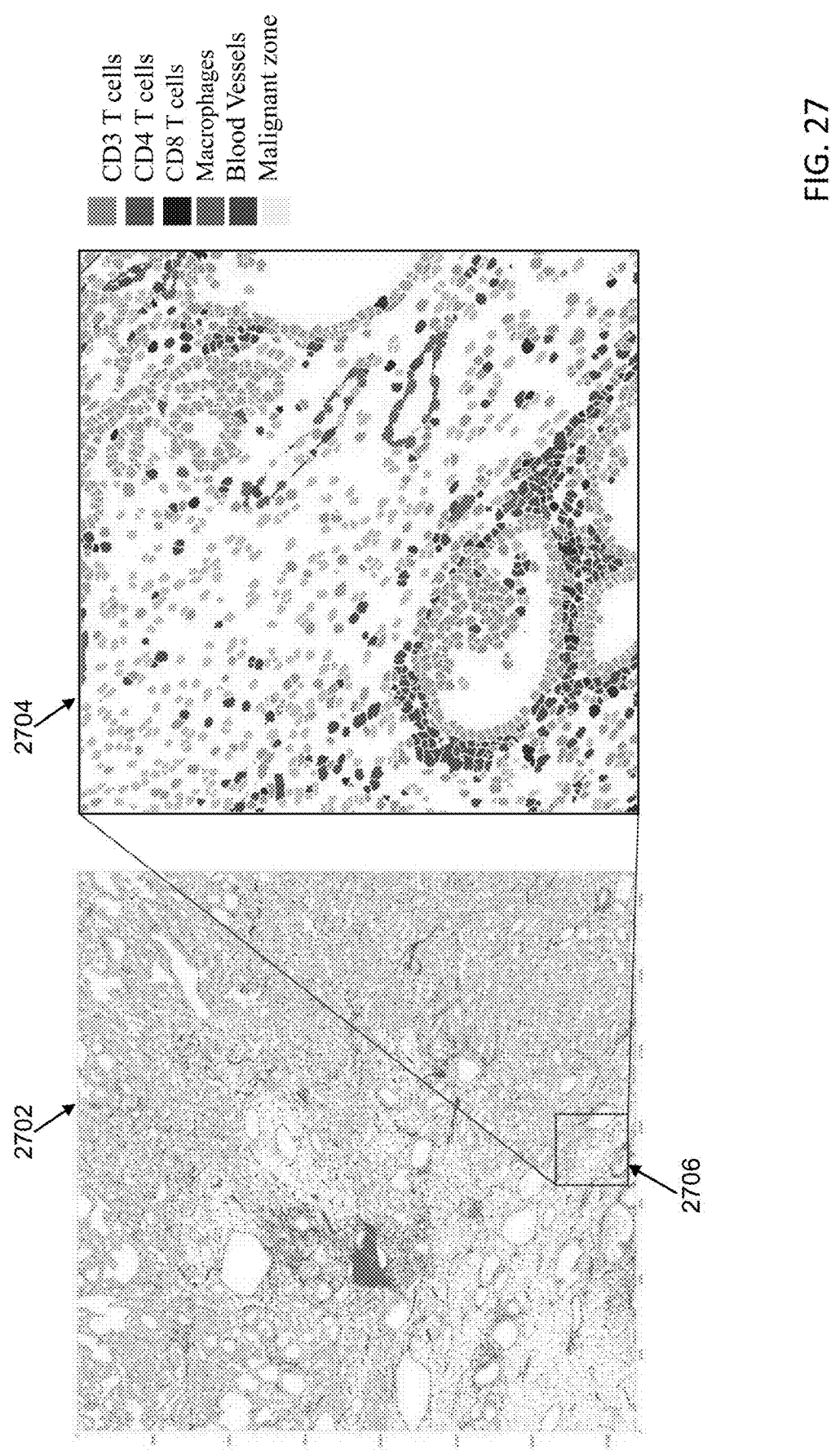
FIG. 27 shows an example of a full MxIF slide processing to generate cell groups, according to some embodiments of the technology described herein.

FIG. 27 shows an example of a full MxIF slide processing to generate cell groups, according to some embodiments of the technology described herein. FIG. 27 shows a view 2702 of the cell group information and a blown-up view 2704 of portion 2706 of the view 2702. The cell groups include CD3 T cells, CD4 T cells, CD5 T cells, macrophages, blood vessels, and malignant zone cells.

Figure 28:
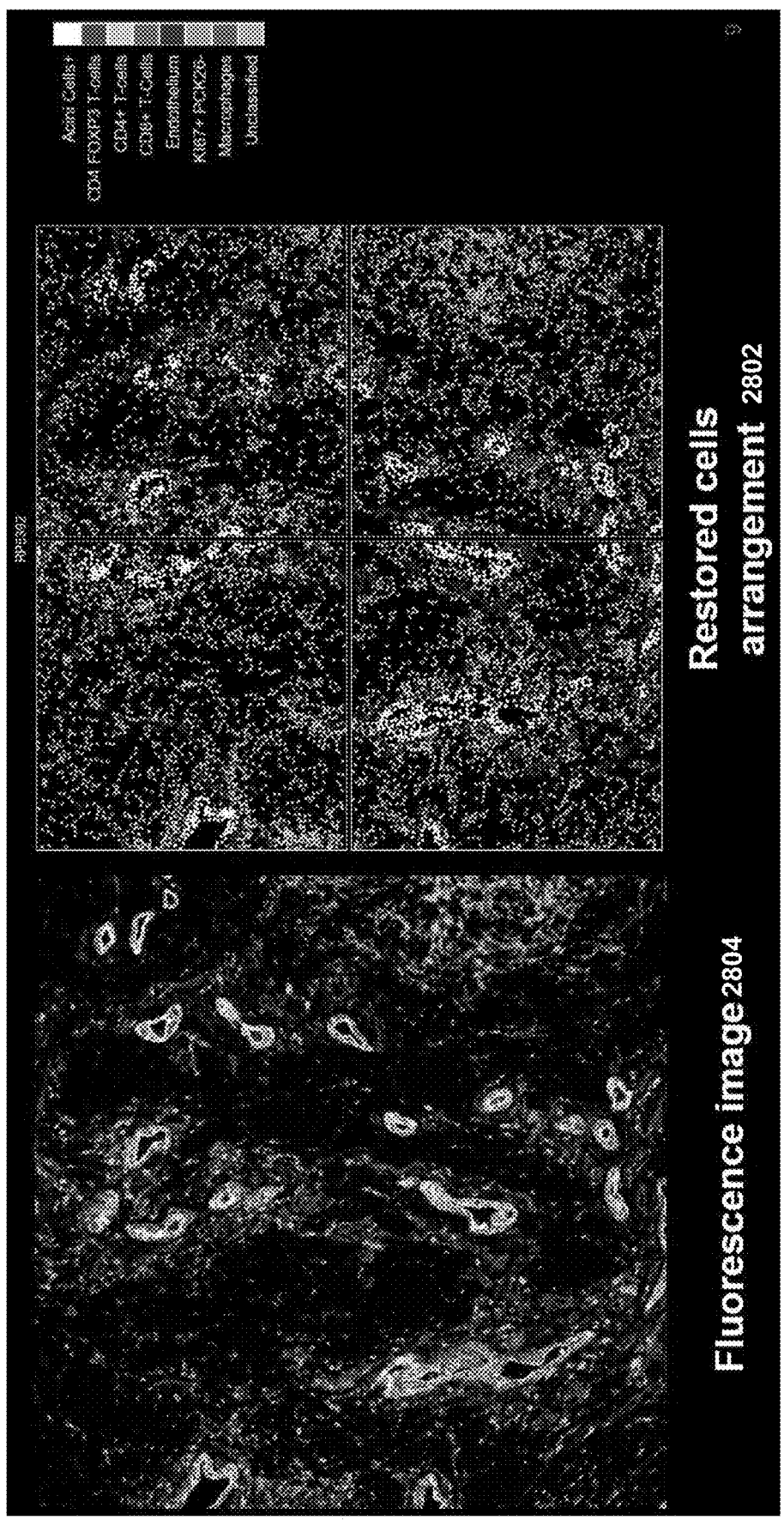
FIG. 28 is a diagram of a restored cell arrangement generated by processing an immunofluorescence image, according to some embodiments of the technology described herein.

FIG. 28 is a diagram of a restored cell arrangement 2802 generated by processing immunofluorescence image 2804, according to some embodiments of the technology described herein. The restored cell arrangement 2802 shows cells in the tissue sample (e.g., where each of the cell types correspond to a different group of cells). The restored cell arrangement 2802 shows acini cells, CD4 FOXP3 T cells, CD4 T cells, CD8 T cells, endothelium cells, K167 and PCK26 cells, macrophages, and unclassified cells.

Figure 29:
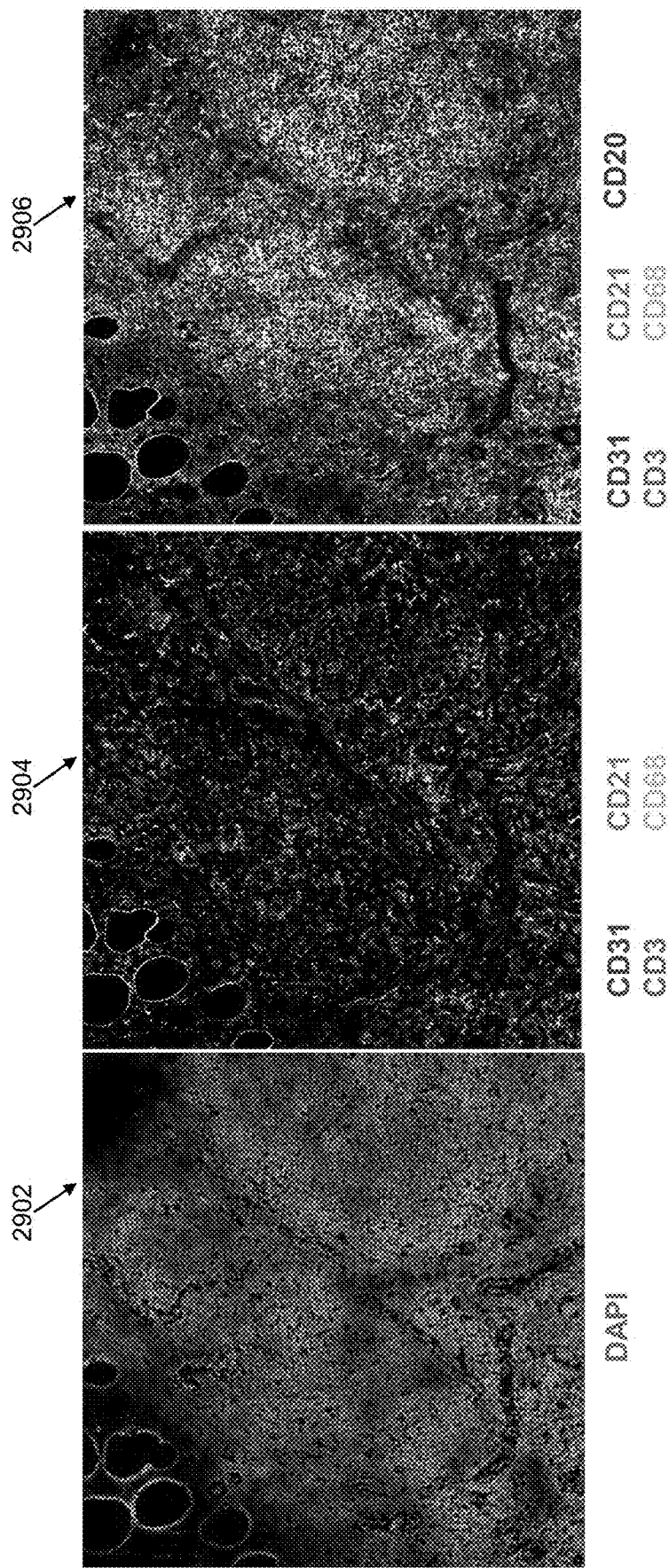
FIG. 29 shows a 4',6-diamidino-2-phenylindole (DAPI) stained immunofluorescence image and two images of different cell groups for the DAPI image, according to some embodiments of the technology described herein.

FIG. 29 shows a 4',6-diamidino-2-phenylindole (DAPI) stained immunofluorescence image 2902 and two images 2904 and 2096 of different cell groups for the DAPI image, according to some embodiments of the technology described herein. Image 2904 includes markers for CD31, CD21, CD3, and CD68. Image 2906 also includes markers for CD31, CD21, CD3, and CD68, and further includes CD20.

Figure 30:
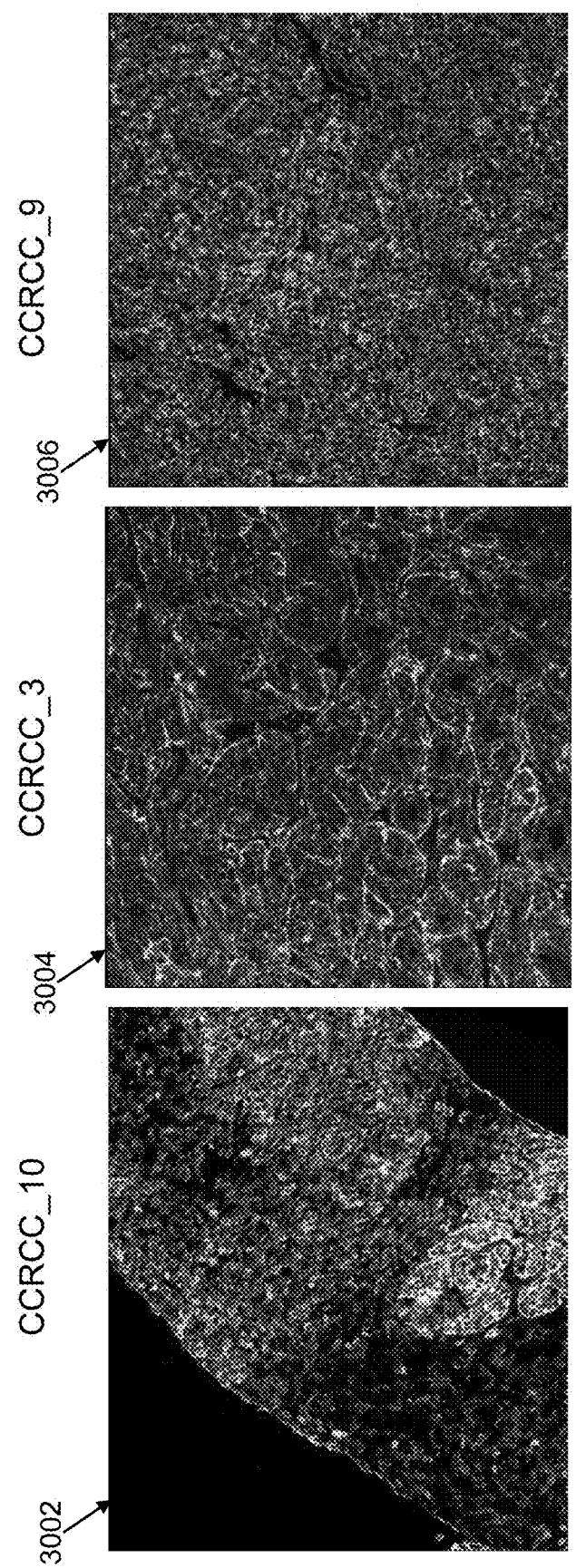
FIG. 30 shows cell groups for different CCRCC tissue samples, according to some embodiments of the technology described herein.

FIG. 30 shows cell groups for different CCRCC tissue samples 3002, 3004 and 3006, according to some embodiments of the technology described herein.

Figure 31:
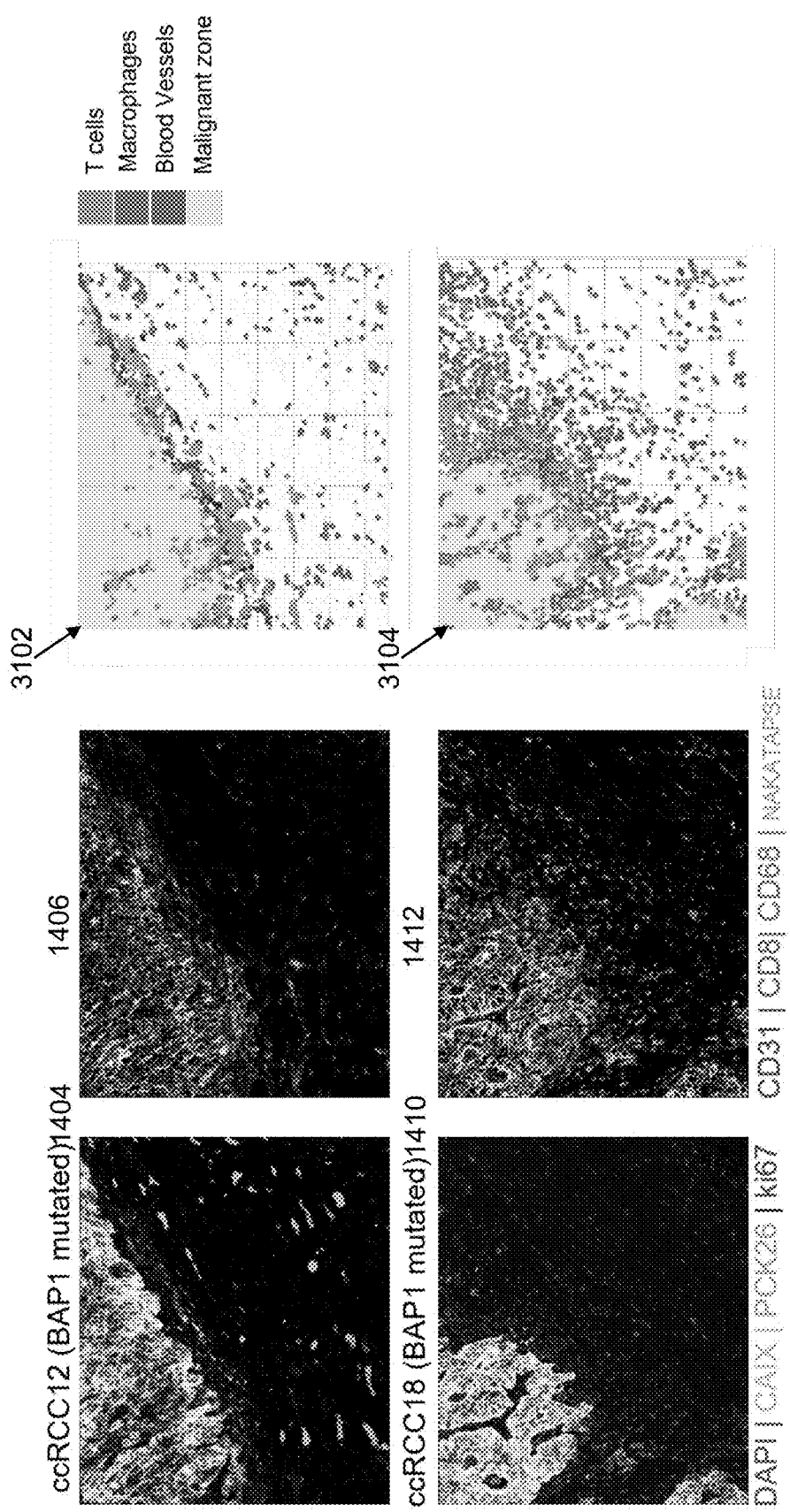
FIG. 31 is a diagram showing exemplary cell groups for the exemplary MxIF images obtained of kidney tissue from FIG. 14, according to some embodiments of the technology described herein.

FIG. 31 is a diagram showing exemplary cell groups for the exemplary MxIF images 1404, 1406, 1410 and 1412 obtained of kidney tissue from FIG. 14, according to some embodiments of the technology described herein. Cell groups 3102 were determined based on MxIF images 1404 and 1406, and cell groups 3104 were determined based on MxIF images 1410 and 1412. The cell groups include T cells, macrophages, blood vessels, and the malignant zone.

Figure 32:
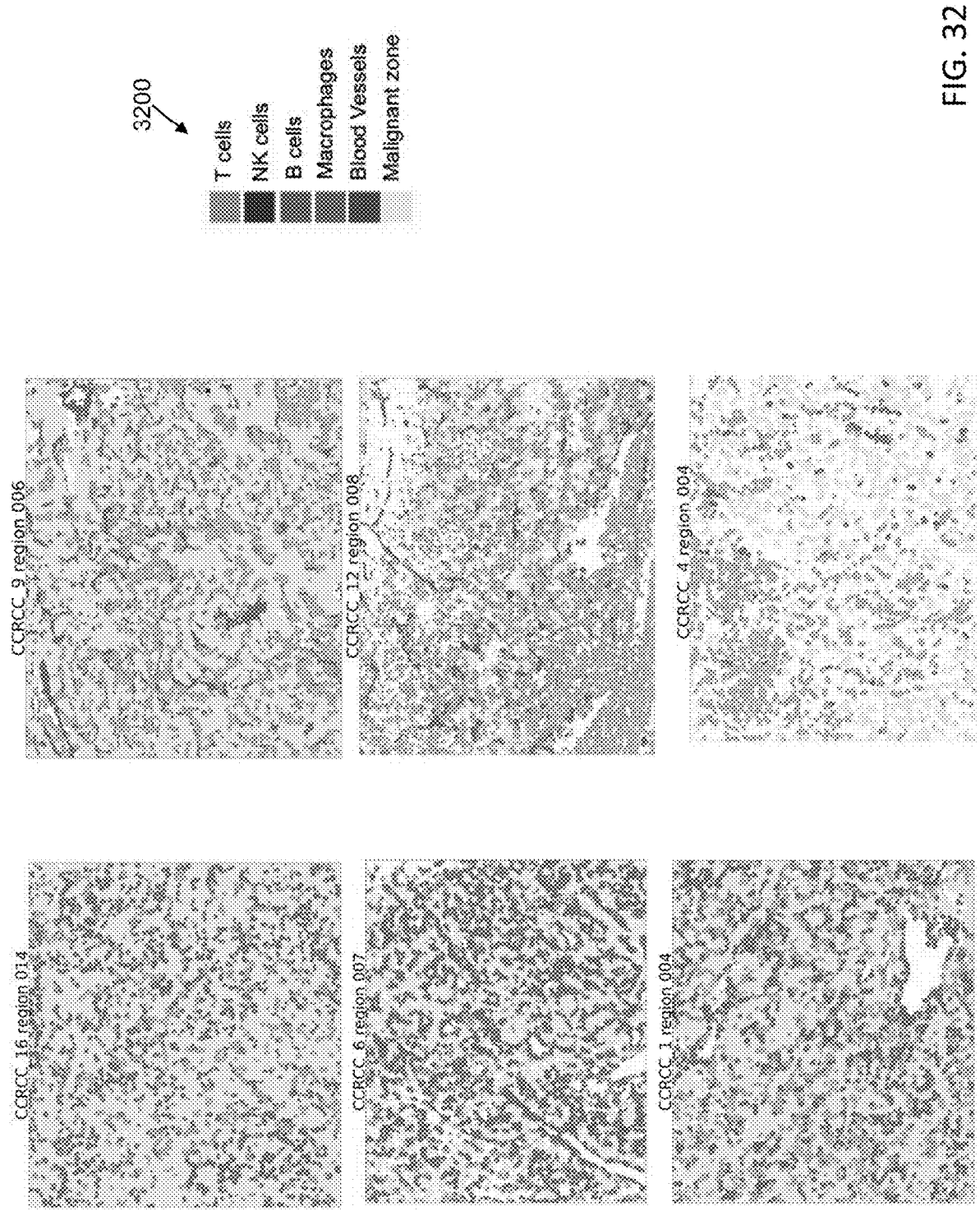
FIG. 32 shows a set of images of cell groups for different clear cell renal cell carcinoma (CCRCC) tissue samples, according to some embodiments of the technology described herein.
Figure 33:
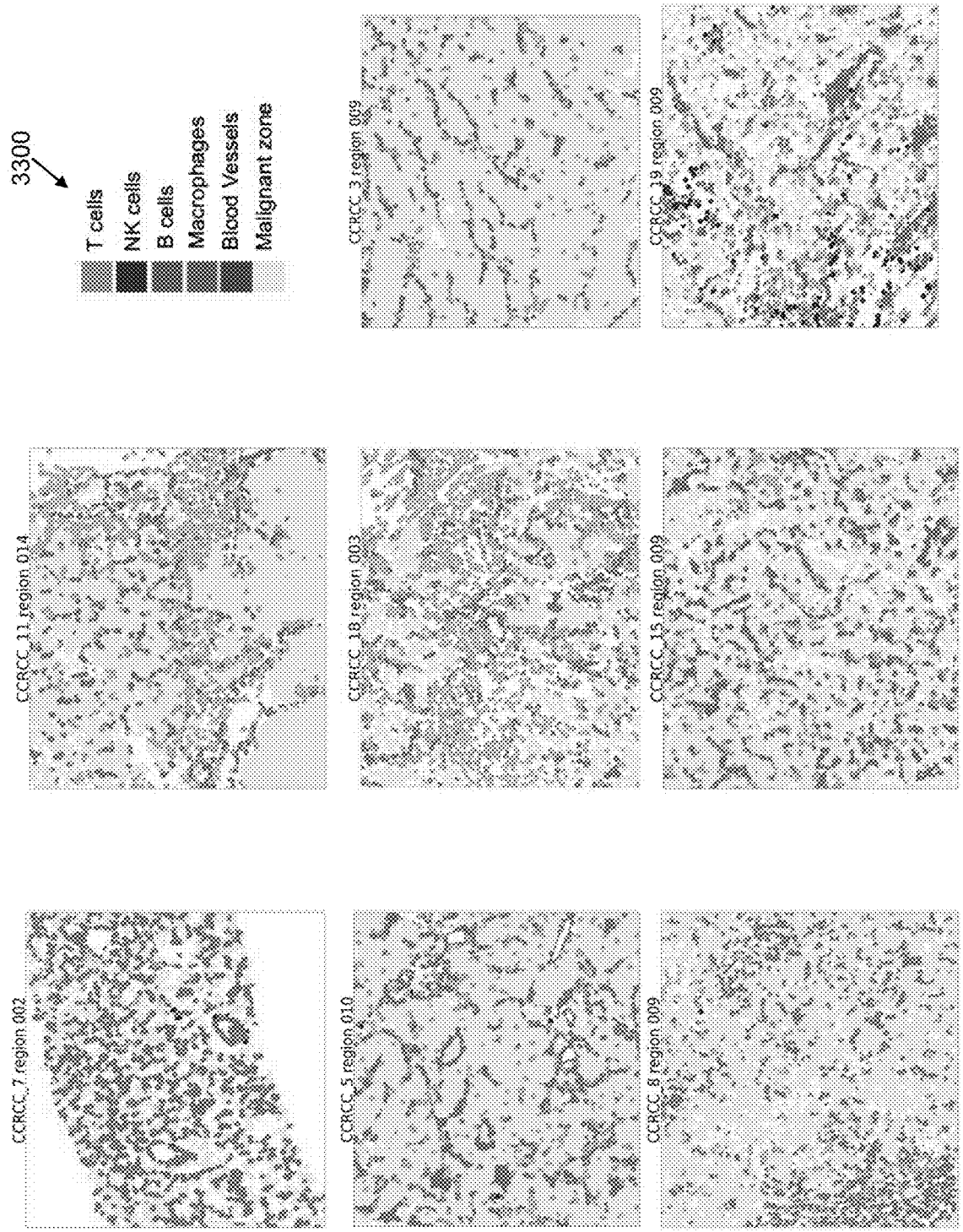
FIG. 33 shows a series of images of cell groups for different CCRCC tissue samples, according to some embodiments of the technology described herein.

FIG. 32 shows a set of images 3200 of cell groups for different clear cell renal cell carcinoma (CCRCC) tissue samples, according to some embodiments of the technology described herein. The images 3200 show cell groups for T cells, NK cells, B cells, macrophages, blood vessels, and the malignant zone. FIG. 33 shows a series of images 3300 of cell groups for different CCRCC tissue samples, according to some embodiments of the technology described herein. Like with FIG. 32, the images 3300 show cell groups for T cells, NK cells, B cells, macrophages, blood vessels, and the malignant zone. The techniques described herein can therefore allow for identifying, for example, both T cells and the malignant zone in the tissue samples.

Figure 34:
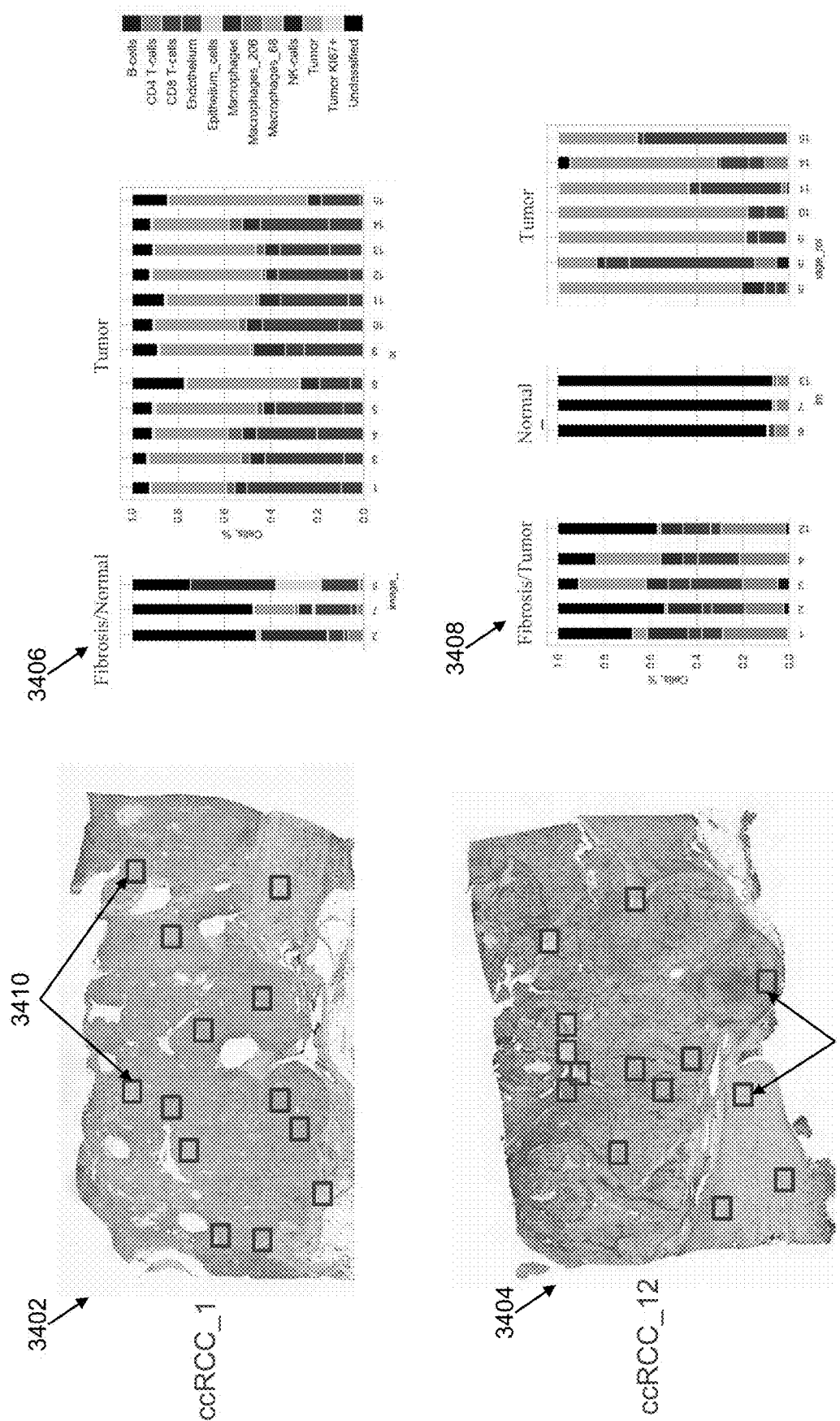
FIG. 34 is a diagram showing an analysis of two different MxIF images of CCRCC tissue samples, according to some embodiments of the technology described herein.

FIG. 34 is a diagram showing an analysis of two different MxIF images of CCRCC tissue samples, according to some embodiments of the technology described herein. FIG. 34 includes CCRCC tissue samples 3402 and 3404 and corresponding characteristic information 3406 and 3408, respectively, for fifteen areas 3410 in image 3402 and fifteen areas 3412 in in image 3404 (e.g., determined as part of step 510 of FIG. 5A). The characteristic information shows, for each area 3410 and 3412, the percentage of B cells, CD4 T cells, CD8 T cells, endothelium, epithelium cells, macrophages, macrophages 206, macrophages 68, NK cells, tumor cells, tumor K167+, and unclassified cells in the area. The characteristic information classifies the fifteen areas 3410 as either fibrosis/normal or tumor areas, and classifies the fifteen areas 3412 as fibrosis/tumor, normal, or tumor areas.

Figure 35:
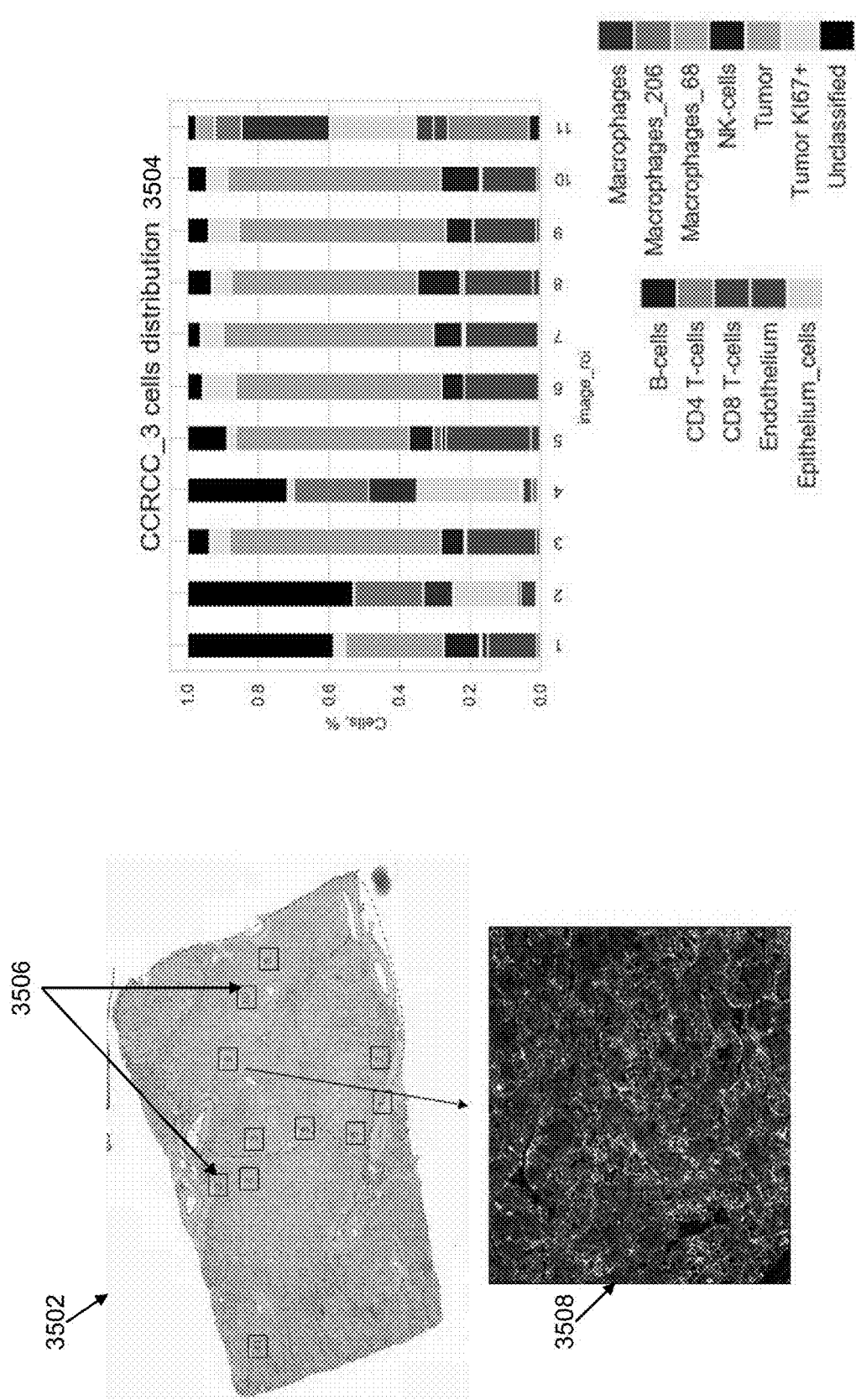
FIG. 35 is a diagram showing an analysis of a MxIF image of a CCRCC tissue sample, according to some embodiments of the technology described herein.

FIG. 35 is a diagram showing an analysis of a MxIF image of a CCRCC tissue sample 3502, according to some embodiments of the technology described herein. The analysis information 3504 shows for each of eleven areas 3506 of the tissue sample 3502, the percentage of B cells, CD4 T cells, CD8 T cells, endothelium, epithelium cells, macrophages, macrophages 206, macrophages 68, NK cells, tumor cells, tumor K167+, and unclassified cells in the area. FIG. 35 also shows a blown-up view 3508 of exemplary area 9.

Figure 36B:
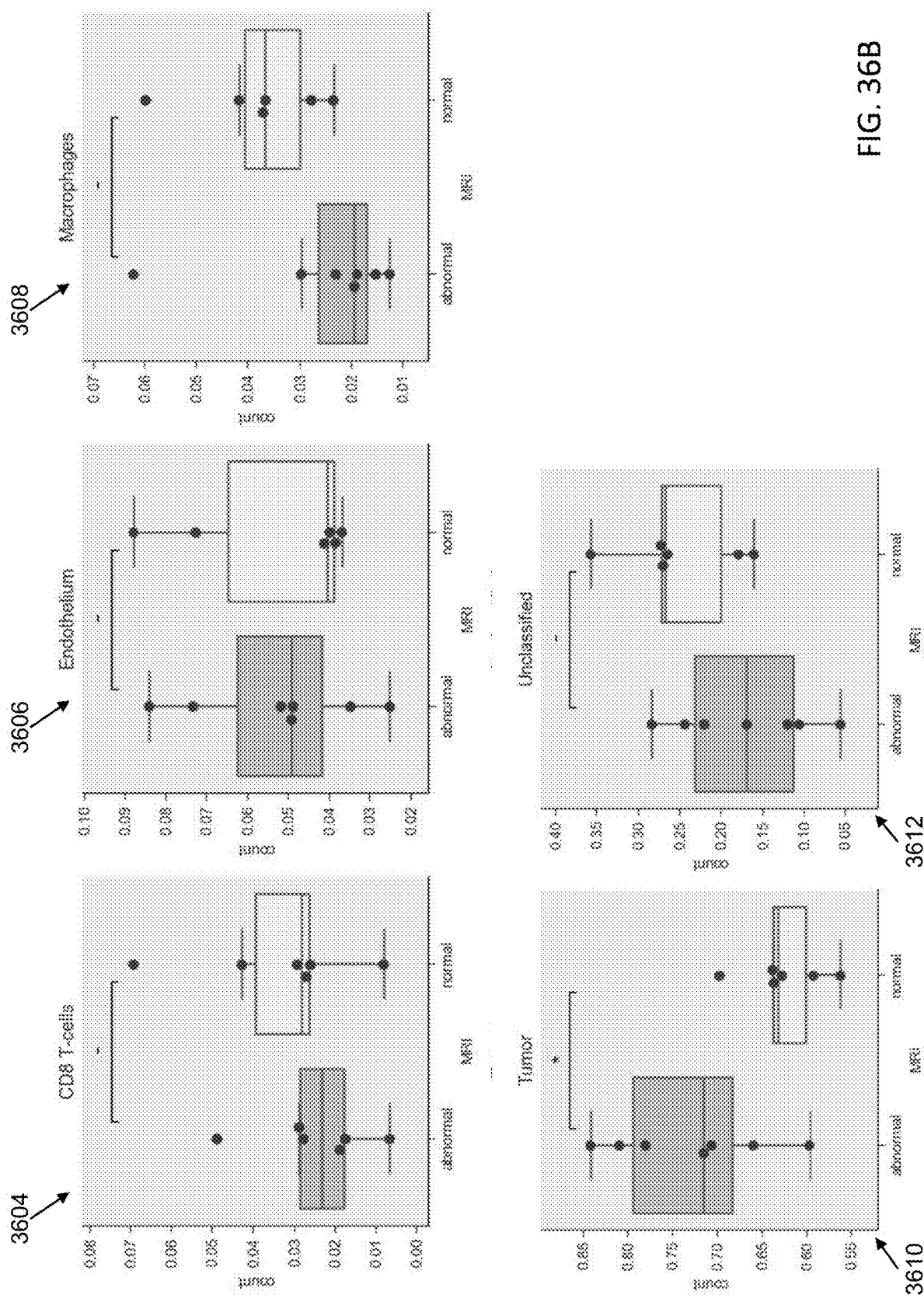

FIGS. 36A-41 generally show examples of tissue cell characteristics determined using the techniques described herein. FIGS. 36A-B are diagrams illustrating cell quantities and proportions, according to some embodiments of the technology described herein. FIG. 36A includes characteristics 3602 that show for different exemplary patients (e.g., patient RP8393, etc.) the percentage of unclassified cells, endothelium cells, macrophages, CD8 T cells, CD4 T cells, tumor K167+ cells, and tumor cells. FIG. 36B includes characteristics 3604 for CD8 T cells, characteristics 3606 for endothelium cells, characteristics 3608 for macrophage cells, characteristics 3610 for tumor cells, and characteristics 3612 for tumor cells.

Figure 37:
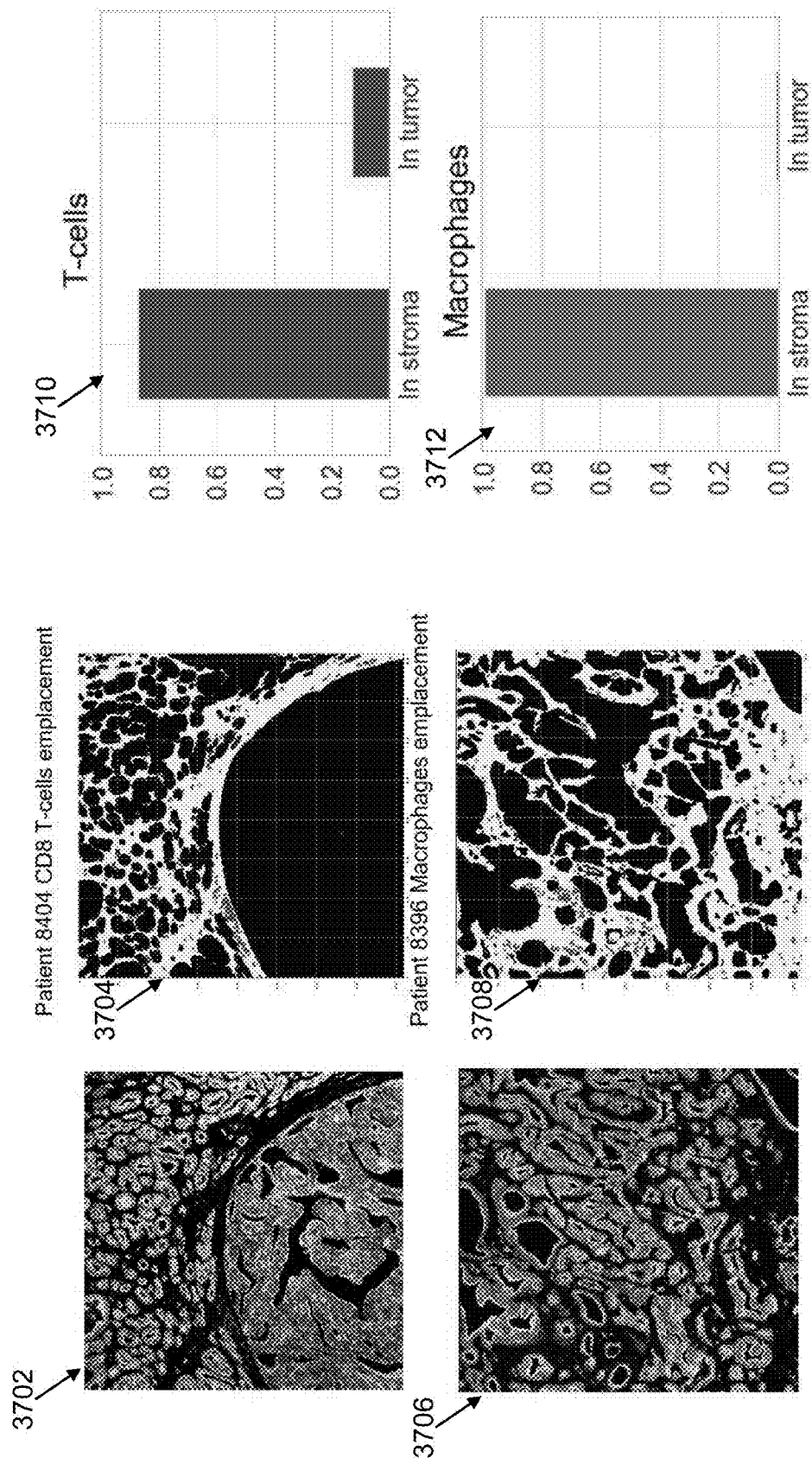
FIG. 37 is a diagram illustrating cell distribution characteristics, according to some embodiments of the technology described herein.

FIG. 37 is a diagram illustrating cell distribution characteristics, according to some embodiments of the technology described herein. FIG. 37 shows a tissue image 3702 for a first patient and a corresponding stroma mask 3704, both with T cells shown in red. FIG. 37 also shows a tissue image 3706 for a second patient and a corresponding stroma mask 3708, both with macrophage cells shown in red. Characteristics 3710 show that for images 3702 and 3704, just under 90% of the T cells are in the stroma, and the remaining percent are in the tumor. Characteristics 3712 show that for images 3706 and 3708, nearly all of the macrophage cells are in the stroma, with only a small percent in the tumor.

Figure 38A:
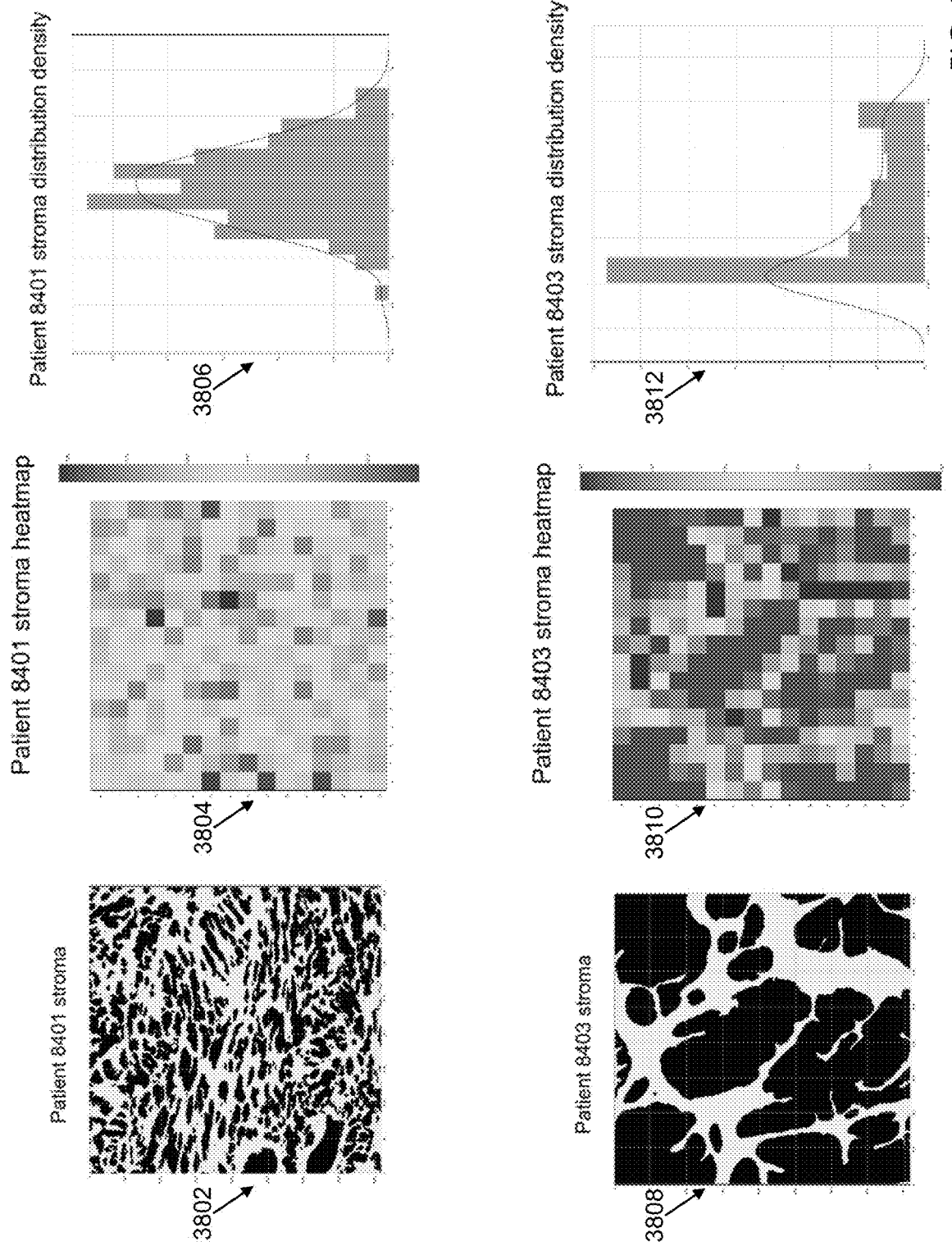
FIGS. 38A-B are diagrams of percentage heatmaps and distribution densities of histological features, according to some embodiments of the technology described herein.
Figure 38B:
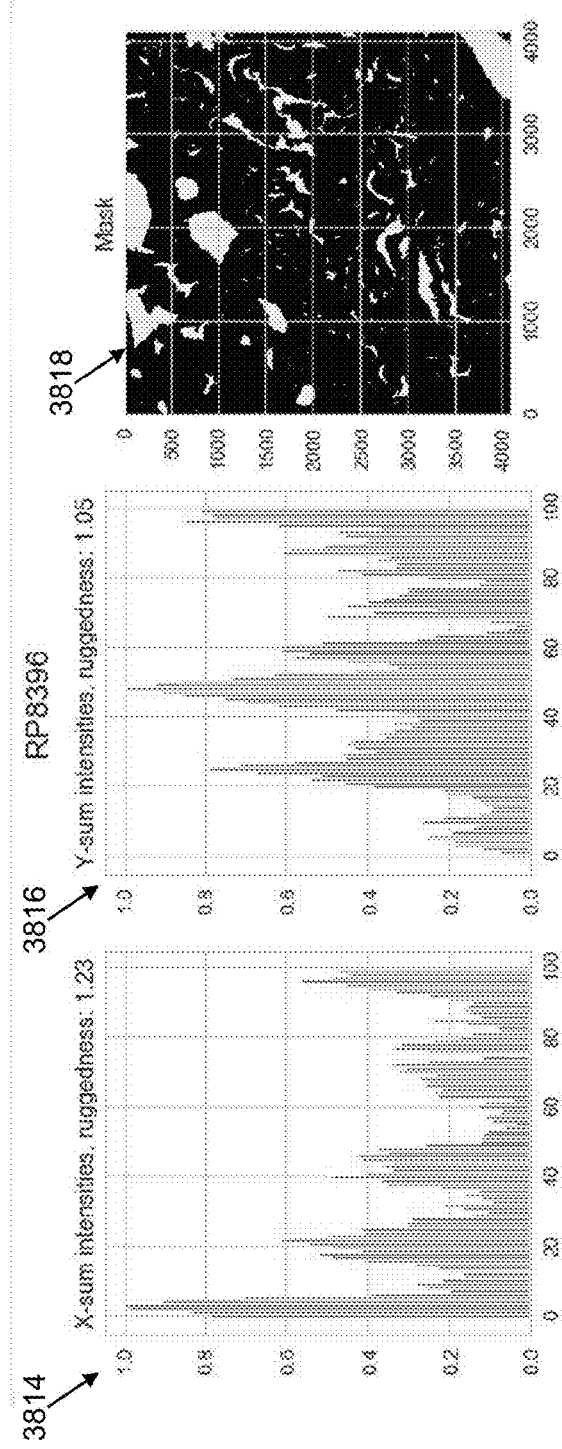
Figure 38B:
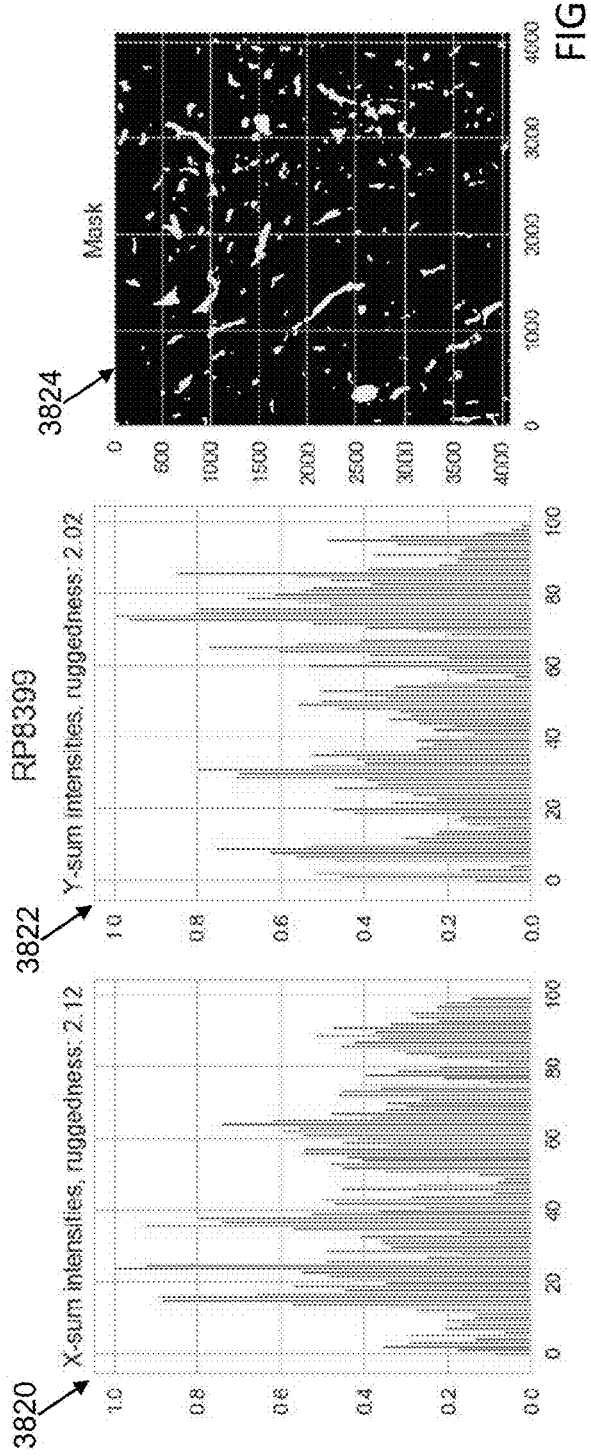

FIGS. 38A-B are diagrams of percentage heatmaps and distribution densities of histological features, according to some embodiments of the technology described herein. The heatmaps can be generated based on the cell groups, such as in conjunction with steps 508 and 510 of FIG. 5A. Each block in the heatmaps represents the percentage of the block that corresponds to a positive stroma mask. FIG. 38A includes a stroma mask 3802 for a first patient, a corresponding stroma heat map 3804 and a graph of the stroma distribution density 3806. FIG. 38A also includes a stroma mask 3808 for a second patient, a corresponding stroma heat map 3810 and a graph of the stroma distribution density 3812. FIG. 38B includes a stroma mask 3818 of a third patient and corresponding graphs of the x-sum intensity 3814 and y-sum intensity 3816. FIG. 38B also includes a stroma mask 3824 of a fourth patient and corresponding graphs of the x-sum intensity 3820 and y-sum intensity 3822.

Figure 39:
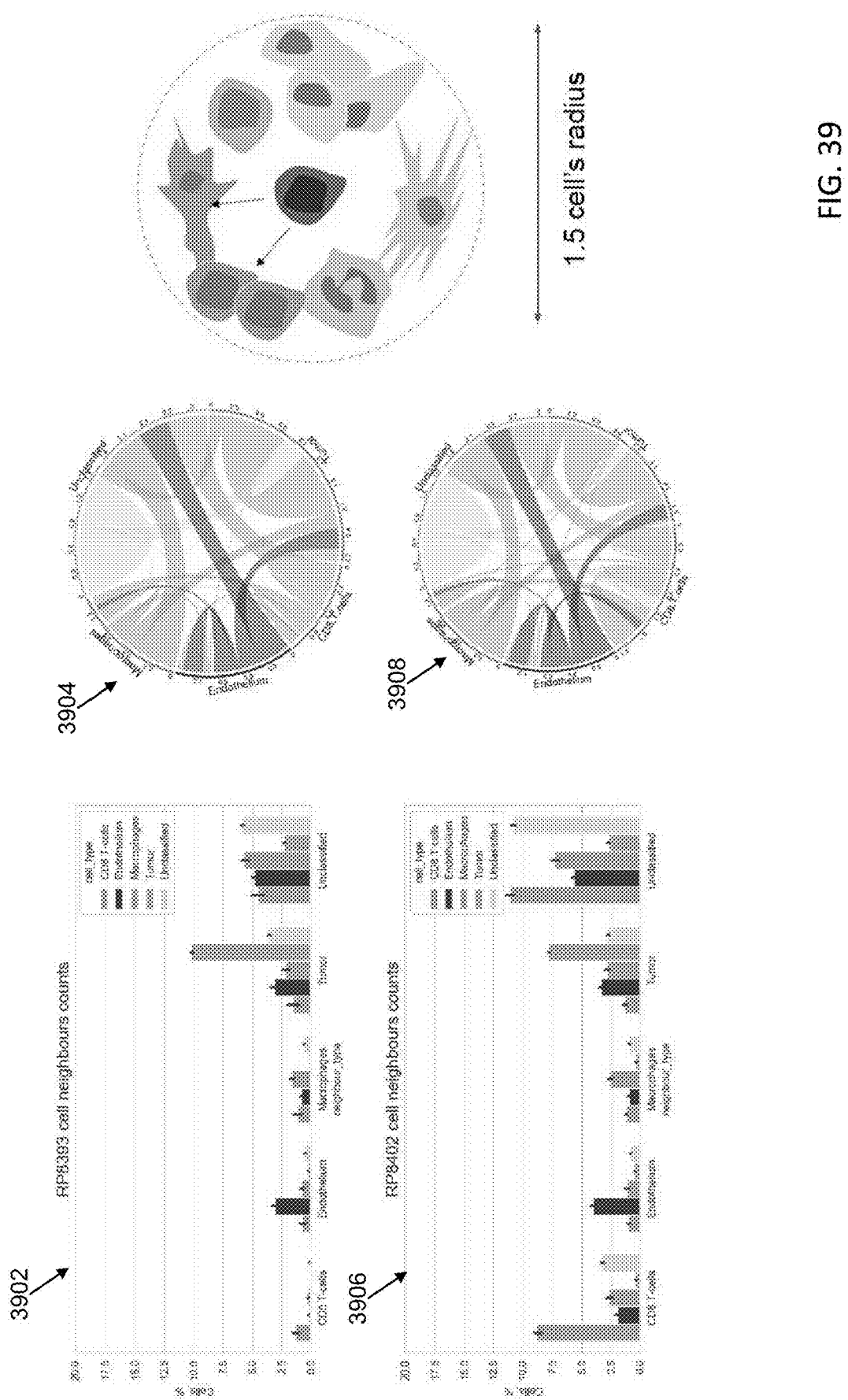
FIG. 39 is a diagram showing cell neighbor information and cell contact characteristics, according to some embodiments of the technology described herein.

FIG. 39 is a diagram showing cell neighbor and cell contact characteristics, according to some embodiments of the technology described herein. The cell contact characteristics can be determined, for example, at step 510 of FIG. 5A. FIG. 39 includes a first table 3902 for a first patient showing the percentage of neighboring cells for CD8 T cells, endothelium cells, macrophage cells, tumor cells, and unclassified cells (where the neighboring cells can similarly be CD8 T cells, endothelium cells, macrophage cells, tumor cells, and unclassified cells), and an associated circular chart 3904 showing the same neighboring cell percentages in relation to the various types of cells. FIG. 39 also includes a second table 3906 for a second patient showing the percentage of neighboring cells for CD8 T cells, endothelium cells, macrophage cells, tumor cells, and unclassified cells, and an associated circular chart 3908 showing the same neighboring cell percentages in relation to the various types of cells.

Figure 40:
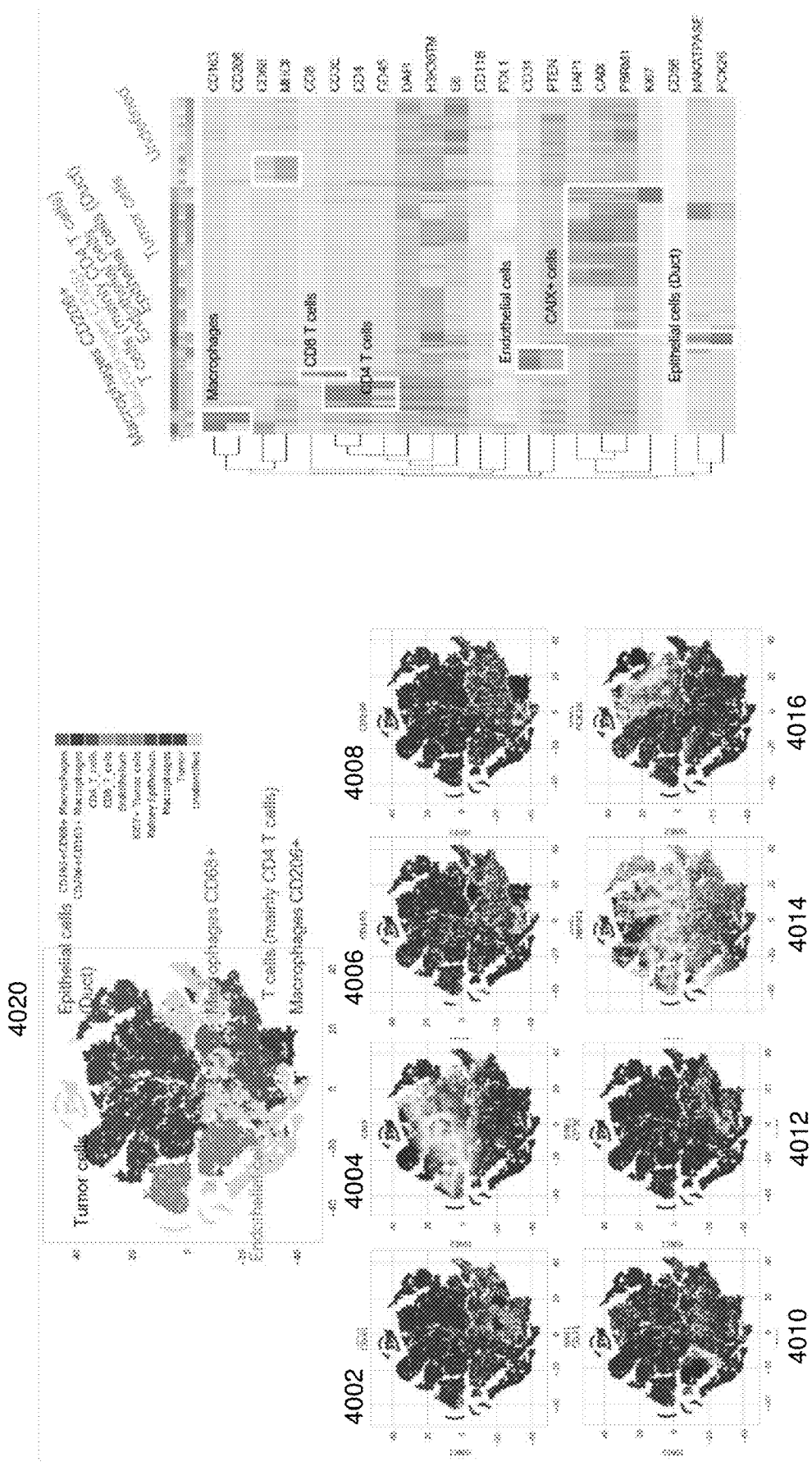
FIG. 40 is a diagram showing examples of tSNE plots of characteristics of marker expression, according to some embodiments of the technology described herein.

FIG. 40 is a diagram showing examples of tSNE plots 4002-4016 of characteristics of marker expression, according to some embodiments of the technology described herein. In particular, tSNE plot 4002 is for CD45 marker expression, tSNE plot 4004 is for CAIX marker expression, tSNE plot 4006 is for CD163 marker expression, tSNE plot 4008 is for CD206 marker expression, tSNE plot 4010 is for CD31 marker expression, tSNE plot is for CD3E marker expression, tSNE plot 4014 is for PBRM1 marker expression, and tSNE plot 4016 is for PCK26 marker expression. The tSNE plots can be built using marker expressions and used to display two types of information as shown in FIG. 40—intensities of marker expressions in cells (each point is a cell), and in the graph 4020, the cell types by different colors and/or shadings in order to show a correspondence between cells with a high marker expression level and their assigned cell type. The characteristics can be determined, for example, at step 510 of FIG. 5A as described herein.

Figure 41:
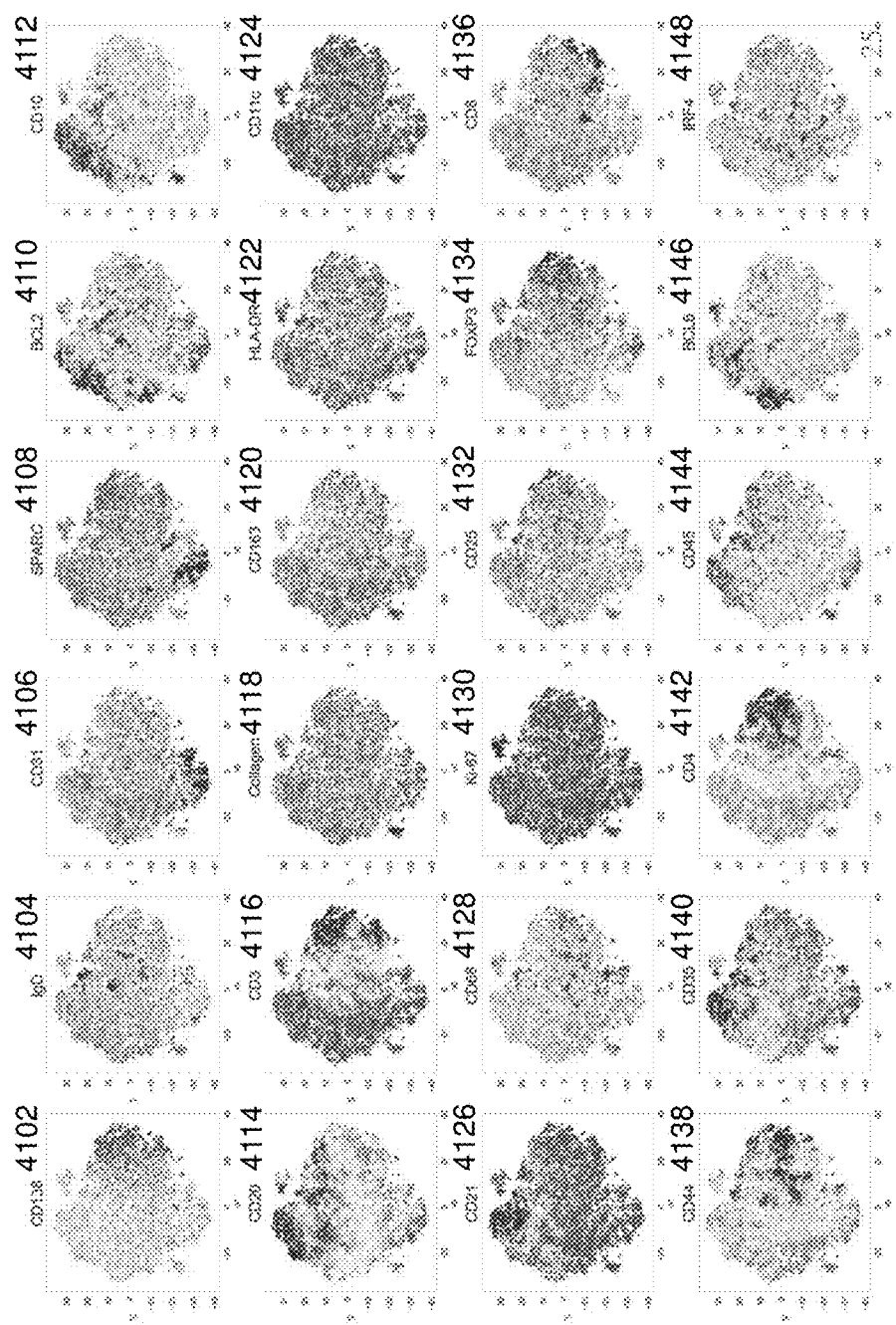
FIG. 41 is another diagram illustrating showing examples of tSNE plots of characteristics of marker expression, according to some embodiments of the technology described herein.
Figure 41:
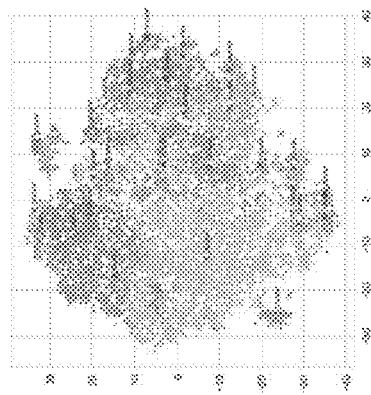

FIG. 41 is another diagram showing examples of tSNE plots 4102-4148 of characteristics of marker expression, according to some embodiments of the technology described herein. In particular, tSNE plot 4102 is for CD138 marker expression, tSNE plot 4104 is for IgD marker expression, tSNE plot 4106 is for CD31 marker expression, tSNE plot 4108 is for SPARC marker expression, tSNE plot 4110 is for BCL2 marker expression, tSNE plot 4112 is for CD10 marker expression, tSNE plot 4114 is for CD20 marker expression, tSNE plot 4116 is for CD3 marker expression, tSNE plot 4118 is for Collagen marker expression, tSNE plot 4120 is for CD163 marker expression, tSNE plot 4122 is for HLA-DR marker expression, tSNE plot 4124 is for CD11c marker expression, tSNE plot 4126 is for CD21 marker expression, tSNE plot 4128 is for CD68 marker expression, tSNE plot 4130 is for Ki-67 marker expression, tSNE plot 4132 is for CD25 marker expression, tSNE plot 4134 is for FOXP3 marker expression, tSNE plot 4136 is for CD8 marker expression, tSNE plot 4138 is for CD44 marker expression, tSNE plot 4140 is for CD35 marker expression, tSNE plot 4142 is for CD4 marker expression, tSNE plot 4144 is for CD45 marker expression, tSNE plot 4146 is for BCL6 marker expression, and tSNE plot 4148 is for IRF4 marker expression.

Figure 42:
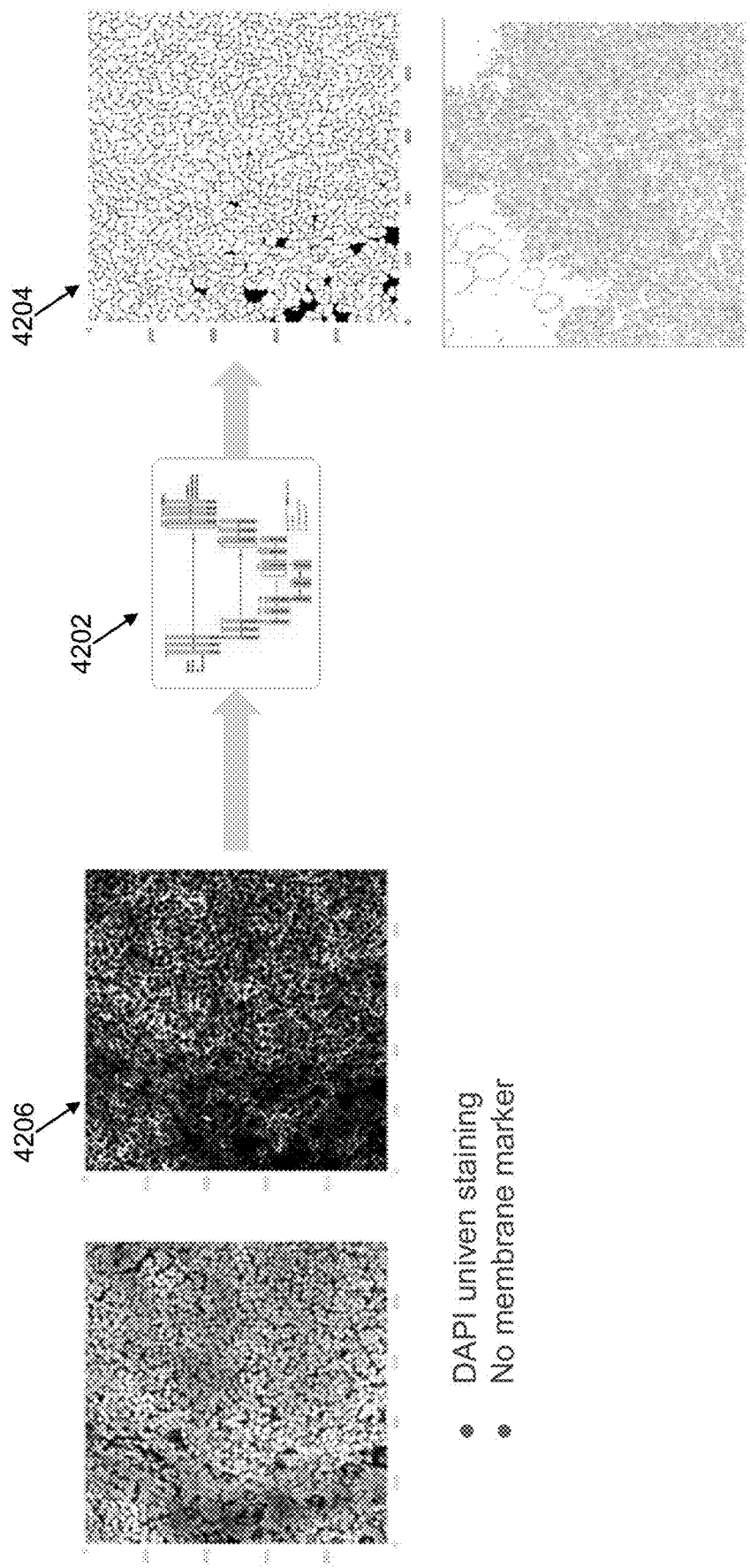
FIG. 42 is a diagram pictorially illustrating use of a convolutional neural network to determine cell segmentation data for a 4',6-diamidino-2-phenylindole (DAPI) univen stained immunofluorescence image, according to some embodiments of the technology described herein.

FIGS. 42-47 generally relate to using the techniques described herein in the context of 4', 6-diamidino-2-phenylindole (DAPI) univen marker staining. FIG. 42 is a diagram pictorially illustrating use of a convolutional neural network 4202 to determine cell segmentation data 4204 for a 4', 6-diamidino-2-phenylindole (DAPI) univen stained immunofluorescence image 4206, according to some embodiments of the technology described herein.

Figure 43:
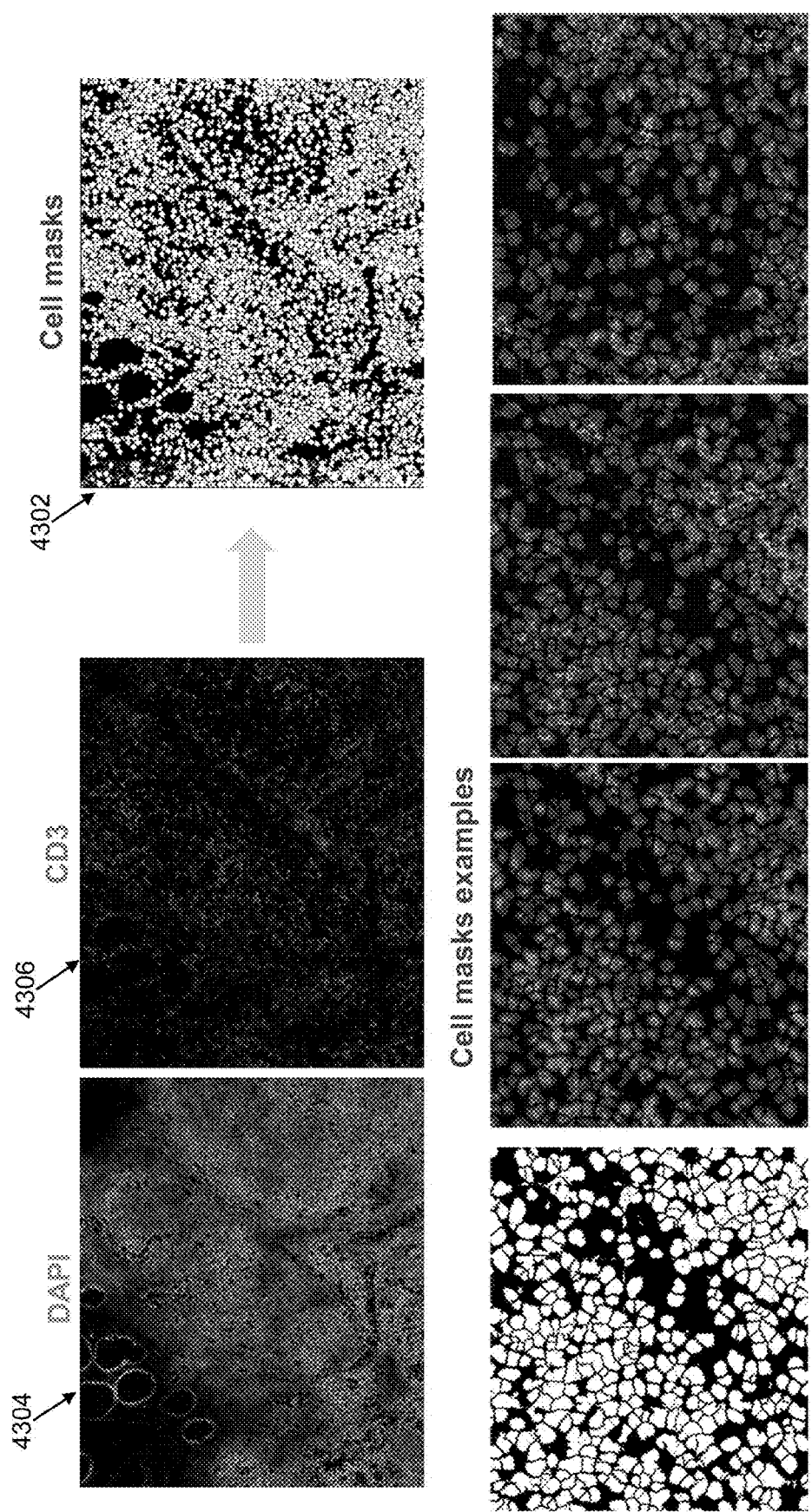
FIG. 43 is a diagram pictorially illustrating a first cell mask generated based on a combination of a DAPI stained immunofluorescence image and a CD3 cellular marker image of a tissue sample, according to some embodiments of the technology described herein.

FIG. 43 is a diagram pictorially illustrating a first cell mask 4302 generated based on a combination of a DAPI stained immunofluorescence image 4304 and a CD3 cellular marker image 4306 of a tissue sample, according to some embodiments of the technology described herein. The cell masks can be obtained, for example, as part of the information indicative of the locations of cells as described in conjunction with step 504 of FIG. 5A. As shown in the cell mask examples in FIG. 43, the cell mask 4302 can be applied to different immunofluorescence images to convey the expressions of marker(s) for the cells of the tissue sample.

Figure 44:
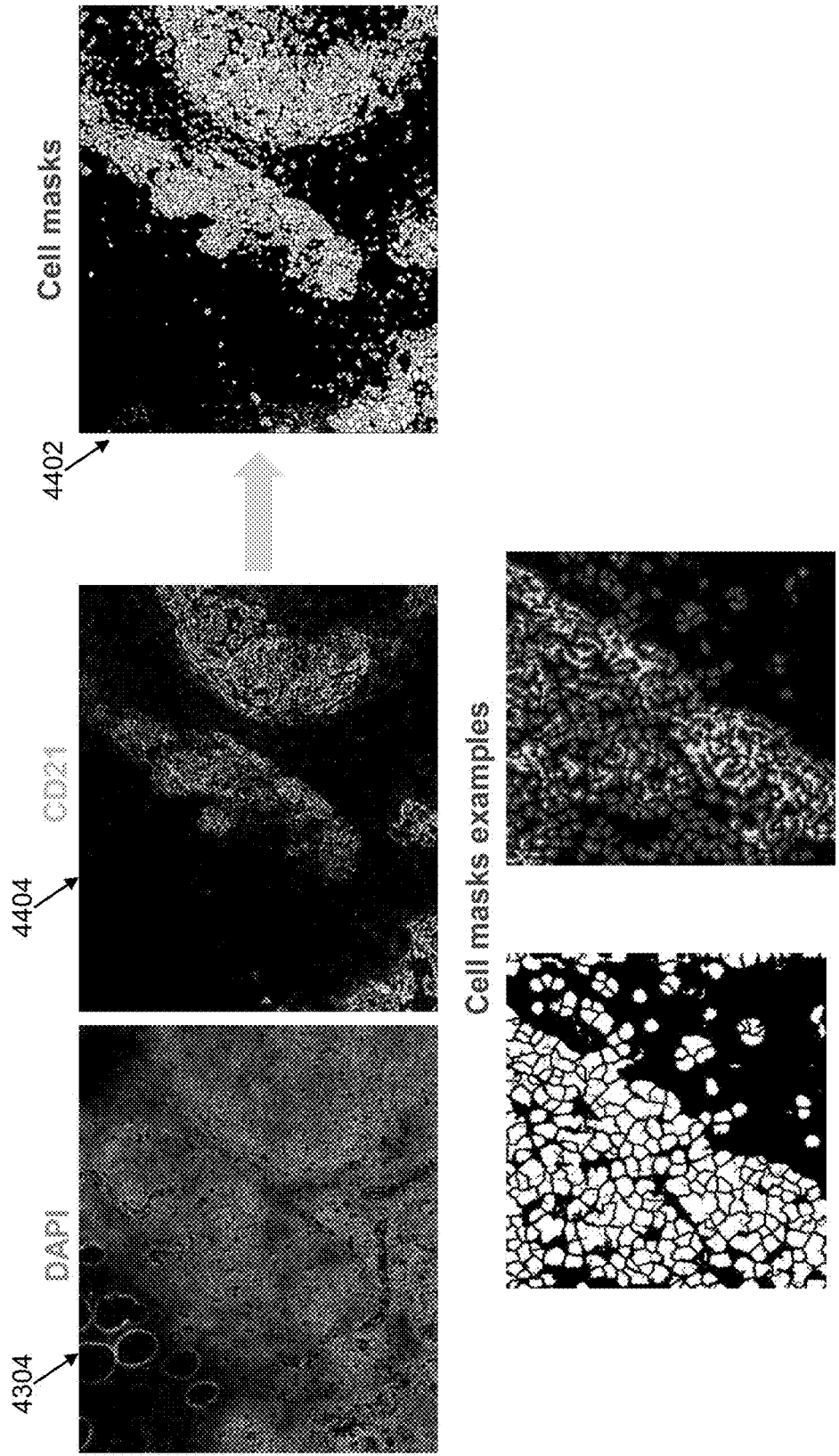
FIG. 44 is a diagram pictorially illustrating a second cell mask generated based on a combination of the DAPI stained immunofluorescence image of FIG. 43 and a CD21 cellular marker image, according to some embodiments of the technology described herein.
Figure 45:
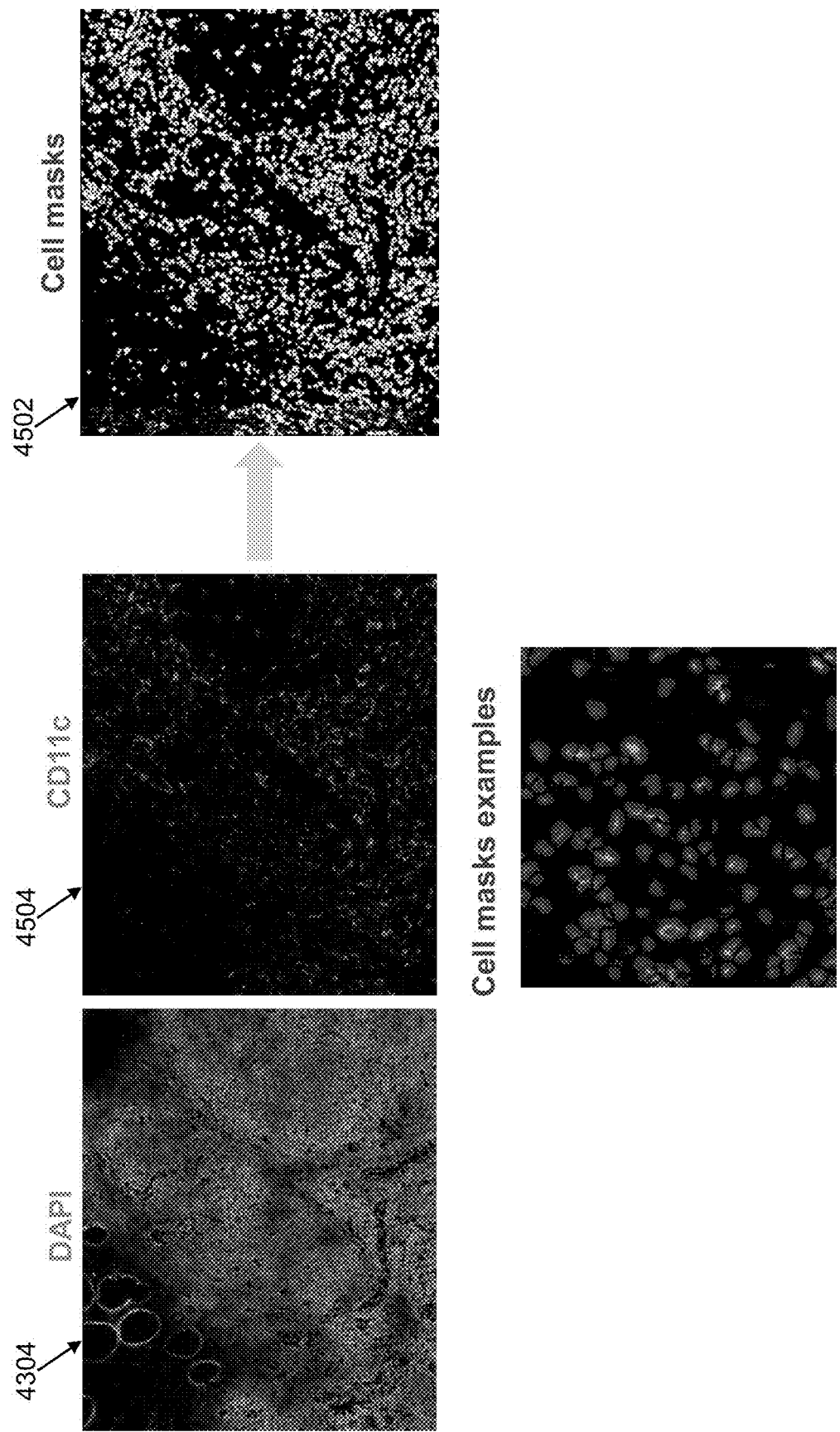
FIG. 45 is a diagram pictorially illustrating a third cell mask generated based on a combination of the DAPI stained immunofluorescence image of FIG. 43 and a CD11c cellular marker image, according to some embodiments of the technology described herein.

FIG. 44 is a diagram pictorially illustrating a second cell mask 4402 generated based on a combination of the DAPI stained immunofluorescence image 4304 of FIG. 43 and a CD21 cellular marker image 4404, according to some embodiments of the technology described herein. FIG. 45 is a diagram pictorially illustrating a third cell mask 4502 generated based on a combination of the DAPI stained immunofluorescence image 4304 of FIG. 43 and a CD11c cellular marker image 4504, according to some embodiments of the technology described herein.

Figure 46:
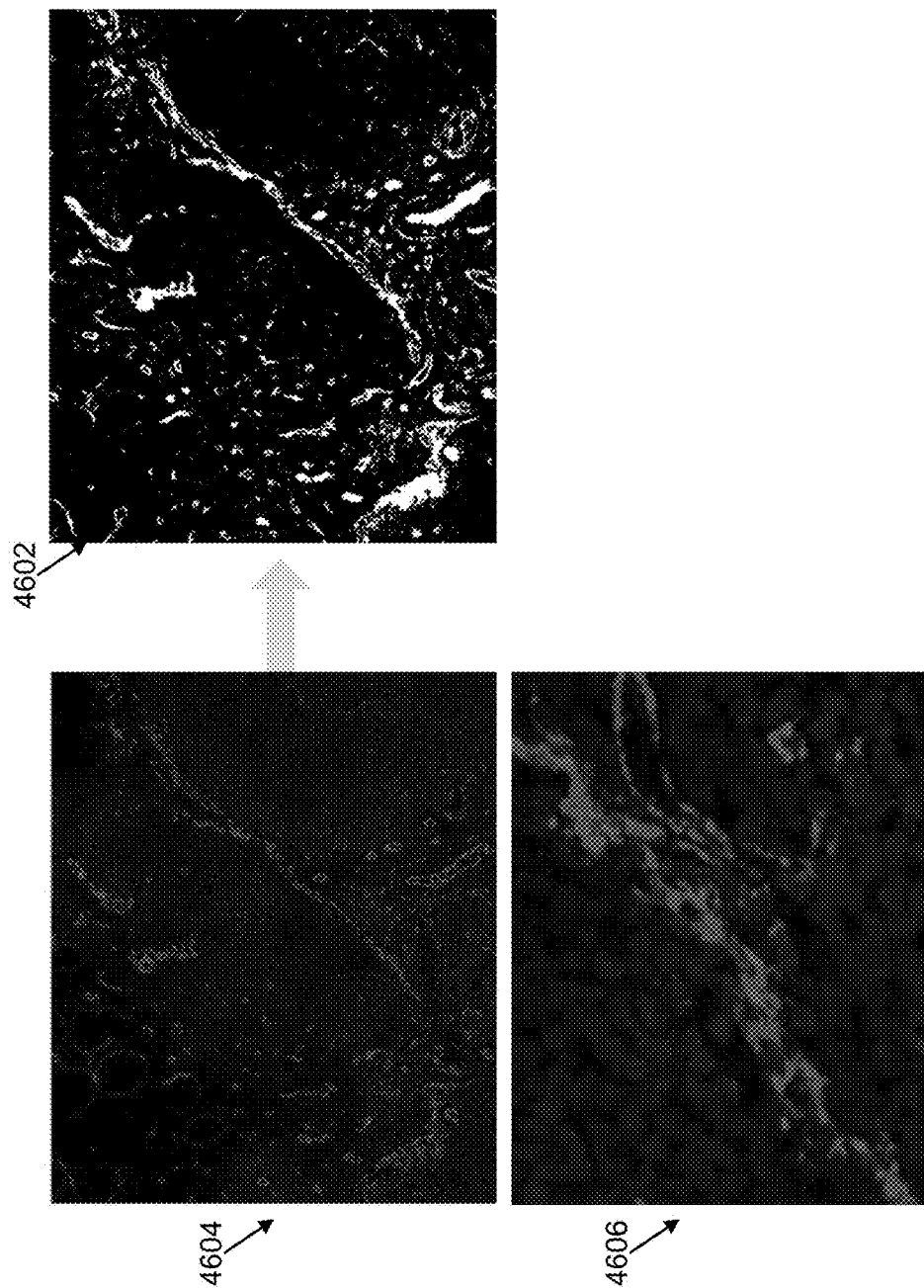
FIG. 46 is a diagram pictorially illustrating a blood vessel mask generated based on MxIF images of the tissue sample of FIG. 43, according to some embodiments of the technology described herein.

FIG. 46 is a diagram pictorially illustrating a blood vessel mask 4602 generated based on MxIF images 4604 (with image 4606 being an expanded view of a portion of image 4604) of the tissue sample of FIG. 43, according to some embodiments of the technology described herein. The blood vessel mask 4602 shows blood vessel placement in the tissue. For this example, a CD31 marker is shown in a first color shade (e.g., red) on top of a DAPI nuclei marker in a second color shade (e.g., blue) in a composite pseudocolor picture 4604 to highlight that calculated mask 4602 corresponds to blood vessels in the tissue. As described herein, the blood vessel mask can be created as part of, for example, step 510 of FIG. 5A.

Figure 47:
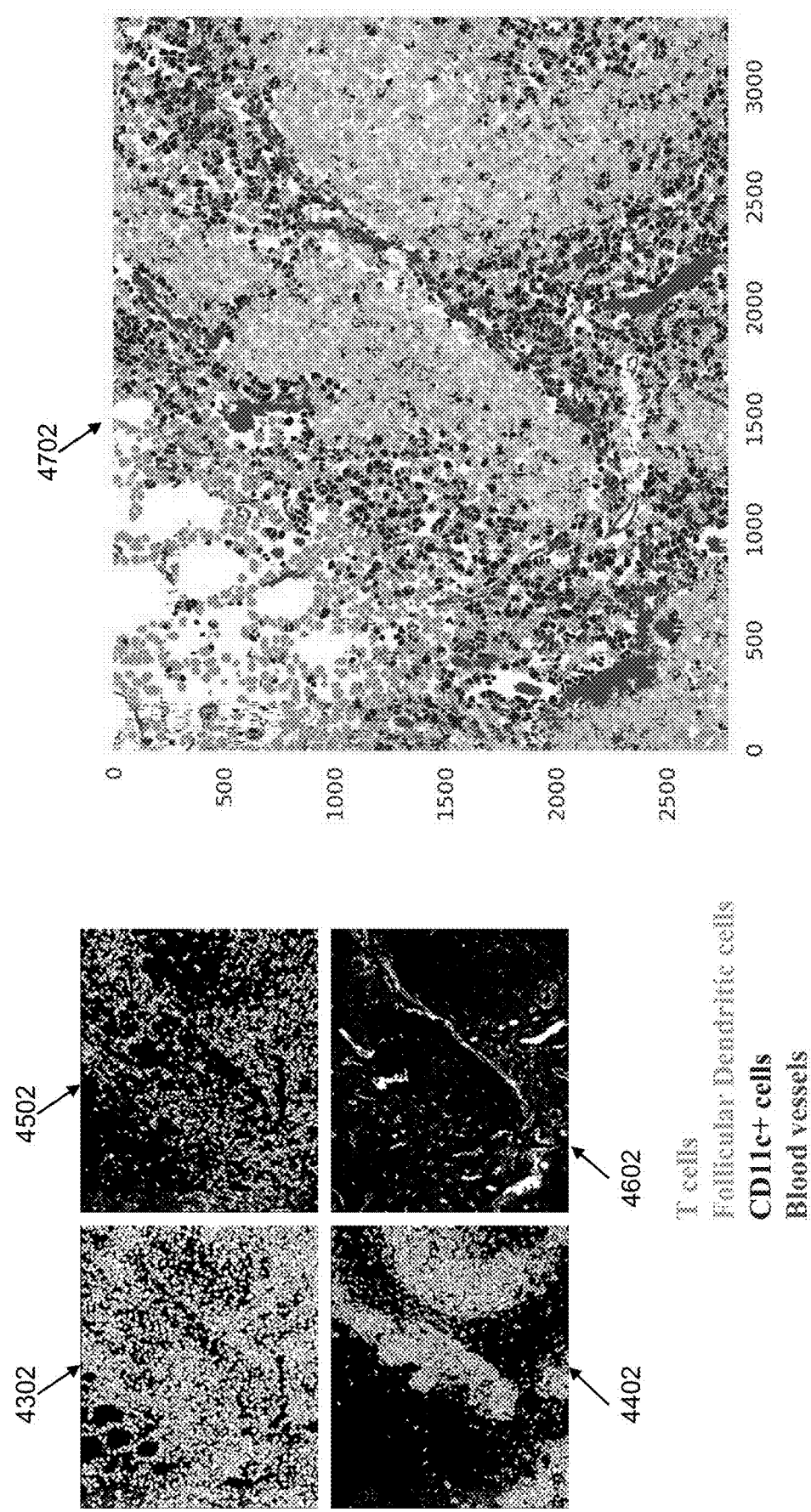
FIG. 47 is a diagram pictorially illustrating cell groups generated using the masks from FIGS. 43-46, according to some embodiments of the technology described herein.

FIG. 47 is a diagram pictorially illustrating cell groups 4702 generated using the masks 4302, 4402, 4502 and 4602 from FIGS. 43-46, according to some embodiments of the technology described herein. The cell groups 4702 include T cells (green), follicular dendritic cells (dark orange), CD11c+ cells (blue), and blood vessels (red).

Figure 48:
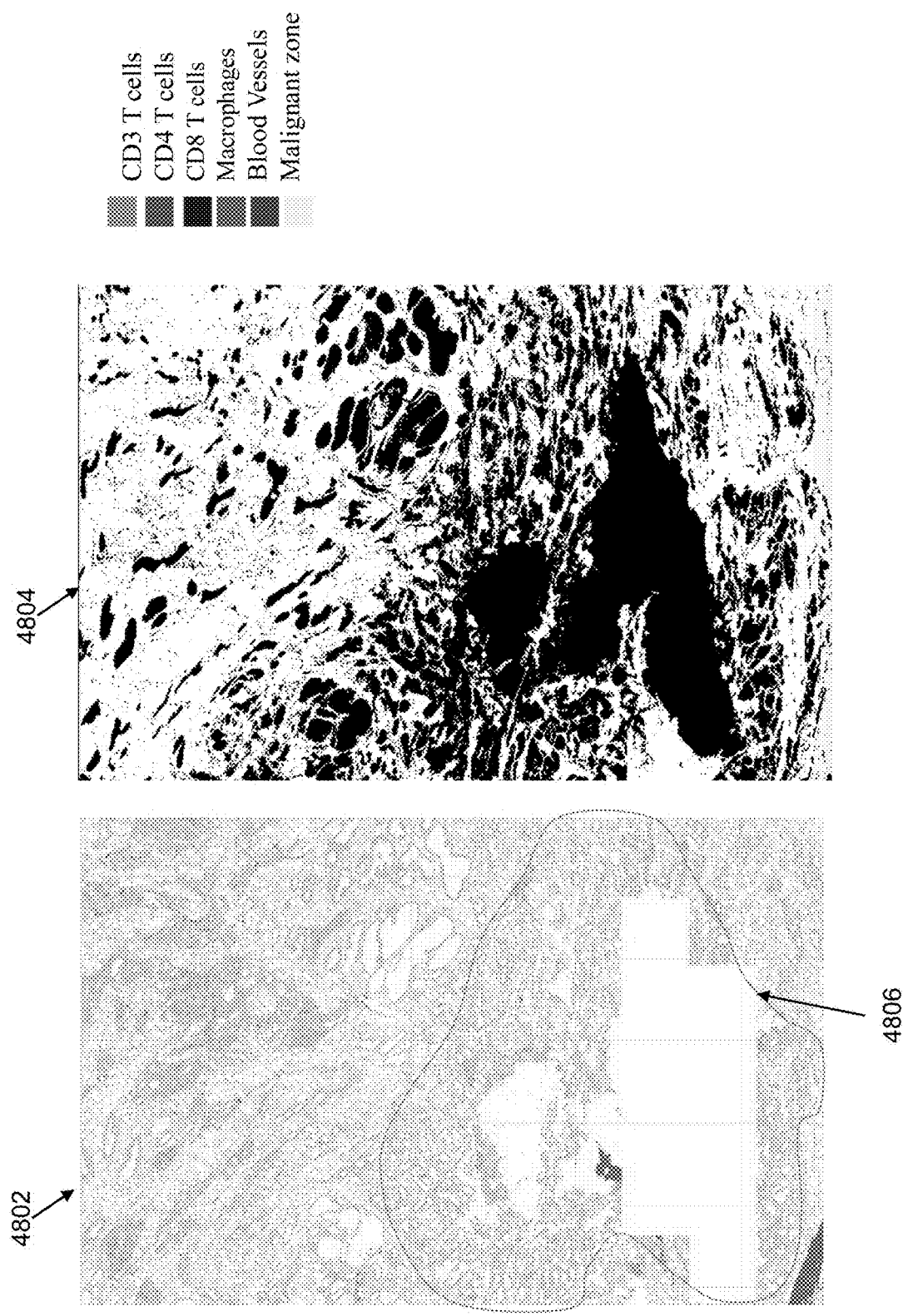
FIG. 48 shows a set of cell groups for a prostate tissue sample and a malignant area, according to some embodiments of the technology described herein.
Figure 49:
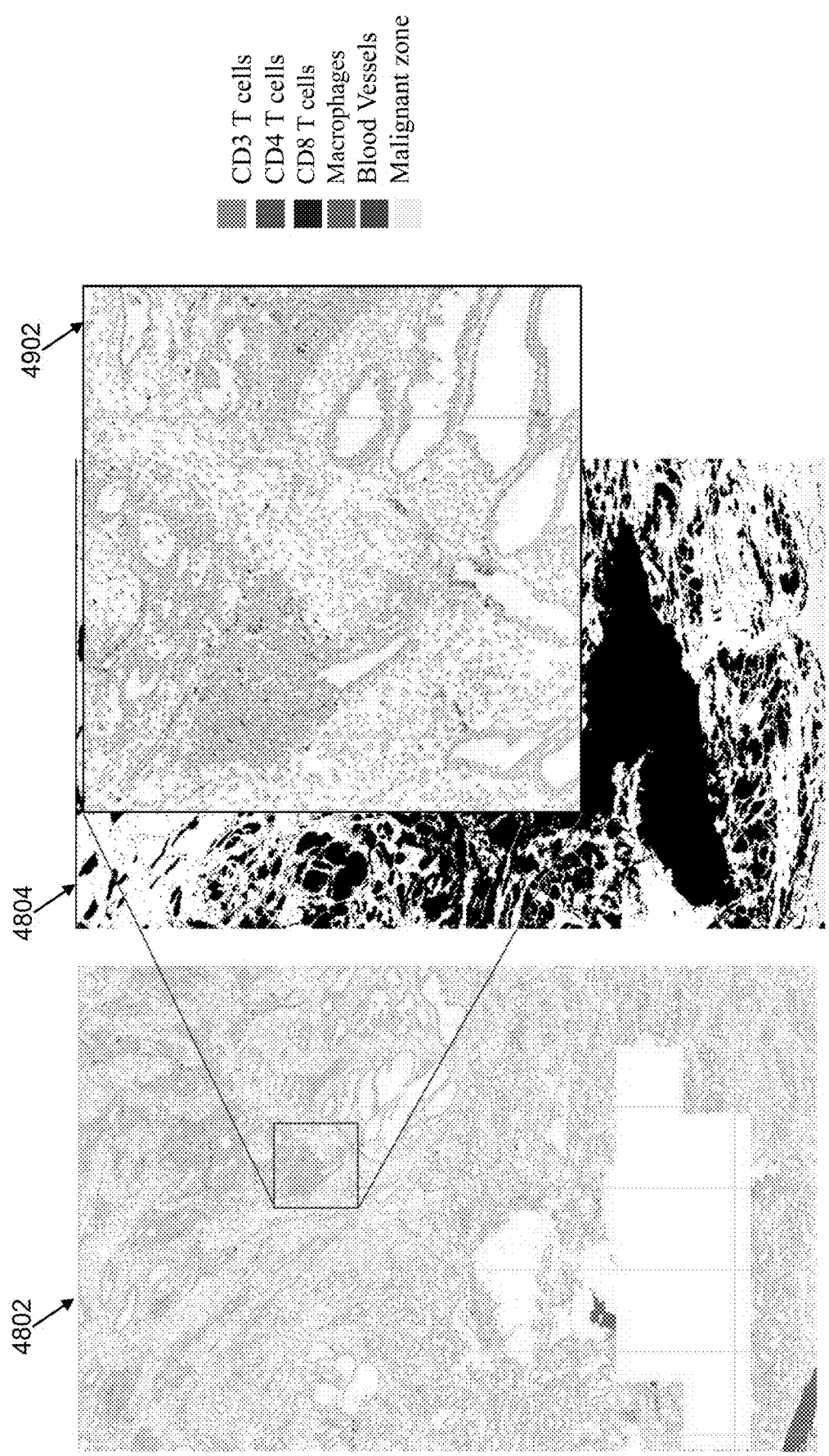
FIG. 49 shows an enhanced view of a portion of the prostate tissue sample of FIG. 48, according to some embodiments of the technology described herein.
Figure 50:
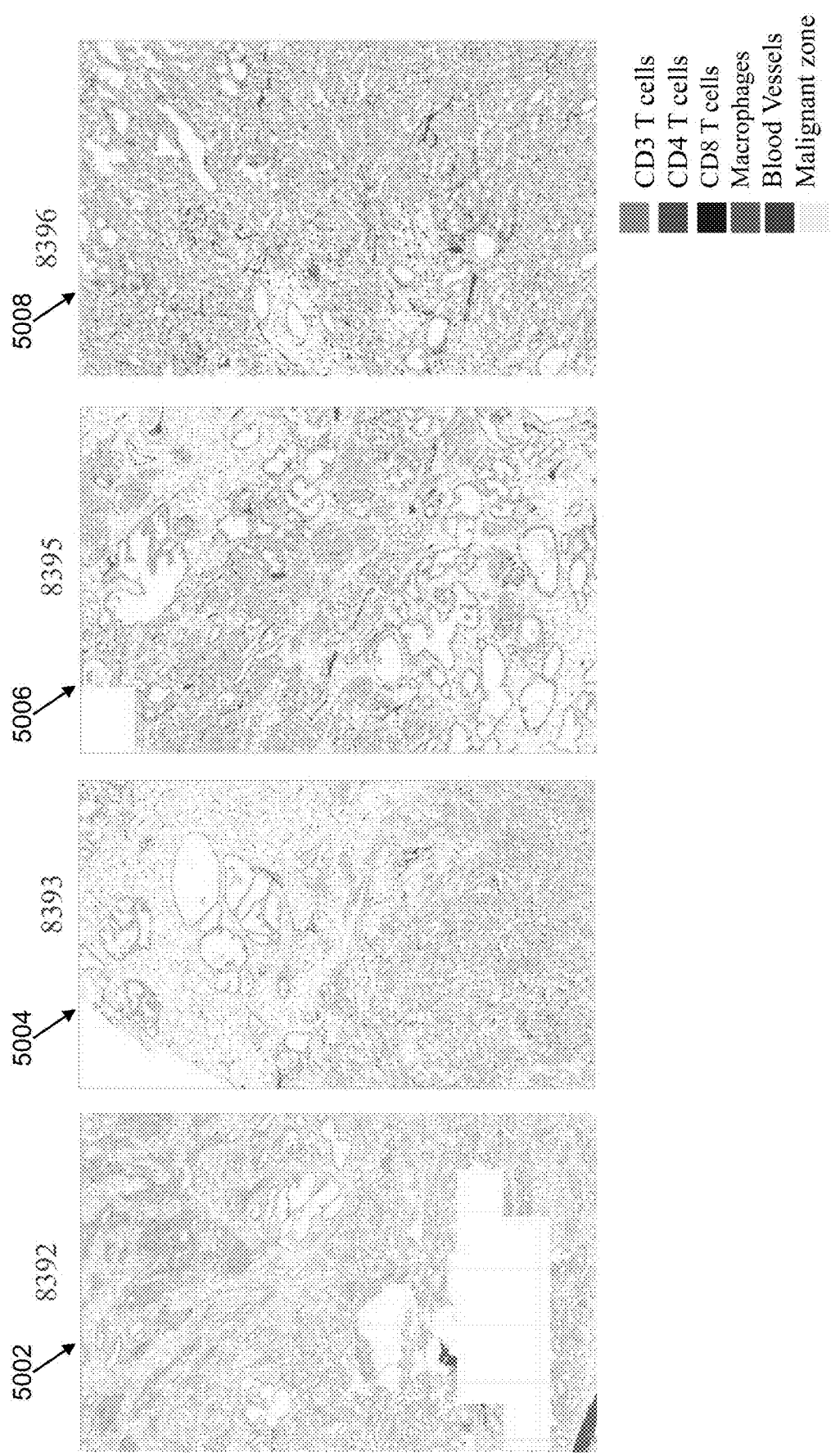
FIG. 50 shows a set of cell groups for prostate tissue samples taken from four different patients, according to some embodiments of the technology described herein.

FIG. 48 shows a set of cell groups 4802 for a prostate tissue sample 4804 and a malignant area 4806, according to some embodiments of the technology described herein. FIG. 48 encircles an area of a dense tumor that was mechanically affected during staining process, with most of the tumor still being segmented. FIG. 49 shows an enhanced view of a portion 4902 of the cell groups 4802 of the prostate tissue sample 4804 of FIG. 48 to highlight immune infiltration, according to some embodiments of the technology described herein. FIG. 50 shows a set of cell groups 5002, 5004, 5006 and 5008 for prostate tissue samples taken from four different patients and visualized according to some embodiments of the technology described herein. Each cell in FIGS. 48-50 is colored according to its cell type, with masks of blood vessels colored red. The binary black and white images in FIGS. 48-49 are full slide segmentation masks of the fibrosis obtained using a neural network.

Figure 51:
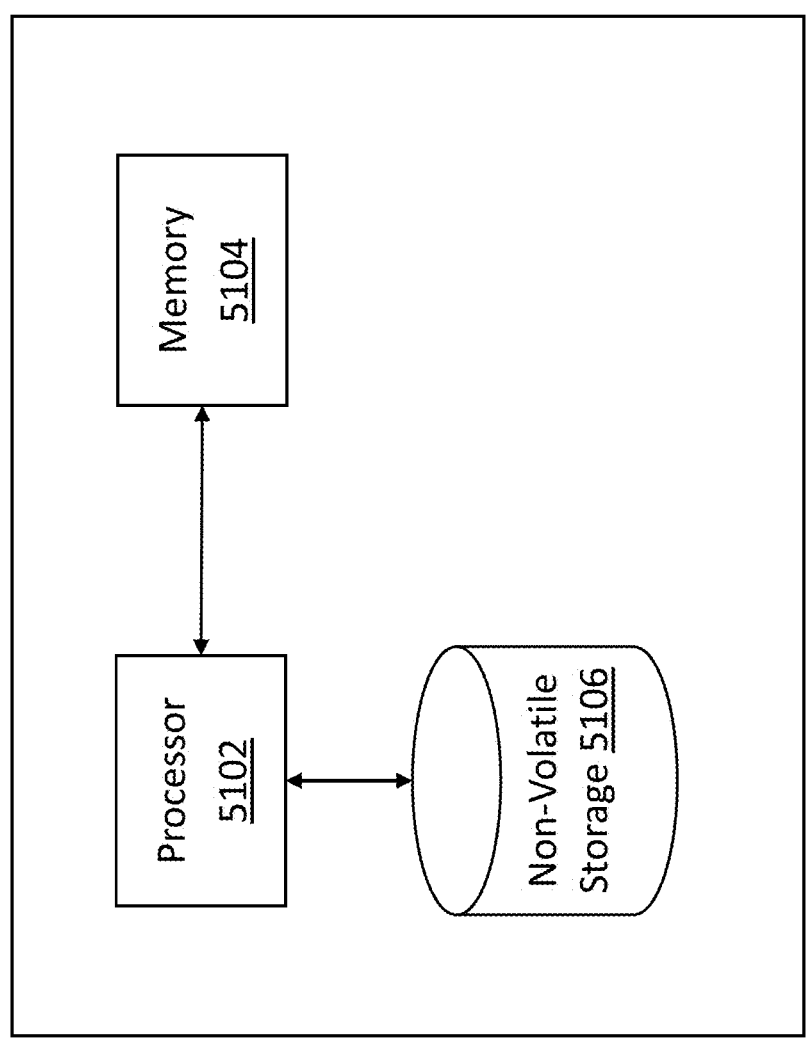
FIG. 51 is a diagram of an illustrative implementation of a computer system that may be used in connection with any of the embodiments of the technology described herein.

An illustrative implementation of a computer system 5100 that may be used in connection with any of the embodiments of the disclosure provided herein is shown in FIG. 51. For example, the computer system 5100 may be used to implement the computing device 112 and/or the computing device 116. The computer system 5100 can be used to execute one or more aspects of the MxIF image processing pipeline shown in FIGS. 3-4B, 5A, 6A, and/or 7A-7B. The computer system 5100 may include one or more computer hardware processors 5102 and one or more articles of manufacture that comprise non-transitory computer-readable storage media (e.g., memory 5104 and one or more non-volatile storage devices 5106). The processor 5102(s) may control writing data to and reading data from the memory 5104 and the non-volatile storage device(s) 5106 in any suitable manner. To perform any of the functionality described herein, the processor(s) 5102 may execute one or more processor-executable instructions stored in one or more non-transitory computer-readable storage media (e.g., the memory 5104), which may serve as non-transitory computer-readable storage media storing processor-executable instructions for execution by the processor(s) 5102.

The computer system 5100 can be any type of computing device with a processor 5102, memory 5104, and non-volatile storage device 5106. For example, the computer system 5100 can be a server, desktop computer, a laptop, a tablet, or a smartphone. In some embodiments, the computer system 5100 can be implemented using a plurality of computing devices, such as a cluster of computing devices, virtual computing devices, and/or cloud computing devices.

Figure 52:
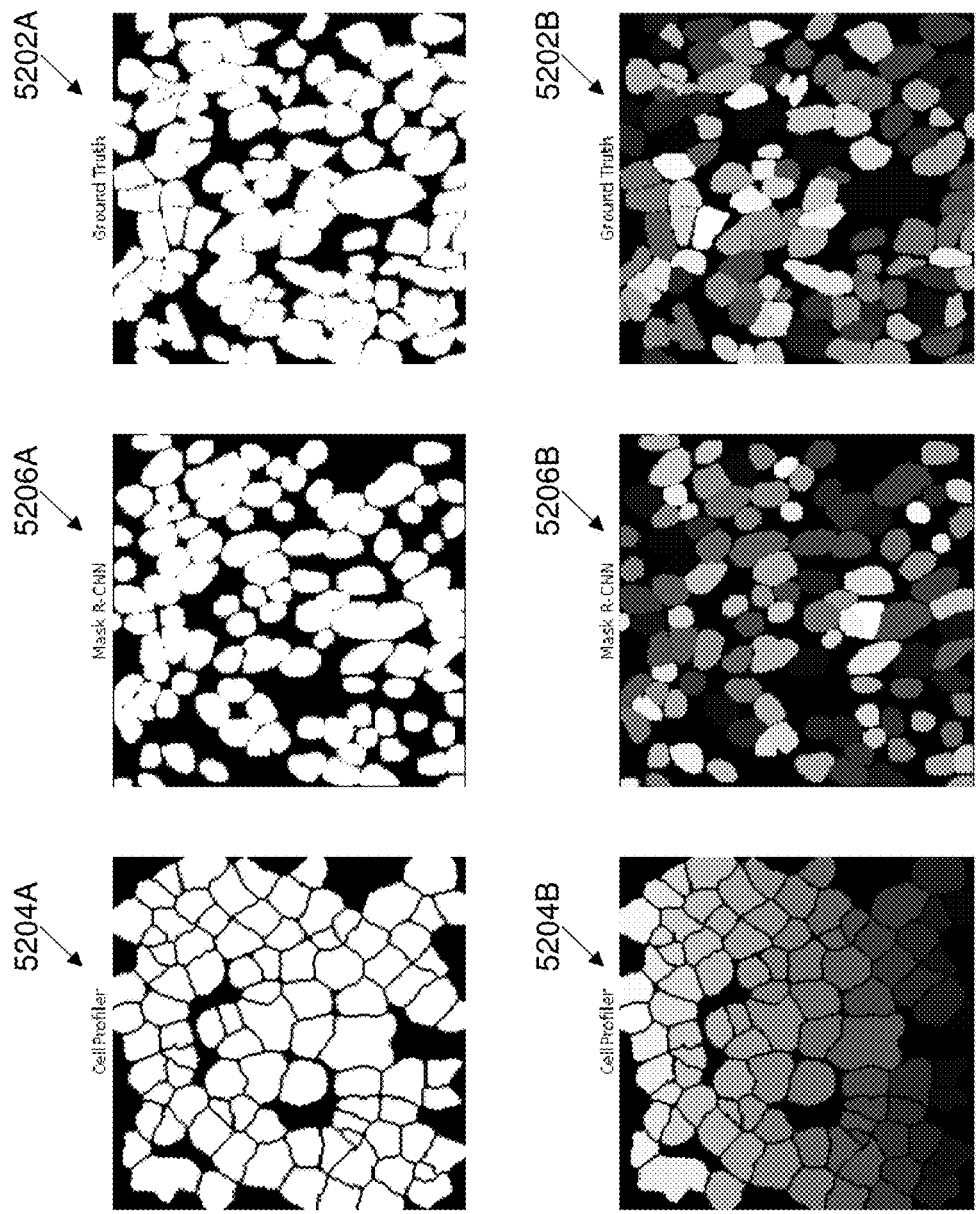
FIGS. 52-53 show two exemplary comparisons of cell location information generated using an implementation of the techniques described herein and a conventional technique, according to some embodiments.
Figure 53:
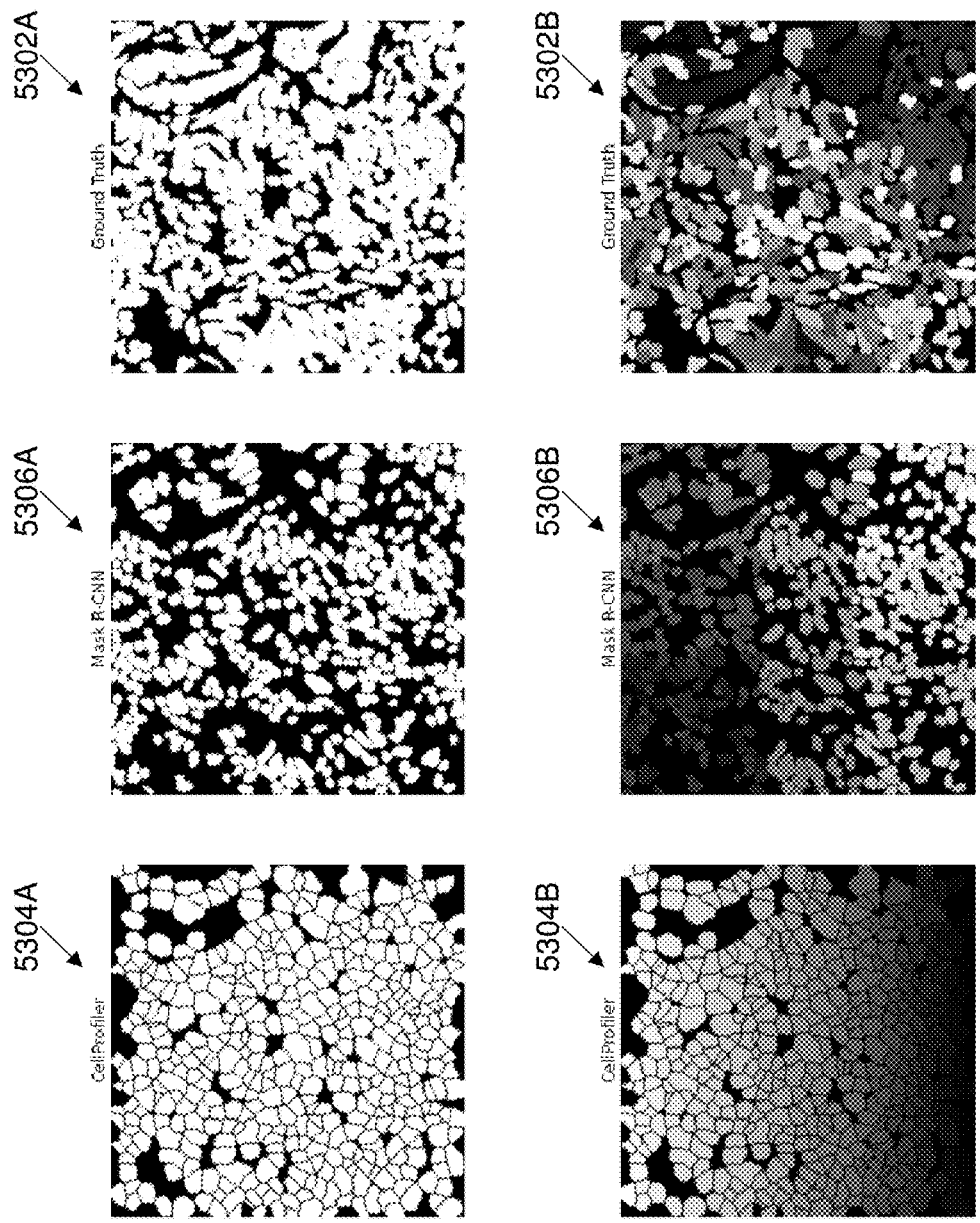

FIGS. 52-53 provide two comparisons to demonstrate how the techniques described herein can outperform conventional techniques for both cell location and cell shape reproduction, according to some embodiments. The ground truth data for both FIGS. 52-53 was a different non-small-cell lung cancer tissue sample, and the markers included DAPI, NaKATPase, PCK26, CD3 and CD68 were used to guide manual segmentation by pathologists for the ground truth data. To provide an example of conventional techniques, the ground truth data was segmented using CellProfiler 4.1.3, which is available from the Broad Institute at cellprofiler.org/releases (referred to herein for ease of illustration as "CellProfiler").

To demonstrate the techniques described herein, cell segmentation was performed using a trained convolutional neural network to generate the cell segmentation data (referred to for the examples of FIGS. 52-53 for ease of illustration as "Mask R-CNN"). In particular, the trained model used for this example implemented a Region-Based CNN architecture with a ResNet-50 encoder head. The model had approximately forty-three (43) million parameters.

The input to Mask R-CNN is three channels, including a nuclei marker (including DAPI) for the first channel, a membrane marker that is present on almost every cell for specific tissue type for the second marker (including CD45 or NaKATPase), and the third marker is one additional membrane marker with sufficient staining quality (including CD3, CD20, CD19, CD163, CD11c, CD11b, CD56, CD138, etc.). All channels are normalized to be within the range of 0-1, and as a combination the value of maximum expression in each pixel among all selected markers was used.

In this implementation, the Mask R-CNN segmentation process includes a forward network pass and a post-processing step to generate the ultimate cell segmentation data. The input image is split into intersecting squares of size 256×256 pixels. The network output is an array of mask proposals for each separate cell. In this implementation, the outputs were not binary images, rather the output was a set of images with values in the range of 0-1 that represent the probability of a given pixel being part of the cell's mask. The output images were thresholded using a value of 0.5 to obtain the ultimate binary mask. In case some of the masks intersect with each other, the non-maximum suppression algorithm was run (e.g., which is described in, for example, Navaneeth Bodla, "Improving Object Detection With One Line of Code," arXiv:1704.04503v2 (August, 2017), available at arxiv.org/pdf/1704.04503.pdf, which is hereby incorporated by reference herein in its entirety). For example, windows of prediction may include redundant data, such as due to a cell in-between window edges. Such an intersection was avoided by processing only cells from the center, top and right corners of each image (e.g., such that the down and right parts of the image are processed only if the current window is the last window from the right or down side). The resulting cell segments were then represented as the final output mask with integer values representing individual cell instances, which were converted into cell contours.

The training data set included 212 images that were cropped for training with a cropping size of 300×300 pixels. All images were augmented, including dropout, rotation, elastic transformations, Gaussian blur, contrast adjustment, addition of Gaussian noise, decreasing membrane channels intensity (sometimes to zero), reflexion/reflection, and further cropped to a fixed size of 256×256 pixels. For the first channel, the nuclei marker was DAPI, for the second channel CD45 or NaKATPase, and various additional markers for the third channel (including CD16, CD163, CD45 (if the marker in second channel is NaKATPase), CD206, CD8, CD11c, CD20, CD56, and CD4). All labels were acquired through human annotation. The Mask R-CNN model was trained on random crops of annotated images using back-propagation and an Adam optimizer.

In FIG. 52, image 5202A shows first ground truth cell segmentation information for the first tissue sample. In these examples, since segmentation predicts contours without necessarily including cell borders, the cell segments could be close to each other pixel to pixel (or overlapping), which can make it difficult to see different segmented cells in image 5202A. Therefore, the image 5202B shows different cell segments of the first ground truth data shaded using different shadings to help illustrate the various segmented cells. Image 5204A shows the determined cell segmentation information for the first ground truth data using CellProfiler, and image 5204B shows the different segmented cells determined by the cell profiler with shading to help illustrate the various segmented cells. Image 5206A shows the cell location information for the first ground truth data determined using Mask R-CNN, and image 5206B shows the different segmented cells determined for the first ground truth data with shading.

Table 1 below shows comparison metrics for the Cell-Profiler and Mask R-CNN segmentations with the ground truth data for FIG. 52:

TABLE 1

|  | PQ | F1 | Precision | Recall | Jaccard index |
| --- | --- | --- | --- | --- | --- |
| Cell Profiler | 0.37 | 0.57 | 0.66 | 0.5 | 0.4 |
| Mask R-CNN | 0.53 | 0.77 | 0.81 | 0.73 | 0.55 |

The Panoptic Quality (PQ) metric is used as a metric for performance, and is described in, for example, Alexander Kirillov, "Panoptic Segmentation," arXiv:1801.00868 (April, 2019), which is available at arxiv.org/abs/1801.00868.

The Jaccard index shows cell detection accuracy and cell shape reproduction accuracy. The value is determined by matching cells between the ground truth data and the cell segmentation prediction using the Hungarian algorithm (where each matched cell has either zero or one connections). For each matched pair, the Jaccard index is calculated between them, and the final result is computed as a sum of the values divided by the maximum number of cells (the number of cells in the ground truth mask or in the prediction mask).

F1, Precision, and Recall are metrics used in machine learning to check the quality of prediction compared with some ground truth (GT) objects (or segments, in these examples), where Precision=TPS/GTS; Recall=TPS/PS, and F1=2*Precision*Recall/(Precision+Recall). TPS (True Positive Segments) represents the number of segments from a neural network prediction that have a reference segment from the GT with Jaccard>=0.5, GTS is the number of all segments from GT, and PS is the number of all segments from the prediction.

In FIG. 53, image 5302A shows second ground truth cell segmentation information for the second tissue sample, and image 5302B shows the different cell segmentations of the second ground truth data using shading. Image 5304A shows the determined cell segmentation information for the second ground truth data using CellProfiler, and image 5304B shows the different segmented cells determined via CellProfiler with shading. Image 5306A shows the cell segmentation information determined for the second ground truth data using Mask R-CNN, and image 5306B shows the different segmented cells determined for the second ground truth data using Mask R-CNN with shading.

Table 2 below shows comparison metrics for the Cell-Profiler and Mask R-CNN segmentations with the ground truth data for FIG. 53:

TABLE 2

|  | PQ | F1 | Precision | Recall | Jaccard index |
| --- | --- | --- | --- | --- | --- |
| Cell Profiler | 0.22 | 0.36 | 0.43 | 0.31 | 0.32 |
| Mask R-CNN | 0.45 | 0.67 | 0.79 | 0.59 | 0.45 |

As shown by the images in FIGS. 52-53 and the comparison data in Tables 1 and 2, Mask R-CNN had better cell contour detection than CellProfiler, since the model was trained for cell segmentation (while CellProfiler generally determines the cell segmentation based on nuclei thresholding, and cell membrane identification by expanding nuclei as outlined by user imputed number of pixels). Mask R-CNN produced less false cell detections than CellProfiler (e.g., as shown by the higher F1 and PQ metrics), and reproduced shapes of cells truer to real cell form than CellProfiler (e.g., as shown by the higher PQ and Jaccard index metrics). Therefore, Mask R-CNN demonstrates significant improvement from CellProfiler and other similar conventional approaches for cell segmentation. Such improved cell segmentation can, in-turn, improve subsequent aspects performed by the image processing pipeline that leverage the cell segmentation, since further analysis can use and/or depend on the cell segmentation data as described herein.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method, comprising:
 using at least one computer hardware processor to perform:
  obtaining at least one multiplexed immunofluorescence (MxIF) image of a same tissue sample, wherein the at least one MxIF image comprises a plurality of immunofluorescence images;
  obtaining, using a machine learning technique, information indicative of locations of cells in the at least one MxIF image, the obtaining comprising analyzing the plurality of immunofluorescence images to identify one or more damaged portions of the tissue sample, the analyzing comprising:
   inputting a corresponding portion of each of at least two of the plurality of immunofluorescence images to a first trained neural network configured to identify differences between immunofluorescence images, wherein the at least two immunofluorescence images comprise images of a same marker; and
   obtaining, from the first trained neural network, at least one classification of the portion of the tissue sample;
  identifying multiple groups of cells in the at least one MxIF image at least in part by:
   determining feature values for at least some of the cells using the at least one MxIF image and the information indicative of locations of cells in the at least one MxIF image; and
   grouping the at least some of the cells into the multiple groups using the determined feature values; and
  determining at least one characteristic of the tissue sample using the multiple groups.

2. The method of claim 1, wherein the at least some of the cells include a first cell, and wherein determining the feature values comprises determining first feature values for the first cell using at least one pixel value associated with a location of the first cell in the at least one MxIF image.

3. The method of claim 2, wherein determining the first feature values for the first cell comprises using pixel values associated with respective locations of the first cell in multiple channels of the at least one MxIF image.

4. The method of claim 3, wherein:
 the multiple channels are associated with respective markers in a plurality of markers;
 determining the first feature values using the pixel values associated with the respective locations of the first cell in the multiple channels of the at least one MxIF image comprises determining a marker expression signature that includes, for each particular marker of one or more of the plurality of markers, a likelihood that the particular marker is expressed in the first cell; and grouping the at least some of the cells into the multiple groups comprises:

determining a predicted cell type for the first cell using the marker expression signature and cell typing data; and associating the first cell with one of the multiple groups based on the predicted cell type.

5. The method of claim 4, wherein:

the cell typing data comprises at least one marker expression signature for each of a plurality of cell types; and the at least one marker expression signature for each particular cell type of the plurality of cell types comprises data indicative of which of the plurality of markers is expressed in cells of the particular cell type.

6. The method of claim 5, wherein determining the predicted cell type of the first cell comprises comparing the marker expression signature of the first cell with the at least one marker expression signature for each of the plurality of cell types to determine the predicted cell type.

7. The method of claim 4, further comprising:

providing, as input to a second trained neural network configured to determine marker expression signatures: (a) the at least one MxIF image and (b) information, from the information indicative of the locations of the cells, indicative of a location of the first cell in at least some of the multiple channels; and obtaining the marker expression signature as output from the second trained neural network.

8. The method of claim 3, wherein using pixel values associated with respective locations of the first cell in the multiple channels comprises, for each of the multiple channels:

identifying a set of pixels for the first cell using the location of the first cell in the channel; and determining a feature value of the first feature values for the first cell based on values of pixels in the set of pixels by determining an average pixel intensity of the values of the pixels in the set of pixels.

9. The method of claim 1, wherein determining the at least one characteristic comprises determining information about cell types in the tissue sample.

10. The method of claim 9, wherein determining the information about the cell types comprises identifying cell types of individual cells of the at least some of the cells in the at least one MxIF image, wherein the cell types comprise one or more of endothelial cells, epithelial cells, macrophages, T cells, malignant cells, NK cells, B cells, and acini cells.

11. The method of claim 1, wherein determining the at least one characteristic comprises determining at least one of:

an acini mask indicating locations of acini in the at least one MxIF image;

a stromal mask indicating locations of stroma in the at least one MxIF image;

a tumor mask indicating locations of a tumor in the at least one MxIF image; and a cell cluster mask indicating locations of one or more cell clusters in the at least one MxIF image.

12. The method of claim 1, wherein determining the at least one characteristic comprises determining one or more cell clusters in the tissue sample based on the multiple groups comprising:

determining a first set of cell features for each of the at least some cells by generating a graph comprising a node for each of the at least some cells, and edges between the nodes; and determining the one or more cell clusters based on the first set of cell features of the at least some cells.

13. The method of claim 12, wherein determining the one or more cell clusters in the tissue sample comprises:

providing the graph as input to a graph neural network to obtain embedded features in a latent space;

clustering the embedded features to obtain clusters of the nodes; and using the clusters of the nodes to determine the one or more cell clusters.

14. The method of claim 12, further comprising determining the first set of cell features for each node of the graph based on a group of the multiple groups that includes the cell, lengths of edges of the node in the graph, and mask data.

15. The method of claim 13, wherein the graph neural network comprises one or more convolutional layers including at least a last graph convolutional layer, and the embedded features are generated based on activations of the last graph convolutional layer.

16. The method of claim 1, wherein obtaining the at least one MxIF image of the tissue sample comprises:

performing background subtraction on a first channel of the at least one MxIF image.

17. The method of claim 16, wherein performing the background subtraction comprises providing the first channel as input to a third trained neural network configured to perform background subtraction, wherein the third trained neural network comprises at least one million parameters.

18. The method of claim 1, wherein the at least one classification comprises a set of classifications comprising a first classification of no cells, a second classification of undamaged cells and/or a third classification of damaged cells;

wherein the set of classifications comprises, for each classification, an associated confidence of the classification applying to the portion; and selecting, based on the confidences, a final classification from the set of classifications for the portion.

19. The method of claim 18, further comprising:

generating a patch mask indicating the final classification of the portion and final classifications for a plurality of other portions of the at least two immunofluorescence images;

removing, based on the patch mask, a portion of a segmentation mask for the tissue sample so that cells of the tissue sample associated with the removed portion are not included in the multiple groups.

20. The method of claim 1, wherein obtaining the information indicative of the locations of the cells in the at least one MxIF image using the machine learning technique comprises:

applying a fourth trained neural network to at least one channel of the at least one MxIF image to generate the information indicative of the locations of the cells.

21. The method of claim 20, wherein:

the fourth trained neural network is implemented using a U-Net architecture or a region-based convolutional neural network architecture; and the fourth trained neural network comprises at least one million parameters.

22. The method of claim 20, further comprising:
training the fourth trained neural network using a set of training immunofluorescence images of tissue samples as input images and associated output images comprising information indicative of locations of cells in the input images.

23. The method of claim 1, wherein grouping the at least some of the cells into the multiple groups comprises performing cell clustering to group the at least some of the cells into the multiple groups based on the determined feature values.

24. The method of claim 1, wherein grouping the at least some of the cells into the multiple groups comprises:
analyzing the determined feature values to determine relationships among the at least some of the cells; and
determining the multiple groups based on the determined relationships such that each cell in a group of the multiple groups has feature values that are indicative of a relationship among cells in the group.

25. A system, comprising:
at least one computer hardware processor; and
at least one non-transitory computer-readable storage medium storing processor-executable instructions that, when executed by the at least one computer hardware processor, cause the at least one computer hardware processor to perform:
obtaining at least one multiplexed immunofluorescence (MxIF) image of a same tissue sample, wherein the at least one MxIF image comprises a plurality of immunofluorescence images;
obtaining, using a machine leaning technique, information indicative of locations of cells in the at least one MxIF image, the obtaining comprising analyzing the plurality of immunofluorescence images to identify one or more damaged portions of the tissue sample, the analyzing comprising:
inputting a corresponding portion of each of at least two of the plurality of immunofluorescence images to a first trained neural network configured to identify differences between immunofluorescence images, wherein the at least two immunofluorescence images comprise images of a same marker; and
obtaining, from the first trained neural network, at least one classification of the portion of the tissue sample;
identifying multiple groups of cells in the at least one MxIF image at least in part by:
determining feature values for at least some of the cells using the at least one MxIF image and the information indicative of locations of cells; and
grouping the at least some of the cells into the multiple groups using the determined feature values; and
determining at least one characteristic of the tissue sample using the multiple groups.

26. At least one non-transitory computer-readable storage medium storing processor-executable instructions that, when executed by at least one computer hardware processor, cause the at least one computer hardware processor to perform:
obtaining at least one multiplexed immunofluorescence (MxIF) image of a same tissue sample, wherein the at least one MxIF image comprises a plurality of immunofluorescence images;
obtaining, using a machine leaning technique, information indicative of locations of cells in the at least one MxIF image, the obtaining comprising analyzing the plurality of immunofluorescence images to identify one or more damaged portions of the tissue sample, the analyzing comprising:
inputting a corresponding portion of each of at least two of the plurality of immunofluorescence images to a first trained neural network configured to identify differences between immunofluorescence images, wherein the at least two immunofluorescence images comprise images of a same marker; and
obtaining, from the first trained neural network, at least one classification of the portion of the tissue sample;
identifying multiple groups of cells in the at least one MxIF image at least in part by:
determining feature values for at least some of the cells using the at least one MxIF image and the information indicative of locations of cells in the at least one MxIF image; and
grouping the at least some of the cells into the multiple groups using the determined feature values; and
determining at least one characteristic of the tissue sample using the multiple groups.

27. A method, comprising:
using at least one computer hardware processor to perform:
obtaining at least one multiplexed immunofluorescence (MxIF) image of a tissue sample, wherein the at least one MxIF image comprises a plurality of immunofluorescence images;
obtaining, using a machine learning technique, information indicative of a location of at least one cell in the at least one MxIF image, the obtaining comprising analyzing the plurality of immunofluorescence images to identify one or more damaged portions of the tissue sample, the analyzing comprising:
inputting a corresponding portion of each of at least two of the plurality of immunofluorescence images to a first trained neural network configured to identify differences between immunofluorescence images, wherein the at least two immunofluorescence images comprise images of a same marker; and
obtaining, from the first trained neural network, at least one classification of the portion of the tissue sample;
determining a marker expression signature for the at least one cell in the tissue sample based on a plurality of markers expressed in the at least one MxIF image and the information indicative of the location of the at least one cell in the at least one MxIF image; and
comparing the marker expression signature to cell typing data that comprises at least one marker expression signature for a plurality of different types of cells to determine a cell type for the at least one cell.

28. The method of claim 27, further comprising determining at least one characteristic of the tissue sample based on the cell type of the at least one cell.

29. A method, comprising:
using at least one computer hardware processor to perform:
obtaining at least one multiplexed immunofluorescence (MxIF) image of a same tissue sample, the obtaining comprising performing background subtraction on a first channel of the at least one MxIF image, wherein performing the background subtraction comprises providing the first channel as input to a trained neural network configured to perform background subtraction, wherein the trained neural network comprises at least one million parameters;

obtaining, using a machine learning technique, information indicative of locations of cells in the at least one MxIF image;

identifying multiple groups of cells in the at least one MxIF image at least in part by:
- determining feature values for at least some of the cells using the at least one MxIF image and the information indicative of locations of cells in the at least one MxIF image; and
- grouping the at least some of the cells into the multiple groups using the determined feature values; and determining at least one characteristic of the tissue sample using the multiple groups.

30. A system, comprising:

at least one computer hardware processor; and at least one non-transitory computer-readable storage medium storing processor-executable instructions that, when executed by the at least one computer hardware processor, cause the at least one computer hardware processor to perform:

obtaining at least one multiplexed immunofluorescence (MxIF) image of a same tissue sample, the obtaining comprising performing background subtraction on a first channel of the at least one MxIF image, wherein performing the background subtraction comprises providing the first channel as input to a trained neural network configured to perform background subtraction, wherein the trained neural network comprises at least one million parameters;

obtaining, using a machine learning technique, information indicative of locations of cells in the at least one MxIF image;

identifying multiple groups of cells in the at least one MxIF image at least in part by:
- determining feature values for at least some of the cells using the at least one MxIF image and the information indicative of locations of cells in the at least one MxIF image; and
- grouping the at least some of the cells into the multiple groups using the determined feature values; and determining at least one characteristic of the tissue sample using the multiple groups.

31. At least one non-transitory computer-readable storage medium storing processor-executable instructions that, when executed by at least one computer hardware processor, cause the at least one computer hardware processor to perform:

obtaining at least one multiplexed immunofluorescence (MxIF) image of a same tissue sample, the obtaining comprising performing background subtraction on a first channel of the at least one MxIF image, wherein performing the background subtraction comprises providing the first channel as input to a trained neural network configured to perform background subtraction, wherein the trained neural network comprises at least one million parameters;

obtaining, using a machine learning technique, information indicative of locations of cells in the at least one MxIF image;

identifying multiple groups of cells in the at least one MxIF image at least in part by:
- determining feature values for at least some of the cells using the at least one MxIF image and the information indicative of locations of cells in the at least one MxIF image; and
- grouping the at least some of the cells into the multiple groups using the determined feature values; and determining at least one characteristic of the tissue sample using the multiple groups.

* * * * *

UNITED STATES PATENT AND TRADEMARK OFFICE
CERTIFICATE OF CORRECTION

| | |
|---|---|
| PATENT NO. | : 11,250,568 B2 |
| APPLICATION NO. | : 17/194235 |
| DATED | : February 15, 2022 |
| INVENTOR(S) | : Viktor Svekolkin et al. |

It is certified that error appears in the above-identified patent and that said Letters Patent is hereby corrected as shown below:

In the Claims

In Claim 25, Column 61, Line 31:
obtaining, using a machine leaning technique informa-
Should read:
obtaining, using a machine learning technique informa- In Claim 26, Column 61, Line 66:
obtaining, using a machine leaning technique informa-
Should read:
obtaining, using a machine learning technique informa- Signed and Sealed this
Tenth Day of May, 2022

*Katherine Kelly Vidal*

Katherine Kelly Vidal
*Director of the United States Patent and Trademark Office*